United States Patent
Koyama et al.

(10) Patent No.: US 10,518,553 B2
(45) Date of Patent: *Dec. 31, 2019

(54) AQUEOUS DISPERSION, METHOD FOR MANUFACTURING THE SAME, AND IMAGE FORMING METHOD

(71) Applicant: FUJIFILM CORPORATION, Minato-ku, Tokyo (JP)

(72) Inventors: Ichiro Koyama, Kanagawa (JP); Noriaki Sato, Kanagawa (JP); Shota Suzuki, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/048,394

(22) Filed: Jul. 30, 2018

(65) Prior Publication Data

US 2019/0023920 A1     Jan. 24, 2019

Related U.S. Application Data

(63) Continuation of application No. PCT/JP2017/002172, filed on Jan. 23, 2017.

(30) Foreign Application Priority Data

Feb. 5, 2016  (JP) .................. 2016-021360
Jul. 22, 2016  (JP) .................. 2016-144292

(51) Int. Cl.

| | | |
|---|---|---|
| B41J 2/21 | (2006.01) | |
| C09D 11/102 | (2014.01) | |
| B01J 13/14 | (2006.01) | |
| B01J 13/20 | (2006.01) | |
| C09D 11/101 | (2014.01) | |
| C09D 11/30 | (2014.01) | |
| C08F 2/46 | (2006.01) | |
| C08J 3/03 | (2006.01) | |
| C08L 57/00 | (2006.01) | |
| C08L 75/02 | (2006.01) | |
| C08L 75/04 | (2006.01) | |

(52) U.S. Cl.
CPC ............ *B41J 2/2114* (2013.01); *B01J 13/14* (2013.01); *B01J 13/20* (2013.01); *B41J 2/2107* (2013.01); *C08F 2/46* (2013.01); *C08J 3/03* (2013.01); *C08L 57/00* (2013.01); *C08L 75/02* (2013.01); *C08L 75/04* (2013.01); *C09D 11/101* (2013.01); *C09D 11/102* (2013.01); *C09D 11/30* (2013.01); *C08J 2375/02* (2013.01); *C08J 2375/04* (2013.01)

(58) Field of Classification Search
CPC ......... C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | |
|---|---|---|---|
| 5,368,973 A | 11/1994 | Hasegawa | |
| 5,563,017 A * | 10/1996 | Yabuki | ............... G03F 7/0285 430/138 |
| 5,596,051 A * | 1/1997 | Jahns | ................. B41M 5/165 526/319 |
| 2004/0031408 A1 | 2/2004 | Makino | |
| 2006/0240264 A1 | 10/2006 | Gertzmann et al. | |
| 2017/0174913 A1 | 6/2017 | Sato et al. | |

(Continued)

FOREIGN PATENT DOCUMENTS

| | | |
|---|---|---|
| EP | 2933374 A1 | 10/2015 |
| EP | 3202808 A1 | 8/2017 |
| EP | 3345966 A1 | 7/2018 |

(Continued)

OTHER PUBLICATIONS

Extended European Search Report dated Jan. 18, 2019, issued in corresponding EP Patent Application No. 17747244.6.

(Continued)

*Primary Examiner* — Manish S Shah
(74) *Attorney, Agent, or Firm* — SOLARIS Intellectual Group, PLLC

(57) ABSTRACT

Provided are an aqueous dispersion including a microcapsule, and water, the microcapsule including: a shell having a three-dimensional cross-linked structure containing at least one neutralized acid group and at least one bond selected from a urethane bond or a urea bond, in which a degree of neutralization of the acid group contained in the three-dimensional cross-linked structure is from 50% to 100%; and a core, at least one of the shell or the core has a polymerizable group; a method for manufacturing the same; and an image forming method using the aqueous dispersion.

16 Claims, No Drawings

(56) References Cited

U.S. PATENT DOCUMENTS

2017/0218565 A1\* 8/2017 Loccufier ................. D06P 5/30
2017/0342171 A1 11/2017 Sato et al.

FOREIGN PATENT DOCUMENTS

| JP | H04-1669463 A | 6/1992 |
|----|---------------|--------|
| JP | H05-132636 A  | 5/1993 |
| JP | H08-259888 A  | 10/1996 |
| JP | 2003-194032 A | 7/2003 |
| JP | 2004-216716 A | 8/2004 |
| JP | 2005-305872 A | 11/2005 |
| JP | 2006-028254 A | 2/2006 |
| JP | 2006-083344 A | 3/2006 |
| JP | 2006-307215 A | 11/2006 |
| JP | 2009-185218 A | 8/2009 |
| JP | 2012-246486 A1 | 12/2012 |
| WO | 2015/158748 A1 | 10/2015 |
| WO | 2016/052053 A1 | 4/2016 |

OTHER PUBLICATIONS

English language translation of the following: Office action dated Feb. 12, 2019 from the JPO in a Japanese patent application No. 2017-565485 corresponding to the instant patent application. This office action translation is submitted now in order to supplement the understanding of the cited reference which is being disclosed in the instant Information Disclosure Statement.
International Search Report issued in International Application No. PCT/JP2017/002172 dated Mar. 7, 2017.
Written Opinion of the ISA issued in International Application No. PCT/JP2017/002172 dated Mar. 7, 2017.

\* cited by examiner

AQUEOUS DISPERSION, METHOD FOR MANUFACTURING THE SAME, AND IMAGE FORMING METHOD

CROSS-REFERENCE TO RELATED APPLICATIONS

This application is a continuation application of International Application No. PCT/JP2017/002172, filed Jan. 23, 2017, the disclosure of which is incorporated herein by reference in its entirety. Further, this application claims priority from Japanese Patent Application No. 2016-021360, filed Feb. 5, 2016, and priority from Japanese Patent Application No. 2016-144292, filed Jul. 22, 2016, the disclosures of which are incorporated herein by reference in their entireties.

BACKGROUND OF THE INVENTION

1. Field of the Invention

The present disclosure relates to an aqueous dispersion, a method for manufacturing the same, and an image forming method.

2. Description of the Related Art

An aqueous dispersion in which a microcapsule having a core and a shell is dispersed in an aqueous medium (medium containing water) has been known in the related art.

For example, an ink jet ink in which a microcapsule having a core containing a photopolymerization initiator and an ultraviolet-curable compound, and a shell of a cross-linked polymer which has a dispersing group introduced by a covalent bond, is dispersed in an aqueous medium, is disclosed (for example, refer to WO2015/158748A).

In addition, as an ink in which excellent ink jetting properties are compatible with excellent rub resistance and durability, an ink containing an aqueous dispersion having a core-shell composite resin particle (that is, microcapsule) formed of a shell layer composed of a urethane resin having a hydrophilic group such as a carboxy group and a core layer composed of a vinyl polymer, is disclosed (for example, refer to JP2012-246486A).

SUMMARY OF THE INVENTION

Meanwhile, in the aqueous dispersion having the microcapsule, dispersion stability of the microcapsule is required. In addition, in recent years, various methods for forming a film by using the aqueous dispersion having the microcapsule have been examined, and a method for forming a film having excellent hardness has been desired. For example, a method using the aqueous dispersion having the microcapsule to which photocuring properties are imparted so as to further improve hardness of a formed film through photocuring has been examined. In particular, in a case where the aqueous dispersion having the microcapsule is used as an ink jet ink (hereinafter will be simply referred to as "ink"), in a case where the aqueous dispersion having the microcapsule is used as a so-called coating solution for forming a coated film, and the like, it is desirable that a film having excellent hardness is formed.

In regard to the above description, in an aqueous dispersion having a microcapsule disclosed in WO2015/158748A, a shell of the microcapsule has a dispersing group, but merely having the dispersing group does not make the dispersion stability of the microcapsule sufficient, and therefore there is still room for improvement.

In addition, an aqueous dispersion having a microcapsule disclosed in JP2012-246486A, does not have photocuring properties, and therefore a film having excellent hardness cannot be formed.

An object to be solved by an embodiment of the present invention is to provide an aqueous dispersion in which the dispersion stability of the microcapsule is excellent and by which a film having excellent hardness can be formed, a method for manufacturing the same, and an image forming method using the aqueous dispersion.

Specific means for achieving the object includes the following aspects.

<1>
An aqueous dispersion comprising a microcapsule and water, the microcapsule comprising: a shell having a three-dimensional cross-linked structure comprising at least one neutralized acid group and at least one bond selected from a urethane bond or a urea bond, in which a degree of neutralization of the acid group included in the three-dimensional cross-linked structure is from 50% to 100%; and a core, at least one of the shell or the core comprising a polymerizable group.

<2> The aqueous dispersion according to <1>, wherein the neutralized acid group is a salt of a carboxy group.

<3> The aqueous dispersion according to <1> or <2>, wherein the three-dimensional cross-linked structure comprising the neutralized acid group comprises a structure selected from the group consisting of a structure represented by the following Formula (A) and a structure represented by the following Formula (B).

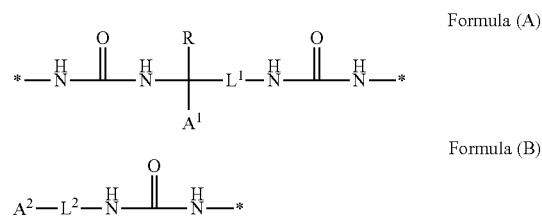

In Formula (A), $A^1$ represents a neutralized acid group, R represents a hydrogen atom or an alkyl group having from 1 to 10 carbon atoms, $L^1$ represents a divalent linking group, and * represents a linking site.

In Formula (B), $A^2$ represents a neutralized acid group, $L^2$ represents a divalent linking group, and * represents a linking site.

<4> The aqueous dispersion according to any one of <1> to <3>, wherein the degree of neutralization of the acid group included in the three-dimensional cross-linked structure is from 50% to 95%.

<5> The aqueous dispersion according to any one of <1> to <4>, wherein the polymerizable group is a radically polymerizable group.

<6> The aqueous dispersion according to any one of <1> to <5>, wherein the core comprises a radically polymerizable compound.

<7> The aqueous dispersion according to <6>, wherein the core comprises a di- or lower functional radically polymerizable compound and a tri- or higher functional radically polymerizable compound.

<8> The aqueous dispersion according to any one of <5> to <7>, wherein the core comprises a photopolymerization initiator.

<9> The aqueous dispersion according to any one of <1> to <4>, wherein the polymerizable group is a thermally polymerizable group.

<10> The aqueous dispersion according to any one of <1> to <4> and <9>, wherein the core comprises a thermally polymerizable compound.

<11> The aqueous dispersion according to any one of <1> to <10>, wherein a content of an anionic surfactant is 1% by mass or less with respect to a total amount of the aqueous dispersion.

<12> The aqueous dispersion according to any one of <1> to <11>, wherein a total solid content of the microcapsule is 50% by mass or more with respect to a total solid content of the aqueous dispersion.

<13> The aqueous dispersion according to any one of <1> to <12>, which is used as an ink jet ink.

<14> A method for manufacturing the aqueous dispersion according to any one of <1> to <13>,
the method comprising a microcapsule-forming step including: mixing an oil-phase component with a water-phase component, the oil-phase component comprising an organic solvent, a tri- or higher functional isocyanate compound, and a compound selected from an isocyanate compound into which a polymerizable group is introduced and a polymerizable compound, and the water-phase component comprising a compound having an acid group and an active hydrogen group, a basic compound, and water; and emulsifying the mixture so as to form the microcapsule.

<15> The method for manufacturing the aqueous dispersion according to <14>, further comprising, before the microcapsule-forming step, a step of preparing the water-phase component in which a degree of neutralization of the acid group of the compound having the acid group and the active hydrogen group is adjusted to from 50% to 100% by using the basic compound.

<16> An image forming method comprising: an application step of applying the aqueous dispersion according to any one of <1> to <13> onto a recording medium; and a curing step of curing the aqueous dispersion applied onto the recording medium.

According to one embodiment of the present invention, an aqueous dispersion in which the dispersion stability of the microcapsule is excellent and by which a film having excellent hardness can be formed, a method for manufacturing the same, and an image forming method using the aqueous dispersion are provided.

DESCRIPTION OF THE PREFERRED EMBODIMENTS

Hereinafter, specific embodiments of the present invention will be described in detail, but the present invention is not limited to the following embodiments. The embodiments can be carried out with appropriate modification within the scope of the object of one embodiment of the present invention.

In the present specification, a range of numerical values described using "to" means a range including the numerical values listed before and after "to" as a minimum value and a maximum value.

In the numerical value ranges described in a stepwise manner in the present specification, an upper limit value or a lower limit value described in a certain numerical value range may be replaced with an upper limit value or a lower limit value of the numerical value range of other stepwise description. In addition, in the numerical value ranges described in the present specification, an upper limit value or a lower limit value described in a certain numerical value range may be replaced with values shown indicated in examples.

In the present specification, in a case where there are a plurality of substances corresponding to each component in a composition, unless otherwise specified, the amount of each component in the composition means the total amount of the plurality of substances present in the composition.

In the present specification, the term "step" means not only an independent step, but also a step that cannot be clearly distinguished from other steps as long as the intended goal of the step is accomplished.

In the present specification, conceptually, "light" includes active energy rays such as γ-rays, β-rays, electron beams, ultraviolet rays, and visible rays.

In the present specification, the ultraviolet rays are referred to as "Ultra Violet (UV) light" in some cases.

In the present specification, the light emitted from a Light Emitting Diode (LED) light source is referred to as "LED light" in some cases.

In the present specification, "(meth)acrylic acid" conceptually includes both the acrylic acid and the methacrylic acid, "(meth)acrylate" conceptually includes both the acrylate and the methacrylate, and "(meth)acryloyl group" conceptually includes both the acryloyl group and the methacryloyl group.

<Aqueous Dispersion>

An aqueous dispersion of the present disclosure includes a microcapsule that has a shell having a three-dimensional cross-linked structure containing at least one neutralized acid group and at least one bond selected from a urethane bond and a urea bond, in which a degree of neutralization of the acid group contained in the three-dimensional cross-linked structure is from 50% to 100%, and that has a core, in which at least one of the shell or the core has a polymerizable group; and water.

In the aqueous dispersion of the present disclosure, the dispersion stability of the microcapsule is excellent, and a film having excellent hardness can be formed thereby.

The reason why the aqueous dispersion of the present disclosure brings about such effects is not clear but is assumed to be as below according to the inventors of the present invention.

In the aqueous dispersion of the present disclosure, the shell of the microcapsule which is a dispersoid has a three-dimensional cross-linked structure containing at least one neutralized acid group, and at least one bond selected from a urethane bond or a urea bond (hereinafter, will also be referred to as "urethane bond or the like").

In a case where the shell of the microcapsule has the neutralized acid group (that is, an acid group having a form of a salt), a level of charge repulsion between microcapsules which occurs in water increases, and thus the microcapsules become unlikely to aggregate.

It is considered that in the aqueous dispersion of the present disclosure, a degree of neutralization of the acid group contained in the three-dimensional cross-linked structure of the shell is from 50% to 100%, which is a high degree, and among acid groups that the shell has, a ratio of the number of moles of neutralized acid group is equal to or higher than a total of the number of moles of neutralized acid group and the number of moles of unneutralized acid group, and thus a level of charge repulsion between the microcapsules increases, leading to significant suppression of the aggregation of the microcapsules, and therefore excellent dispersion stability can be realized.

With respect to the aqueous dispersion of the present disclosure, in a microcapsule contained in an ink disclosed in WO2015/158748A, a shell has an acid group such as a carboxy group, but in WO2015/158748A, it is considered that there is no description regarding the neutralization of the acid group contained in the shell, and a degree of neutralization of the acid group contained in the three-dimensional cross-linked structure of the shell is less than 50%, which are for increasing the dispersion stability of the microcapsule.

Therefore, it is considered that in the ink disclosed in WO2015/158748A, the dispersion stability of the microcapsule is inferior compared to that of the aqueous dispersion of the present disclosure.

The aqueous dispersion of the present disclosure includes the microcapsule having a polymerizable group, and therefore has a property of being cured by polymerization. The polymerization (curing) is carried out by at least one selected from the group consisting of photoirradiation, heating, and infrared ray irradiation. Therefore, it is considered that in a case of forming a film using the aqueous dispersion of the present disclosure and curing the formed film, the film having excellent hardness (for example, pencil hardness) can be formed.

With respect to the aqueous dispersion of the present disclosure, in an aqueous dispersion disclosed in JP2012-246486A, a core-shell composite resin particle which is a dispersoid does not have a polymerizable group.

Accordingly, it is considered that a film formed by using the techniques disclosed in JP2012-246486A has inferior film hardness compared to a film formed by using the aqueous dispersion of the present disclosure.

In addition, the microcapsule in the present disclosure has the shell having the three-dimensional cross-linked structure containing the urethane bond and the like, and thus has a firm structure.

In the aqueous dispersion of the present disclosure, it is considered that a firm structure of each microcapsule is one of the reasons that the film having excellent hardness can be formed.

The above presumption is not to be interpreted to limit the effect of the present embodiment of the present invention and is for explanation as one example.

(Usage of Aqueous Dispersion)

The aqueous dispersion of the present disclosure can be suitably used as a liquid for forming a film (for example, an image) on a substrate (for example, a recording medium).

Examples of such liquid include an ink for forming an image on a substrate as a recording medium (for example, ink jet ink), a coating solution for forming a coated film on a substrate, and the like.

The aqueous dispersion of the present disclosure is particularly preferably used as an ink jet ink. In a case where the aqueous dispersion of the present disclosure is used as an ink jet ink, it is possible to form an image having excellent hardness. In addition, in the aqueous dispersion of the present disclosure, the dispersion stability is excellent, and therefore the aqueous dispersion has excellent jetting properties from an ink jet head. Furthermore, according to the aqueous dispersion of the present disclosure, it is possible to form an image having excellent adhesiveness to a recording medium.

An ink jet ink which is one of usage of the aqueous dispersion of the present disclosure may be an ink jet ink containing a coloring material or may be a transparent ink jet ink not containing a coloring material (so-called a clear ink).

The same applies to the coating solution which is another usage of the aqueous dispersion of the present disclosure.

—Substrate—

In the present disclosure, a substrate for forming a film is not particularly limited, and a known substrate can be used.

Examples of the substrate include paper, paper on which plastic [polyethylene, polypropylene, polystyrene, or the like) is laminated, a metal plate (a plate of a metal such as aluminum, zinc, or copper), a plastic film (films of a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, an acrylic resin, and the like], paper on which the aforementioned metal is laminated or vapor-deposited, a plastic film on which the aforementioned metal is laminated or vapor-deposited, and the like.

In addition, examples of the substrate include a textile substrate.

Examples of a material of the textile substrate include natural fibers such as cotton, silk, hemp, and wool; chemical fibers such as viscose rayon and reocell; synthetic fibers such as polyester, polyamide, and acryl; and a mixture of at least two types selected from the group consisting of the natural fibers, the chemical fibers, and the synthetic fibers.

As the textile substrate, a textile substrate disclosed in paragraphs [0039] to [0042] of WO2015/158592A may be used.

The aqueous dispersion of the present disclosure is particularly suitable for uses in which a film is formed on a nonabsorbent substrate, because the aqueous dispersion makes it possible to form a film exhibiting excellent adhesiveness to a substrate.

As the nonabsorbent substrate, plastic substrates such as a polyvinyl chloride (PVC) substrate, a polystyrene (PS) substrate, a polycarbonate (PC) substrate, a polyethylene terephthalate (PET) substrate, a polyethylene (PE) substrate, a polypropylene (PP) substrate, an acrylic resin substrate, and the like are preferable.

Hereinafter, each component of the aqueous dispersion of the present disclosure will be described.

[Microcapsule]

The microcapsule contained in the aqueous dispersion of the present disclosure has the shell having the three-dimensional cross-linked structure containing at least one neutralized acid group and at least one bond selected from a urethane bond or a urea bond, in which the degree of neutralization of the acid group contained in the three-dimensional cross-linked structure is from 50% to 100%, and that has the core, in which at least one of the shell or the core has the polymerizable group.

The microcapsule of the present disclosure is formed of the outermost shell having the three-dimensional cross-linked structure containing at least one of a urethane bond and a urea bond, and the core which is a region occupying the shell.

An ink composition of the present disclosure may include only one kind of the microcapsule or may include two or more kinds of the microcapsules.

Whether a microcapsule is the microcapsule can be checked by coating a support with a microcapsule dispersion liquid and drying so as to obtain a sample for morphological observation, and then cutting the sample so as to observe the cut surface using an electron microscope and the like.

The aqueous dispersion of the present disclosure may include one kind of the microcapsule or may include two or more kinds thereof.

The microcapsule is a dispersoid in the dispersion of the present disclosure.

The microcapsule has the polymerizable group in at least one of the shell or the core.

The microcapsule has the polymerizable group, which makes it possible that by irradiation with active energy ray, microcapsules adjacent to each other are bonded to each other so as to form a cross-linked structure, and therefore a film having a high level of cross-linking properties and excellent hardness can be formed.

As the polymerizable group, a photopolymerizable group or a thermally polymerizable group is preferable.

As the photopolymerizable group, a radically polymerizable group is preferable, a group containing an ethylenic double bond is more preferable, and a group containing at least one of a vinyl group or a 1-methylvinyl group is even more preferable. Among these, as the radically polymerizable group, a (meth)acryloyl group is particularly preferable from the viewpoints of radical polymerization reactivity and film hardness.

The thermally polymerizable group is preferably an epoxy group, an oxetanyl group, an aziridinyl group, an azetidinyl group, a ketone group, an aldehyde group, or a blocked isocyanate group.

Whether the "microcapsule has the polymerizable group" can be checked by, for example, Fourier transform infrared spectroscopy (FT-IR).

The microcapsule may have the polymerizable group by a form in which the polymerizable group is introduced into the three-dimensional cross-linked structure of the shell or may have the polymerizable group by a form in which the polymerizable compound is contained in the core. In addition, the microcapsule may have the polymerizable group by both forms.

Preferable aspect is that the microcapsule has the polymerizable group by the form in which the photopolymerization initiator is contained in the core, and the polymerizable compound is contained in the core. According to the aspect, a distance between the polymerizable group and the photopolymerization initiator becomes close, leading to improvement of curing sensitivity with respect to irradiation with active energy rays, and therefore a film having excellent hardness can be formed.

The term "polymerizable compound" referred herein means a compound capable of being contained in the core, among compounds having the polymerizable group. A compound for introducing the polymerizable group into the shell (that is, an isocyanate compound into which the polymerizable group is introduced, which will be described later), does not include a concept of the term "polymerizable compound" referred herein.

Details of the "polymerizable compound" and the "isocyanate compound into which the polymerizable group is introduced" will be described later.

—Volume Average Particle Diameter of Microcapsule—

A volume average particle diameter of the microcapsule is preferably 0.01 μm to 10.0 μm, more preferably 0.01 μm to 5 μm, and even more preferably 0.05 μm to 1 μm, from the viewpoint of the dispersion stability of the microcapsule.

In the present specification, the term "volume average particle diameter of the microcapsule" indicates a value measured by a light scattering method.

The measurement of a volume average particle diameter of the microcapsule by the light scattering method is carried out by using, for example, LA-960 (manufactured by HORIBA, Ltd.).

—Amount of Microcapsule—

The amount of the microcapsule in the aqueous dispersion of the present disclosure is preferably 1% by mass to 50% by mass, more preferably 3% by mass to 40% by mass, and even more preferably 5% by mass to 30% by mass, with respect to a total amount of the aqueous dispersion.

In a case where the amount of the microcapsule is 1% by mass or more with respect to the total amount of the aqueous dispersion, the hardness of a film formed is more improved. In addition, in a case where the amount of the microcapsule is 50% by mass or less with respect to the total amount of the aqueous dispersion, the dispersion stability of the microcapsule becomes excellent.

A content of the microcapsules is also a value including components such as a polymerizable compound, a photopolymerization initiator, a sensitizer, a photothermal conversion agent, and a thermal curing accelerator, which can be contained in the core.

Furthermore, a total solid content of the microcapsule in the aqueous dispersion of the present disclosure is preferably 50% by mass or more, more preferably 60% by mass or more, even more preferably 70% by mass or more, still more preferably 80% by mass or more, and yet more preferably 85% by mass or more, with respect to the total solid content of the aqueous dispersion.

In a case where the total solid content of the microcapsule is 50% by mass or more with respect to the total solid content of the aqueous dispersion, the hardness of a film formed is more improved and the dispersion stability of the microcapsule is more improved.

An upper value of the total solid content of the microcapsule in the aqueous dispersion of the present disclosure is not particularly limited and is 95% by mass, for example.

<Shell of Microcapsule>

The shell of the microcapsule (hereinafter will also be simply referred to as "shell") has the three-dimensional cross-linked structure containing at least one neutralized acid group, and at least one bond selected from a urethane bond or a urea bond. In addition, the degree of neutralization of the acid group contained in the three-dimensional cross-linked structure of the shell is from 50% to 100%.

It is preferable that the three-dimensional cross-linked structure of the shell contains both the urethane bond and the urea bond.

(Three-Dimensional Cross-Linked Structure)

In the present disclosure, the term "three-dimensional cross-linked structure" refers to a three-dimensional network structure formed by cross-linking.

Whether the shell of the microcapsule has the three-dimensional cross-linked structure is checked as below. The operation described below is performed under the condition of a liquid temperature of 25° C.

In addition, in a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment has been removed.

A sample is collected from the aqueous dispersion. Tetrahydrofuran (THF) having a mass 100 times the mass of the total solid content in the sample is added to and mixed with the collected sample, thereby preparing a diluted solution. The obtained diluted solution is subjected to centrifugation under the condition of 80,000 rounds per minute (rpm; the same shall apply hereinafter) and 40 minutes. After the centrifugation, whether there are residues is checked by visual observation. In a case where there are residues, a redispersion liquid is prepared by redispersing the residues in water. For the obtained redispersion liquid, by using a wet-type particle size distribution measurement apparatus (LA-960, manufactured by HORIBA, Ltd.), the particle size distribution is measured by a light scattering method.

In a case where the particle size distribution can be checked by the operation described above, it is determined that the shell of the microcapsule has the three-dimensional cross-linked structure.

In the aqueous dispersion of the present disclosure, the shell has the three-dimensional cross-linked structure containing at least one bond selected from the urethane bond or the urea bond, and therefore the film having excellent hardness can be formed.

The three-dimensional cross-linked structure can be formed by a reaction between a tri- or higher functional isocyanate compound or a difunctional isocyanate compound, and water or a compound having two or more active hydrogen groups.

Particularly, in a case where a raw material used for manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the shell is preferably formed by allowing a reaction between a tri- or higher functional isocyanate compound and water.

A total amount of the urethane bond and the urea bond contained in 1 g of the shell having the three-dimensional cross-linked structure is preferably 1 mmol/g to 10 mmol/g, more preferably 1.5 mmol/g to 9 mmol/g, and even more preferably 2 mmol/g to 8 mmol/g.

The three-dimensional cross-linked structure of the shell preferably contains Structure (1).

The three-dimensional cross-linked structure may include a plurality of Structures (1), and the plurality of Structures (1) may be the same as or different from each other.

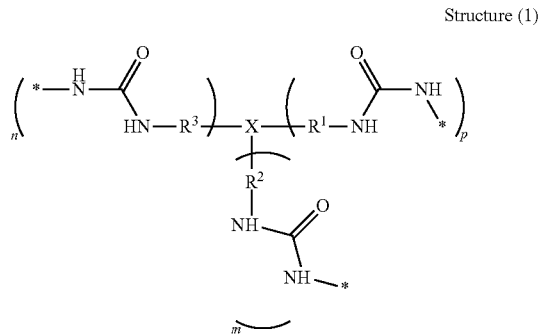

Structure (1)

In Structure (1), X represents a (p+m+n)-valent organic group formed by linking at least two groups selected from the group consisting of a hydrocarbon group which may have a ring structure, —NH—, >N—, —C(=O)—, —O—, and —S—.

In Structure (1), $R^1$, $R^2$, and $R^3$ each independently represent a hydrocarbon group having from 5 to 15 carbon atoms which may have a ring structure.

In Structure (1), * represents a binding position, each of p, m, and n is equal to or greater than 0, and p+m+n equals 3 or greater.

The total molecular weight of X, $R^1$, $R^2$, and $R^3$ is preferably less than 2,000, preferably less than 1,500, and more preferably less than 1,000. In a case where the total molecular weight of X, $R^1$, $R^2$, and $R^3$ is less than 2,000, the internal content rate of the compound contained in the interior of the core can be increased.

The hydrocarbon group in the organic group represented by X is preferably a linear or branched hydrocarbon group having from 1 to 15 carbon atoms, and more preferably a linear or branched hydrocarbon group having from 1 to 10 carbon atoms.

Examples of the ring structure that the hydrocarbon group in the organic group represented by X and the hydrocarbon group represented by $R^1$, $R^2$, and $R^3$ may have, include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Structure (1), p is equal to or greater than 0. p is preferably 1 to 10, more preferably 1 to 8, even more preferably 1 to 6, and particularly preferably 1 to 3.

In Structure (1), m is equal to or greater than 0, m is preferably 1 to 10, more preferably 1 to 8, even more preferably 1 to 6, and particularly preferably 1 to 3.

In Structure (1), n is equal to or greater than 0, n is preferably 1 to 10, more preferably 1 to 8, even more preferably 1 to 6, and particularly preferably 1 to 3.

In Structure (1), p+m+n is preferably an integer of 3 to 10, more preferably an integer of 3 to 8, and even more preferably an integer of 3 to 6.

The (p+m+n)-valent organic group represented by X is preferably a group represented by any one of Formulas (X-1) to (X-12).

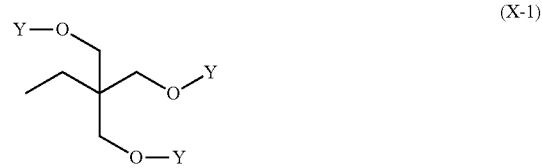

(X-1)

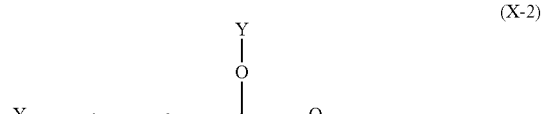

(X-2)

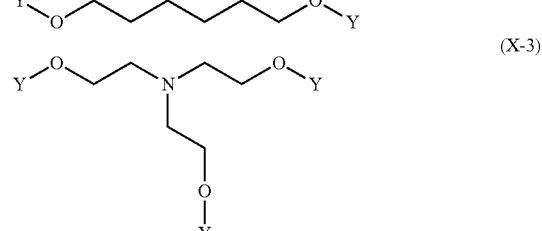

(X-3)

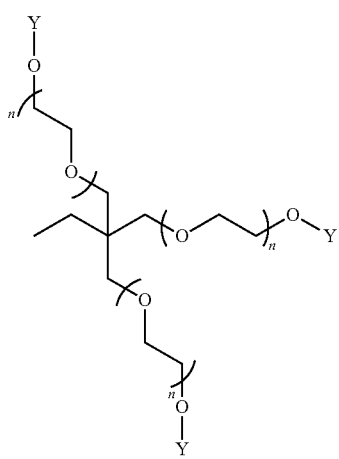
(X-4)
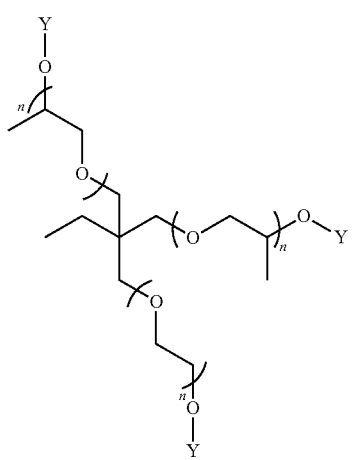
(X-5)
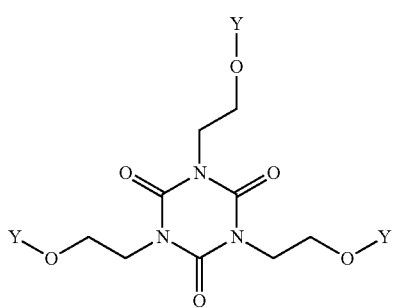
(X-6)
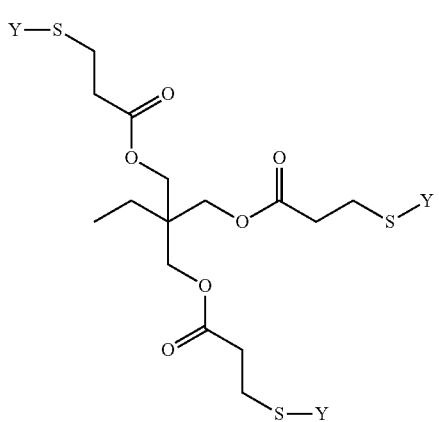
(X-7)
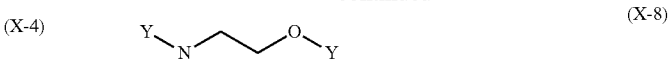
(X-8)
(X-9)
(X-10)
(X-11)
(X-12)
In Formulas (X-1) to (X-12), n represents an integer of 1 to 200, preferably represents an integer of 1 to 50, more preferably represents an integer of 1 to 15, and particularly preferably represents an integer of 1 to 8.
In Formula (X-11) to Formula (X-12), * represents a binding position.
In Formulas (X-1) to (X-10), Y represents (Y-1).

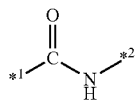
(Y-1)

In (Y-1), *¹ represents a binding position in which (Y-1) is bonded to S or O in (X-1) to (X-10), and *² represents a binding position in which (Y-1) is bonded to $R^1$, $R^2$, or $R^3$ in Structure (1).

In Structure (1), $R^1$, $R^2$, and $R^3$ each independently represent a hydrocarbon group having from 5 to 15 carbon atoms which may have a ring structure.

The hydrocarbon group represented by $R^1$, $R^2$, and $R^3$ may have a substituent, and examples of the substituent include a hydrophilic group capable of being contained in the shell, which is described below.

$R^1$, $R^2$, and $R^3$ preferably each independently represent a group represented by any one of (R-1) to (R-20). In (R-1) to (R-20), * represents a binding position.

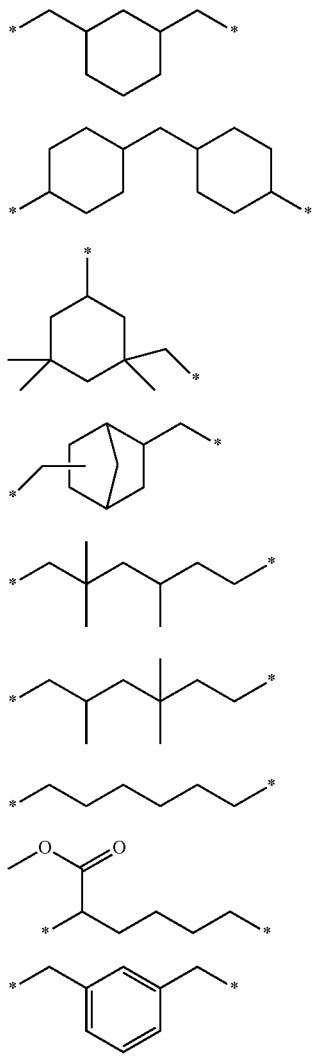

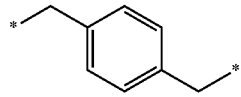
(R-10)

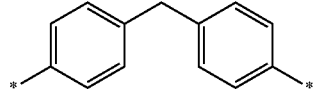
(R-11)

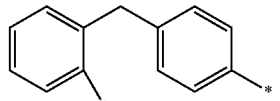
(R-12)

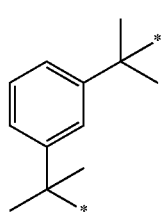
(R-13)

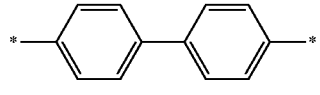
(R-14)

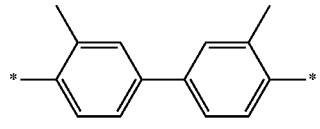
(R-15)

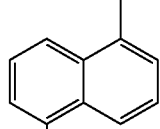
(R-16)

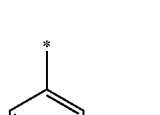
(R-17)

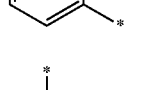
(R-18)

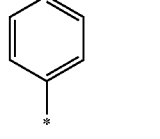
(R-19)

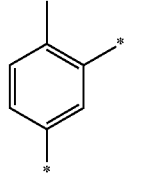

(R-20)

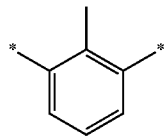

The content rate of Structure (1) in the shell with respect to the total mass of the shell is preferably 8% by mass to 100% by mass, more preferably 25% by mass to 100% by mass, and even more preferably 50% by mass to 100% by mass.

It is preferable that the shell includes, as Structure (1), at least one structure among Structure (2), Structure (3), and Structure (4) shown below.

Structure (2)

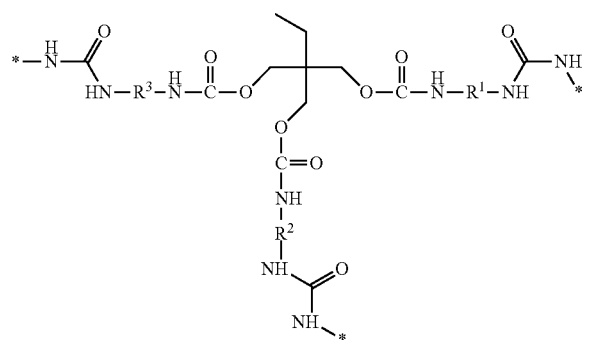

In Structure (2), $R^1$, $R^2$, and $R^3$ each independently represent a hydrocarbon group having from 5 to 15 carbon atoms which may have a ring structure.

Each of the hydrocarbon groups represented by $R^1$, $R^2$, and $R^3$ in Structure (2) has the same definition as each of the hydrocarbon groups represented by $R^1$, $R^2$, and $R^3$ in Structure (1), and the preferable range thereof is also the same.

In Structure (2), * represents a binding position.

Structure (3)

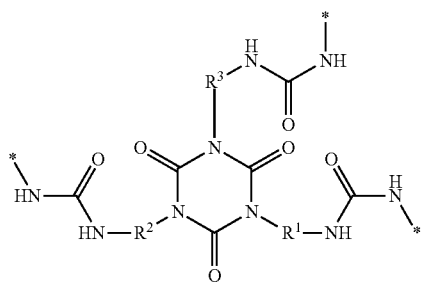

In Structure (3), $R^1$, $R^2$, and $R^3$ each independently represent a hydrocarbon group having from 5 to 15 carbon atoms which may have a ring structure.

Each of the hydrocarbon groups represented by $R^1$, $R^2$, and $R^3$ in Structure (3) has the same definition as each of the hydrocarbon groups represented by $R^1$, $R^2$, and $R^3$ in Structure (1), and the preferable range thereof is also the same.

In Structure (3), * represents a binding position.

Structure (4)

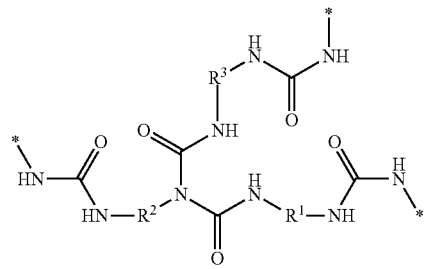

In Structure (4), $R^1$, $R^2$, and $R^3$ each independently represent a hydrocarbon group having from 5 to 15 carbon atoms which may have a ring structure.

Each of the hydrocarbon groups represented by $R^1$, $R^2$, and $R^3$ in Structure (4) has the same definition as each of the hydrocarbon groups represented by $R^1$, $R^2$, and $R^3$ in Structure (1), and the preferable range thereof is also the same.

In Structure (4), * represents a binding position.

Specific examples of Structure (1) to Structure (4) include structures shown in the following Table 1.

TABLE 1

| | Structure (1) | | | | | | Corresponding |
|---|---|---|---|---|---|---|---|
| X | $R^1$ | $R^2$ | $R^3$ | p | n | m | structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensional cross-linked structure in the shell of the microcapsule can be formed by allowing, for example, a reaction between a tri- or higher functional isocyanate compound or a difunctional isocyanate compound and water or a compound having two or more active hydrogen groups.

Particularly, in a case where a raw material used at the time of manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the shell of the microcapsule is preferably a product formed by allowing a reaction between a tri- or higher functional isocyanate compound and water.

—Tri- or Higher Functional Isocyanate Compound—

The tri- or higher functional isocyanate compound is a compound having three or more isocyanate groups in a molecule.

Examples of the tri- or higher functional isocyanate compound include a tri- or higher functional aromatic isocyanate compound, a tri- or higher functional aliphatic isocyanate compound, and the like.

In the present disclosure, as a tri- or higher functional isocyanate compound, any one of a known compound and a compound synthesized by the following method can be used.

Examples of the known compound include the compounds described in "Polyurethane Resin Handbook" (edited by Keiji Iwata, published from NIKKAN KOGYO SHIMBUN, LTD. (1987)).

As the isocyanate compound having three or more functional groups, a compound having three or more isocyanate groups in a molecule, specifically, a compound represented by Formula (X) is preferable.

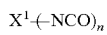  Formula (X)

In Formula (X), $X^1$ represents an n-valent organic group.

In Formula (X), n is equal to or greater than 3. n is preferably 3 to 10, more preferably 3 to 8, and even more preferably 3 to 6.

As the compound represented by Formula (X), a compound represented by Formula (11) is preferable.

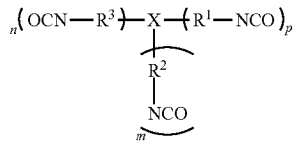  Formula (11)

X, $R^1$, $R^2$, $R^3$, p, m, and n in Formula (11) have the same definition as X, $R^1$, $R^2$, $R^3$, p, m, and n in Structure (1) described above, and the preferable aspect thereof is also the same.

The isocyanate compound having three or more functional groups is preferably a compound derived from a difunctional isocyanate compound (a compound having two isocyanate groups in a molecule).

The tri- or higher functional isocyanate compound is more preferably an isocyanate compound derived from at least one kind of a difunctional isocyanate compound selected from the group consisting of isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate, from the viewpoint of ease of forming the three-dimensional cross-linked structure.

The phrase "derived from" means that a structure derived from the difunctional isocyanate compound is contained using the above difunctional isocyanate compound as a raw material.

In addition, as the tri- or higher functional isocyanate compound, an isocyanate compound (adduct type) caused to have three or more functional groups as an adduct product (an adduct type) of a difunctional isocyanate compound (a compound having two isocyanate groups in a molecule) and a tri- or higher functional compound having three or more active hydrogen groups in a molecule such as polyol, polyamine, or polythiol, a trimer of a difunctional isocyanate compound (a biuret type or an isocyanurate type), and a compound having three or more isocyanate groups in a molecule such as a formalin condensate of benzene isocyanate are also preferable.

These tri- or higher functional isocyanate compounds are may be a mixture containing a plurality of compounds. It is preferable that a compound represented by Formula (11A) or Formula (11B) shown below is a main component of this mixture, and other components may also be contained in the mixture.

—Adduct Type—

The tri- or higher functional isocyanate compound of the adduct-type is preferably a compound represented by Formula (11A) or Formula (11B).

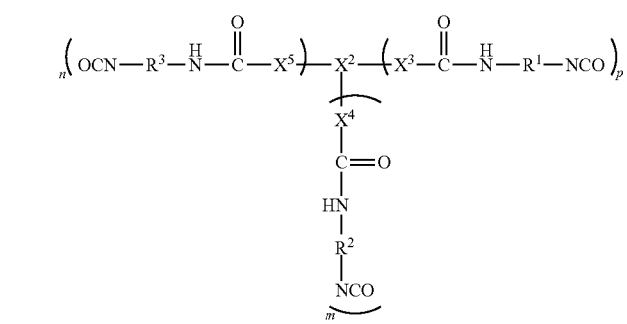  Formula (11A)

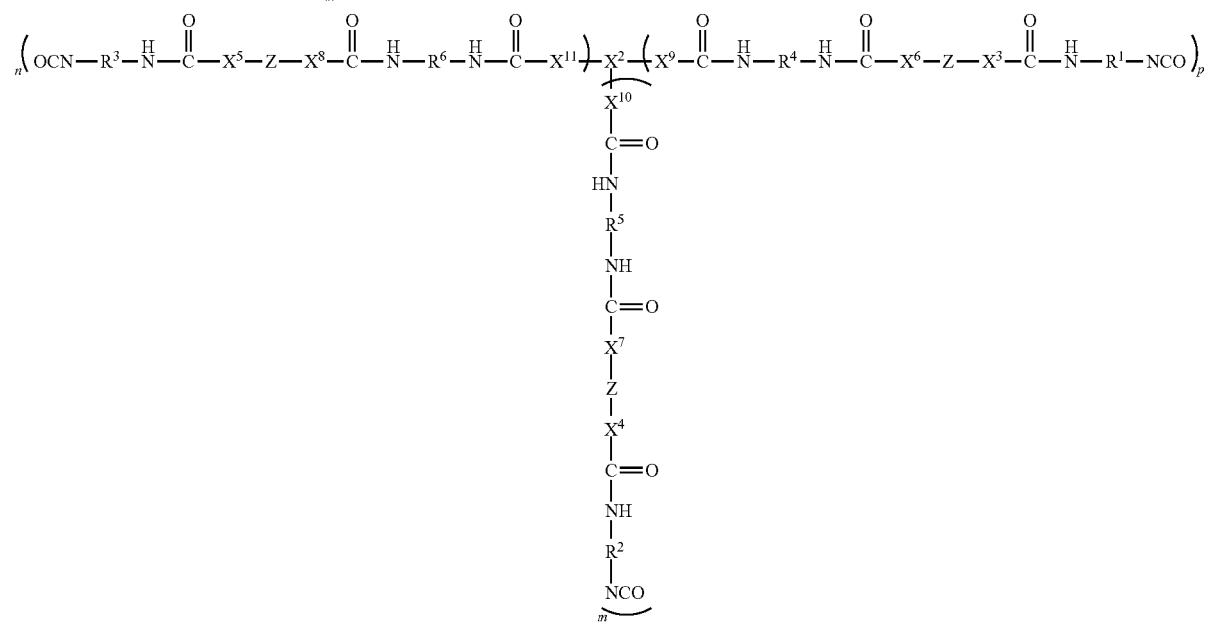  Formula (11B)

In Formula (11A) and Formula (11B), $X^2$ represents a (p+m+n)-valent organic group, each of p, m, and n is 0 or greater, and p+m+n equals 3 or greater.

In Formula (11A) and Formula (11B), $X^3$ to $X^{11}$ each independently represent O, S, or NH.

In Formula (11A) and Formula (11B), $R^1$ to $R^6$ each independently represent a divalent organic group.

In Formula (11A) and Formula (11B), Z represents a divalent organic group.

In Formula (11A) and Formula (11B), $X^2$ is preferably a (p+m+n)-valent organic group formed by linking at least two groups selected from the group consisting of a hydrocarbon group which may have a ring structure, —NH—, >N—, —C(=O)—, —O—, and S.

In Formula (11A) and Formula (11B), p+m+n preferably equals 3 to 10, more preferably equals 3 to 8, and even more preferably equals 3 to 6.

In Formula (11A) and Formula (11B), $X^3$ to $X^{11}$ each independently preferably represent 0 or S, and more preferably represent 0.

In Formula (11A) and Formula (11B), $R^1$ to $R^6$ each independently preferably represent a hydrocarbon group having from 5 to 15 carbon atoms which may have a ring structure.

In Formula (11A) and Formula (11B), the preferable aspect of each of $R^1$ to $R^6$ is the same as the preferable aspect of $R^1$ in Structure (1).

In a case where $X^2$ in Formula (11A) and Formula (11B) is a hydrocarbon group that may have a ring structure, examples of the ring structure include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In a case where each of $R^1$ to $R^6$ in Formula (11A) and Formula (11B) is a hydrocarbon group having from 5 to 15 carbon atoms which may have a ring structure, examples of the ring structure include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Formula (11A) and Formula (11B), the (p+m+n)-valent organic group represented by $X^2$ is preferably a group represented by any one of (X2-1) to (X2-10).

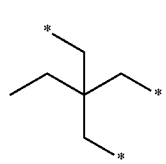

(X2-1)

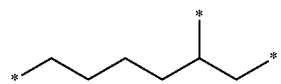

(X2-2)

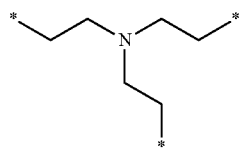

(X2-3)

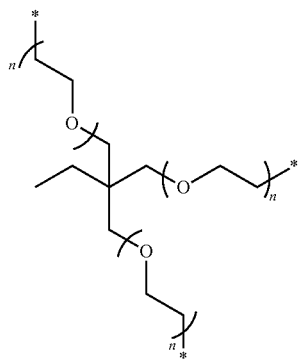

(X2-4)

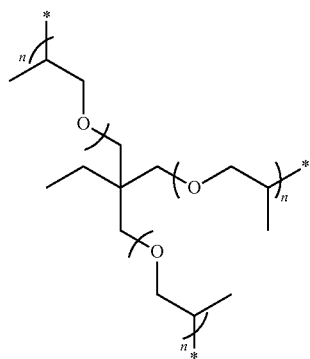

(X2-5)

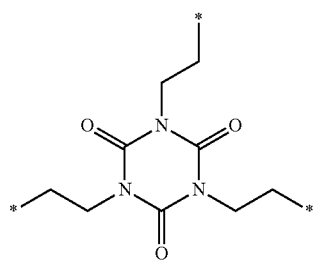

(X2-6)

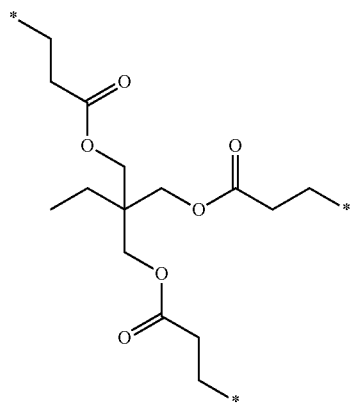

(X2-7)

(X2-8)

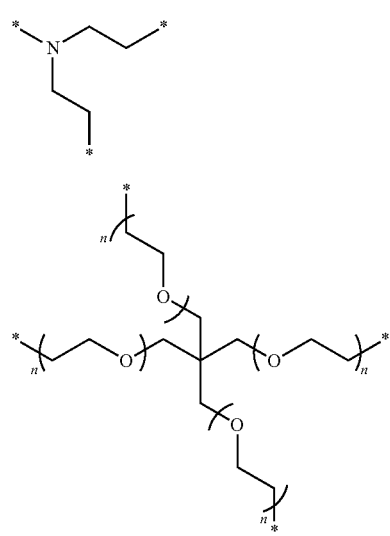

(X2-9)

(X2-10)

As the compound represented by General Formula (11A), a compound represented by Formula (11A-1) is preferable.

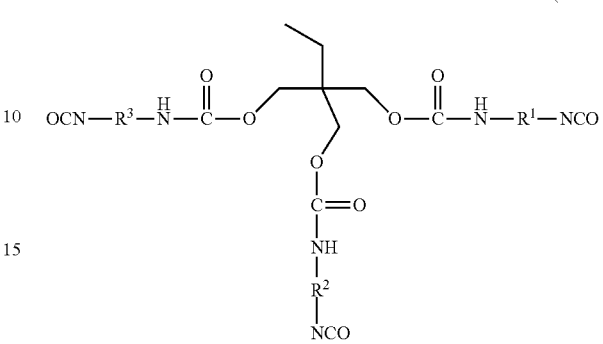

Formula (11A-1)

In Formula (11A-1), $R^1$, $R^2$, and $R^3$ have the same definition as $R^1$, $R^2$, and $R^3$ in Formula (11A), and the preferable aspect thereof is also the same.

The adduct-type isocyanate compound having three or more functional groups can be synthesized by reacting a compound, which will be described later, having three or more active hydrogen groups in a molecule with a difunctional isocyanate compound which will be described later.

In the present specification, the active hydrogen group means a hydroxyl group, a primary amino group, a secondary amino group, or a mercapto group.

The adduct-type tri- or higher functional isocyanate compound can be obtained by, for example, heating (50° C. to 100° C.) a compound having three or more active hydrogen groups in a molecule and a difunctional isocyanate compound in an organic solvent while stirring or by stirring the above compounds at a low temperature (0° C. to 70° C.) while adding a catalyst such as stannous octanoate thereto (Synthesis Scheme 1 shown below).

Generally, in regard to the number of moles (number of molecules) of the difunctional isocyanate compound reacted with the compound having three or more active hydrogen groups in a molecule, a difunctional isocyanate compound is used of which the number of moles (number of molecules) is equal to or higher than 60% of the number of moles (the equivalent number of active hydrogen groups) of the active hydrogen groups in the compound having three or more active hydrogen groups in a molecule. The number of moles of the difunctional isocyanate compound is preferably 60% to 500%, more preferably 60% to 300%, and even more preferably 80% to 200% of the number of moles of the active hydrogen groups.

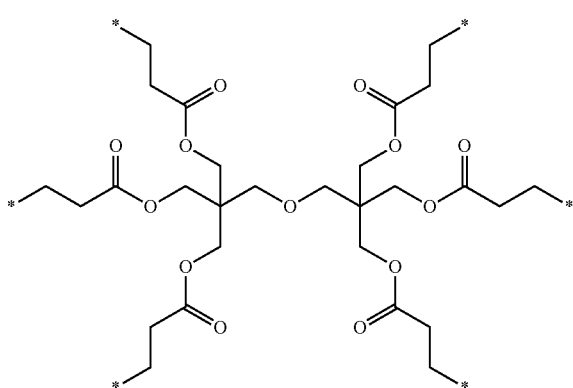

In Formula (X2-1) to Formula (X2-10), n represents an integer of 1 to 200. n preferably represents an integer of 1 to 50, more preferably represents an integer of 1 to 15, and particularly preferably represents an integer of 1 to 8.

In Formula (X2-1) to Formula (X2-10), * represents a binding position.

In Formula (11B), the divalent organic group represented by Z is preferably a hydrocarbon group, a group having a polyoxyalkylene structure, a group having a polycaprolactone structure, a group having a polycarbonate structure, or a group having a polyester structure.

The hydrocarbon group represented by Z may be a linear hydrocarbon group, a branched hydrocarbon group, or a cyclic hydrocarbon group.

The number of carbon atoms in the hydrocarbon group represented by Z is preferably 2 to 30.

In Formula (11A) and Formula (11B), $R^1$ to $R^6$ each independently preferably represent a group (R-1) to a group (R-20).

In Formula (11A) and Formula (11B), $R^1$ to $R^6$ each independently more preferably represent any one of a group (R-3) derived from isophorone diisocyanate (IPDI), a group (R-7) derived from hexamethylene diisocyanate (HDI), a group (R-5) derived from trimethylhexamethylene diisocyanate (TMHDI), a group (R-9) derived from m-xylylene diisocyanate (XDI), a group (R-1) derived from 1,3-bis (isocyanatomethyl)cyclohexane, and a group (R-2) derived from dicyclohexylmethane 4,4'-diisocyanate.

-Synthesize Scheme 1-

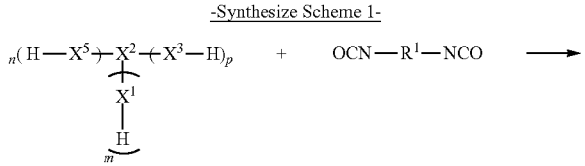

-continued

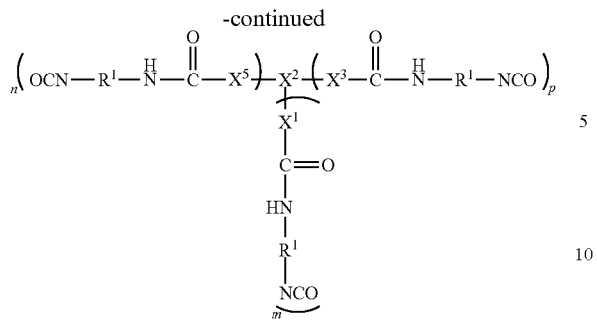

Furthermore, the adduct-type tri- or higher functional isocyanate compound can also be obtained by synthesizing an adduct (a prepolymer; "(PP)" shown in the synthesize scheme below) of a compound having two active hydrogen groups in a molecule and a difunctional isocyanate compound and then allowing the prepolymer to react with a compound having three or more active hydrogen groups in a molecule (Synthesis Scheme 2 shown below).

-Synthesize Scheme 2-

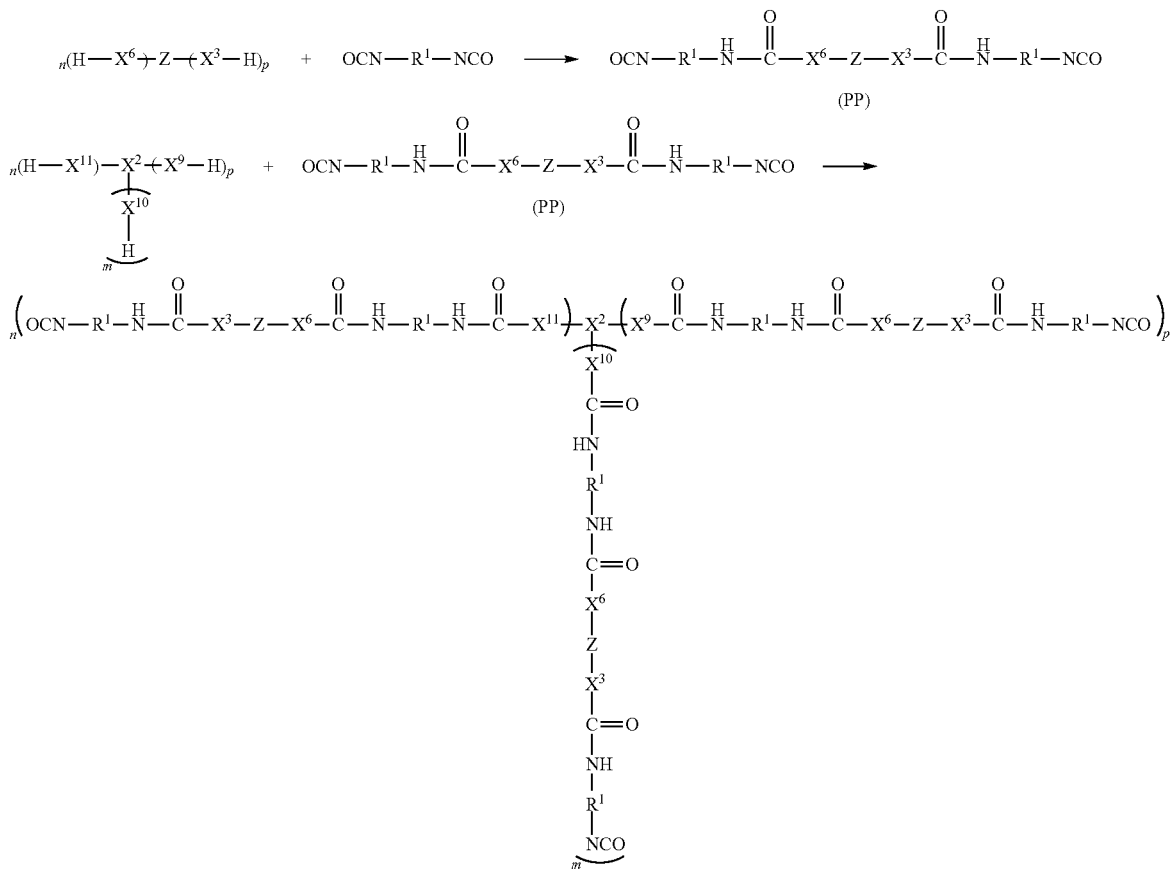

Examples of the difunctional isocyanate compound include a difunctional aromatic isocyanate compound, a difunctional aliphatic isocyanate compound, and the like.

Specific examples of the difunctional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, 1,3-bis(2-isocyanato-2-propyl)benzene, and the like.

As the difunctional isocyanate compounds, compounds having structures represented by (I-1) to (I-24) shown below are preferable.

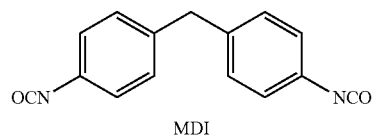
MDI (I-1)

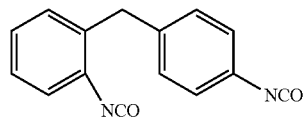
(I-2)

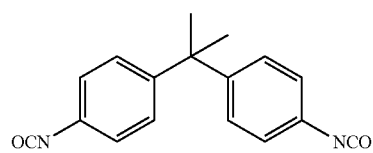
(I-3)

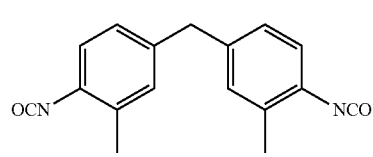
(I-4)

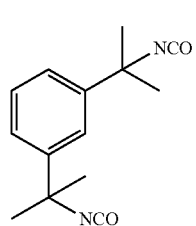
(I-5)

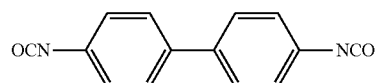
(I-6)

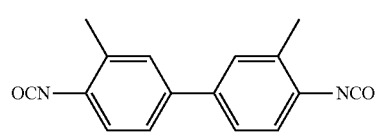
(I-7)

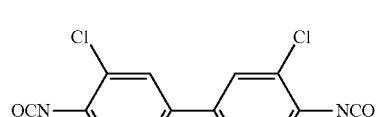
(I-8)

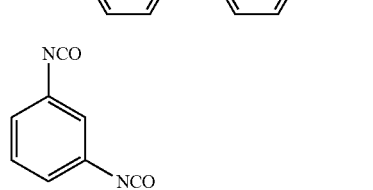
(I-9)

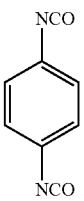
(I-10)

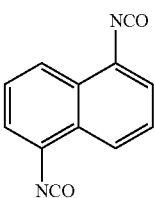
(I-11)

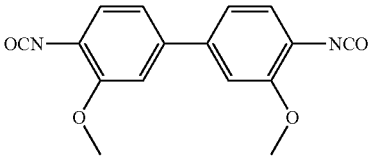
(I-12)

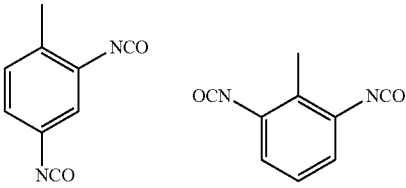
TDI (I-13)    TDI (I-14)

One or a mixture of these structures

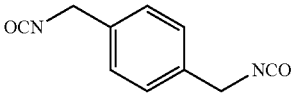
(I-15)

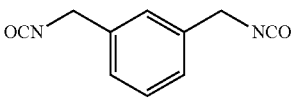
XDI (I-16)

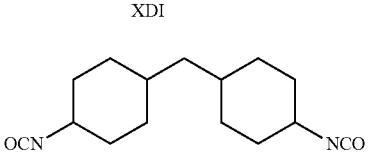
HDMI (I-17)

NBDI (I-18)

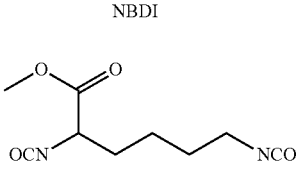
(I-19)

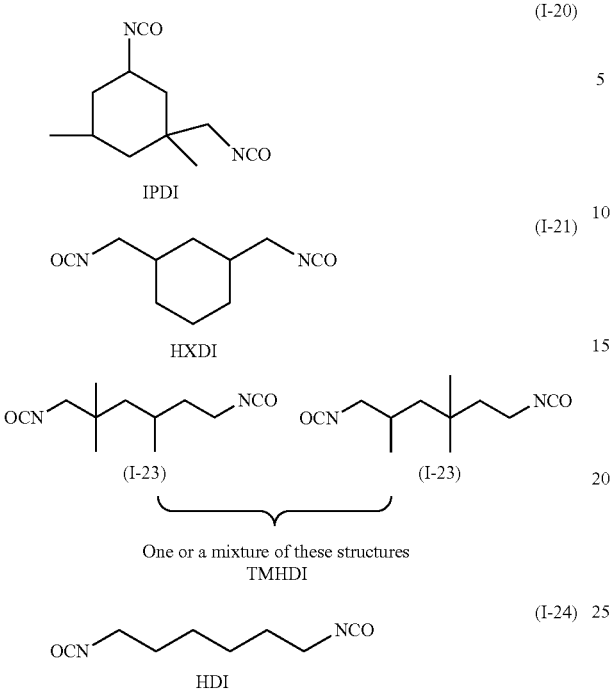

Among the compounds, as the difunctional isocyanate compounds, at least one compound selected from the group consisting of isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), and dicyclohexylmethane-4,4'-diisocyanate (HMDI) is particularly preferable.

As the difunctional isocyanate compound, difunctional isocyanate compounds derived from the above compounds can also be used. Examples thereof include DURANATE (registered trademark) D101, D201, A101 (all of which are manufactured by Asahi Kasei Corporation), and the like.

The compound having three or more active hydrogen groups in a molecule is a compound having three or more groups, each of which is at least one kind of group selected from the group consisting of a hydroxyl group, a primary amino group, a secondary amino group, and a mercapto group, in a molecule. Examples thereof include compounds having structures represented by (H-1) to (H-13) shown below. In the following structures, n represents an integer selected from 1 to 100.

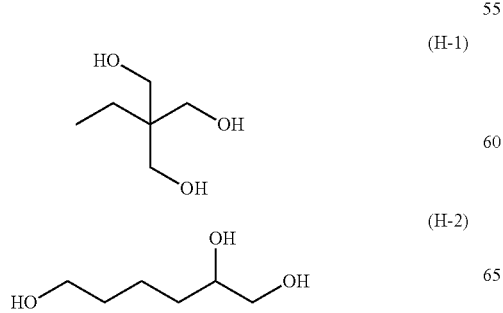

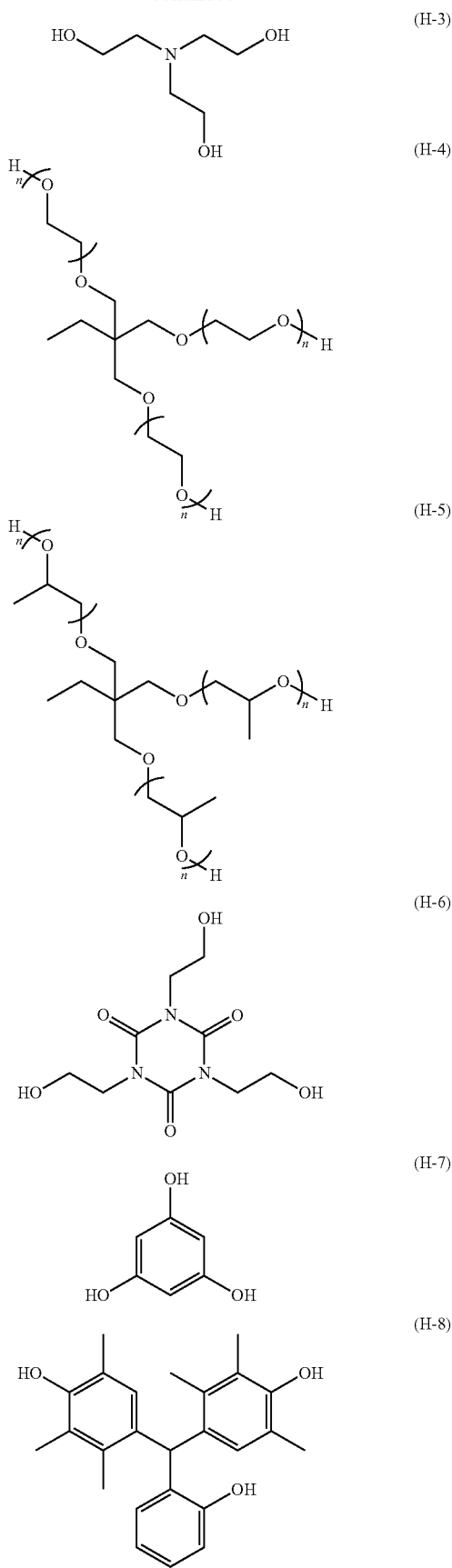

(H-9)

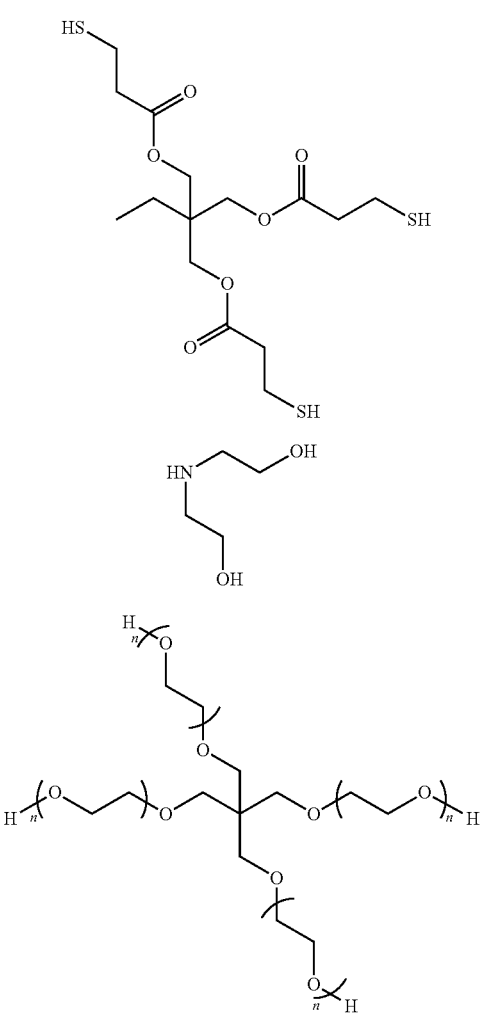

(H-10)

(H-11)

(H-12)

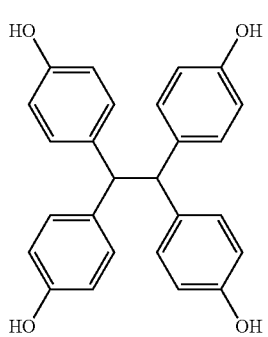

(H-13)

As the adduct-type tri- or higher functional isocyanate compound, it is preferable to use a compound obtained by allowing a reaction between a compound having two or more active hydrogen groups in a molecule with a difunctional isocyanate compound according to combinations listed in Table 2.

TABLE 2

| Com-pound No. | Polyisocyanate structure | | Compound having two or more active hydrogen groups (mol) | Difunctional isocyanate compound (equivalents per mol) |
|---|---|---|---|---|
| | Compound having two or more active hydrogen groups | Disfunctional isocyanate compound | | |
| NCO 101 | 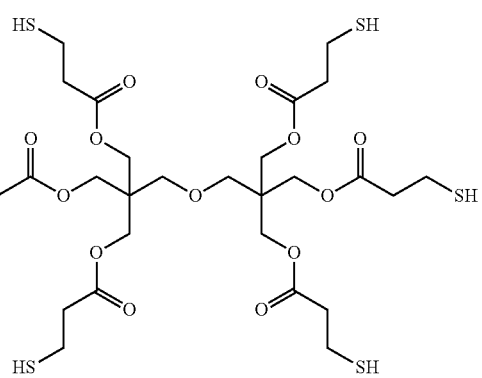<br>Trimethylolpropane | 2,4-Tolylene diisocyanate (TDI) | 1 | 4 |
| NCO 102 | | M-xylylene diisocyanate (XDI) | 1 | 4 |
| NCO 103 | | Hexamethylene diisocyanate (HDI) | 1 | 4 |
| NCO 104 | | 1,3-Bis(isocyanato-methyl)cyclohexane (HXDI) | 1 | 4 |
| NCO 105 | | Isophorone diisocyanate (IPDI) | 1 | 4 |

TABLE 2-continued

| Compound No. | Polyisocyanate structure — Compound having two or more active hydrogen groups | Polyisocyanate structure — Disfunctional isocyanate compound | Composition — Compound having two or more active hydrogen groups (mol) | Composition — Disfunctional isocyanate compound (equivalents per mol) |
|---|---|---|---|---|
| NCO 106 | 1,3,5-Trihydroxybenzene | Hexamethylene diisocyanate (HDI) | 1 | 4 |
| NCO 107 | 1,3,5-Trihydroxybenzene | Isophorone diisocyanate | 1 | 4 |
| NCO 108 | Pentaerythritol ethylene oxide | 1,3-Bis(isocyanato-methyl)cyclohexane (HXDI) | 1 | 5 |
| NCO 109 | Pentaerythritol ethylene oxide | Isophorone diisocyanate (IPDI) | 1 | 5 |
| NCO 110 | Dipentaerythritol hexakis(3-mercaptopropionate) | Hexamethylene diisocyanate (HDI) | 1 | 7 |
| NCO 111 | Dipentaerythritol hexakis(3-mercaptopropionate) | Isophorone diisocyanate (IPDI) | 1 | 7 |
| NCO 112 | Triethanolamine | Hexamethylene diisocyanate (HDI) | 1 | 4 |
| NCO 113 | Triethanolamine | Isophorone diisocyanate (IPDI) | 1 | 4 |

As the adduct-type isocyanate compound having three or more functional groups, among the compounds shown in Table 2, NCO 102 to NCO 105, NCO 107, NCO 108, NCO 111, and NCO 113 are more preferable.

As the adduct-type tri- or higher functional isocyanate compound, a commercially available product on the market may be used.

Examples of the commercially available product include TAKENATE (registered trademark) D-102, D-103, D-103H, D-103M2, P49-75S, D-110N, D-120N, D-140N, and D-160N (all of which are manufactured by Mitsui Chemicals, Inc.), DESMODUR (registered trademark) L75 and UL57SP (manufactured by Sumika Bayer Urethane Co., Ltd.), CORONATE (registered trademark) HL, HX, and L (manufactured by Nippon Polyurethane Industry Co., Ltd.), P301-75E (manufactured by Asahi Kasei Corporation), and the like.

Among these, as the adduct-type tri- or higher functional isocyanate compound, at least one selected from the group consisting of TAKENATE (registered trademark) D-110N, D-120N, D-140N, and D-160N (manufactured by Mitsui Chemicals, Inc.) is more preferable.

—Biuret Type or Isocyanurate Type—

As the isocyanurate-type tri- or higher functional isocyanate compound, a compound represented by Formula (11C) is preferable.

As the biuret-type tri- or higher functional isocyanate compound, a compound represented by Formula (11D) is preferable.

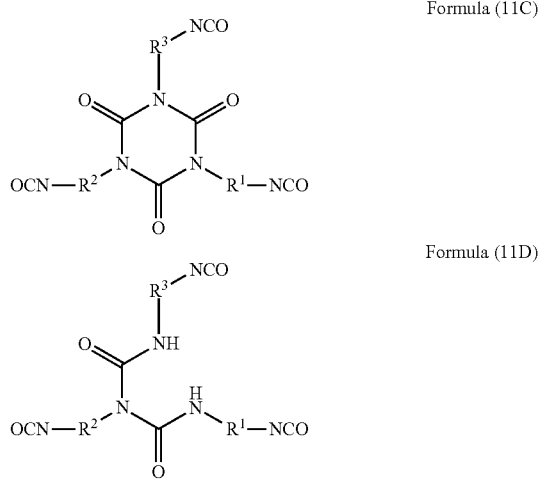

Formula (11C)

Formula (11D)

In Formula (11C) and Formula (11D), $R^1$, $R^2$, and $R^3$ each independently represent a divalent organic group.

In Formula (11C) and Formula (11D), $R^1$, $R^2$, and $R^3$ each independently preferably represent an alkylene group having from 1 to 20 carbon atoms which may have a substituent, a cycloalkylene group having from 1 to 20 carbon atoms which may have a substituent, or an arylene group having from 1 to 20 carbon atoms which may have a substituent.

In Formula (11C) and Formula (11D), $R^1$, $R^2$, and $R^3$ each independently particularly preferably represent a group selected from the groups represented by (R-1) to (R-20) described above.

In Formula (11C) and Formula (11D), $R^1$ to $R^3$ each independently more preferably represent any one of the group (R-3) derived from isophorone diisocyanate (IPDI), the group (R-7) derived from hexamethylene diisocyanate (HDI), the group (R-5) derived from trimethylhexamethylene diisocyanate (TMHDI), the group (R-9) derived from m-xylylene diisocyanate (XDI), the group (R-1) derived from 1,3-bis(isocyanatomethyl)cyclohexane, and the group (R-2) derived from dicyclohexylmethane 4,4'-diisocyanate.

As the isocyanurate-type tri- or higher functional isocyanate compound, a commercially available product on the market may be used.

Examples of the commercially available product include TAKENATE (registered trademark) D-127N, D-170N, D-170HN, D-172N, and D-177N (all of which are manufactured by Mitsui Chemicals, Inc.), SUMIDUR N3300, DESMODUR (registered trademark) N3600, N3900, and Z4470BA (all of which are manufactured by Sumika Bayer Urethane Co., Ltd.), CORONATE (registered trademark) HX and HK (all of which are manufactured by Nippon Polyurethane Industry Co., Ltd.), DURANATE (registered trademark) TPA-100, TKA-100, TSA-100, TSS-100, TLA-100, and TSE-100 (all of which are manufactured by Asahi Kasei Corporation), and the like.

Among these, as the isocyanurate-type tri- or higher functional isocyanate compound, at least one selected from TAKENATE (registered trademark) D-127N (manufactured by Mitsui Chemicals, Inc.), DURANATE (registered trademark) TKA-100, TSS-100, and TSE-100 (all of which are manufactured by Asahi Kasei Corporation) is more preferable.

As the biuret-type tri- or higher functional isocyanate compound, a commercially available product on the market may be used.

Examples of the commercially available product include TAKENATE (registered trademark) D-165N and NP 1100 (all of which are manufactured by Mitsui Chemicals, Inc.), DESMODUR (registered trademark) N3200 (Sumika Bayer Urethane Co., Ltd.), DURANATE (registered trademark) 24A-100 (manufactured by Asahi Kasei Corporation), and the like.

Among these, as the biuret-type tri- or higher functional isocyanate compound, DURANATE (registered trademark) 24A-100 (manufactured by Asahi Kasei Corporation) is more preferable.

The content (unit: mmol/g) of the isocyanate group per 1 g of the tri- or higher functional isocyanate compound is preferably 1 mmol/g to 10 mmol/g, more preferably 1.5 mmol/g to 8 mmol/g, and even more preferably 2 mmol/g to 6 mmol/g.

For obtaining the content of the isocyanate group, the isocyanate compound of interest is dissolved in dehydrated toluene, an excess di-n-butylamine solution is then added thereto so as to cause a reaction, and the remaining di-n-butylamine solution is subjected to back titration by using hydrochloric acid. From the titration amount at an inflection point on the titration curve, the content of the isocyanate group can be calculated.

More specifically, the content of the isocyanate group can be calculated by the method described below.

By using a potentiometric titrator (AT-510, manufactured by KYOTO ELECTRONICS MANUFACTURING CO., LTD.) and using a 1 mol/L aqueous hydrochloric acid solution, neutralization titration is performed under the condition of 25° C. by the blank measurement and the sample measurement described below. From the obtained titration amounts Z1 and Z2, the content of the isocyanate group can be calculated from Equation (N).

Content of isocyanate group (mmol/g)=($Z1-Z2$)/($W \times Y$)   Equation (N)

In Equation (N), Z1 represents the titration amount of a blank, Z2 represents the titration amount of a sample, W represents the solid content of the sample, and Y represents the mass of the sample.

~Blank Measurement~

A volume of 10 mL dehydrated toluene, 10.0 mL of a 2 mol/L di-n-butylamine solution, and 50 mL of isopropyl alcohol are put into a 100 mL beaker and mixed together, thereby preparing a mixed liquid. For the mixed liquid, neutralization titration is performed using a 1 mol/L hydrochloric acid solution. The inflection point on the titration curve is taken as the end point, and the titration amount Z1 (mL) to the end point is determined.

~Sample Measurement~

A sample (an isocyanate compound) Yg with W % by mass of solid content is collected and put into a volume of 100 mL beaker, 20 mL of dehydrated toluene is added to the beaker, and the sample is dissolved, thereby preparing a solution. 10.0 mL of a 2 mol/L di-n-butylamine solution is added to and mixed with the solution, and then the solution is left to stand for 20 minutes or longer. 50 mL of isopropyl alcohol is added to the solution having been left to stand. Subsequently, neutralization titration is performed using a 1 mol/L hydrochloric acid solution, the inflection point on the titration curve is taken as an end point, and the titration amount Z2 (mL) to the end point is determined.

—Water or Compound Having Two or More Active Hydrogen Groups—

The shell of the microcapsule is formed by allowing a reaction between the aforementioned tri- or higher functional isocyanate compound with water or a compound having two or more active hydrogen groups.

As a compound to be reacted with the tri- or higher functional isocyanate compound, generally, water is used. By reacting the isocyanate compound having three or more functional groups with water, a three-dimensional cross-linked structure having a urea bond is formed.

In addition, examples of the compound to be reacted with the tri- or higher functional isocyanate compound includes, other than water, a compound having two or more active hydrogen group.

Examples of the active hydrogen group include a hydroxyl group, an amino group (a primary amino group and a secondary amino group), a mercapto group, and the like.

Examples of the compound having two or more active hydrogen groups include a polyfunctional alcohol, a polyfunctional phenol, a polyfunctional amine having a hydrogen atom on a nitrogen atom, a polyfunctional thiol, and the like.

By allowing the tri- or higher functional isocyanate compound to react with a polyfunctional alcohol or a polyfunctional phenol, a three-dimensional cross-linked structure having a urethane bond is formed.

By allowing the tri- or higher functional isocyanate compound to react with a polyfunctional amine having a hydrogen atom on a nitrogen atom, a three-dimensional cross-linked structure having a urea bond is formed.

Specific examples of the polyfunctional alcohol include propylene glycol, glycerin, trimethylolpropane, 4,4',4"-trihydroxytriphenylmethane, and the like.

Specific examples of the polyfunctional amine include lysine, diethylene triamine, tetraethylene pentamine, and the like.

Specific examples of the polyfunctional thiol include 1,3-propanedithiol, 1,2-ethanedithiol, and the like.

Specific examples of the polyfunctional phenol include bisphenol A and the like.

The compound having two or more active hydrogen groups may be used singly, or two or more kinds thereof may be used in combination.

The compound having two or more active hydrogen groups also includes the aforementioned compound having three or more active hydrogen groups in a molecule.

(Neutralized Acid Group)

In the aqueous dispersion of the present disclosure, the three-dimensional cross-linked structure of the shell contains at least one neutralized acid group, and the degree of neutralization of the acid group contained in the three-dimensional cross-linked structure of the shell is from 50% to 100%, thereby making the dispersion stability of the microcapsule excellent.

In the present specification, the term "neutralized acid group" refers to an acid group having a form of a salt. The "neutralized acid group" is present as a form of an ion in the aqueous dispersion.

Examples of the neutralized acid group include a salt of a carboxy group, a salt of a sulfo group, a salt of a phosphoric acid group, a salt of a sulfate group, a salt of a phosphonic acid group, and the like.

Examples of the "salt" in the salt of a carboxy group, the salt of a sulfo group, the salt of a phosphoric acid group, the salt of a sulfate group, the salt of a phosphonic acid group, and the like include an alkali metal salt [sodium salt, potassium salt, lithium salt, and the like], a triethylamine salt, a dimethylethanolamine salt, a pyridine salt, and the like.

Among these, as the above "salt", an alkali metal salt is preferable, and a sodium salt or a potassium salt is more preferable.

As the neutralized acid group, the salt of a carboxy group is preferable, and an alkali metal salt of a carboxy group is more preferable, from the viewpoint of the dispersion stability of the microcapsule.

The shell may contain only one or two or more neutralized acid groups.

The neutralization of the acid group can be carried out by using a basic compound such as alkali metal hydroxides (sodium hydroxides, potassium hydroxides, and the like), organic amines (triethylamine and the like), and the like.

The neutralized acid group is preferably introduced into the shell via at least one bond of a urethane bond and a urea bond and is more preferably introduced into the shell via a urea bond.

A urea bond is less susceptible to hydrolysis than a urethane bond, and therefore the neutralized acid group introduced into the shell via a urea bond is present in a state of being more firmly bonded to the three-dimensional cross-linked structure of the shell, compared to the neutralized acid group introduced into the shell via a urethane bond. Therefore, the aqueous dispersion including the microcapsule in which the neutralized acid group contributing to the dispersibility is introduced into the shell via a urea bond, is excellent in the dispersion stability of the microcapsule, particularly the dispersion stability for a long period of time (that is, storage stability).

In the aqueous dispersion of the present disclosure, the three-dimensional cross-linked structure containing the neutralized acid group preferably contains a structure selected from a structure represented by Formula (A) and a structure represented by Formula (B), from the viewpoint of the dispersion stability of the microcapsule.

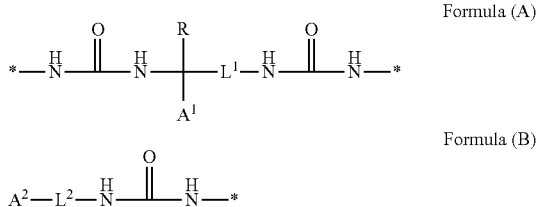

In Formula (A), $A^1$ represents a neutralized acid group, R represents a hydrogen atom or an alkyl group having from 1 to 10 carbon atoms, and $L^1$ represents a divalent linking group. * represents a linking site.

In Formula (B), $A^2$ represents a neutralized acid group and $L^2$ represents a divalent linking group. * represents a linking site.

In Formula (A), the neutralized acid group represented by $A^1$ has the same meaning as the above-described neutralized acid group, and a preferable aspect thereof is also the same.

In Formula (A), the alkyl group having from 1 to 10 carbon atoms represented by R may be a linear alkyl group or may be a branched alkyl group or may be an alkyl group having from an alicyclic structure (for example, a cycloalkyl group).

Examples of the alkyl group having from 1 to 10 carbon atoms represented by R include a methyl group, an ethyl group, a propyl group, a butyl group, a cyclohexyl group, and the like.

As R, a hydrogen atom or an alkyl group having from 1 to 6 carbon atoms is preferable and a hydrogen atom is particularly preferable.

In Formula (A), a divalent linking group represented by $L^1$ is preferably a divalent group in which two or more groups selected from the group consisting of an alkylene group having from 1 to 10 carbon atoms and an aromatic group having from 5 to 10 carbon atoms, or the alkylene group and the aromatic group, are combined.

In Formula (A), the alkylene group having from 1 to 10 carbon atoms represented by $L^1$ may be a linear alkylene group or may be a branched alkylene group or may be an alkylene group having from an alicyclic structure (for example, a cycloalkylene group).

Examples of the alkylene group having from 1 to 10 carbon atoms represented by $L^1$ include a methylene group, an ethylene group, a propylene group, a butylene group, a cyclohexylene group, and the like.

Examples of the aromatic group having from 5 to 10 carbon atoms represented by $L^1$ include a phenylene group.

As $L^1$, an alkylene group having from 1 to 10 carbon atoms is more preferable, and an alkylene group having from 1 to 6 carbon atoms is even more preferable.

As a structure represented by Formula (A), a case in which $A^1$ is a carboxy group, R is a hydrogen atom, and $L^1$ is an alkylene group having from 1 to 6 carbon atoms, is preferable.

The structure represented by Formula (A) can be formed by using, for example, a compound having an acid group and an active hydrogen group (for example, an α-amino acid, particularly preferably lysine) which will be described later.

$A^2$ and $L^2$ in Formula (B) each independently have the same definition as $A^1$ and $L^1$ in Formula (A), and the preferable aspect thereof is also the same.

The three-dimensional cross-linked structure containing the neutralized acid group more preferably contains the structure represented by Formula (A). In the aqueous dispersion of the present disclosure, the three-dimensional cross-linked structure containing the neutralized acid group contains the structure represented by Formula (A), thereby further improving the dispersion stability.

The degree of neutralization of the acid group contained in the three-dimensional cross-linked structure of the shell is from 50% to 100%.

In the aqueous dispersion of the present disclosure, the degree of neutralization of the acid group contained in the three-dimensional cross-linked structure of the shell is 50% or higher, thereby making the dispersion stability of the microcapsule excellent. It is considered that in a case where the degree of neutralization of the acid group contained in the three-dimensional cross-linked structure of the shell is 50% or higher, a level of charge repulsion between microcapsules which occurs in water increases, and thus the microcapsules become unlikely to aggregate, thereby realizing excellent dispersion stability.

From the viewpoint of increasing the dispersion stability of the microcapsule, particularly the dispersion stability for a long period of time (that is, storage stability), the degree of neutralization of the acid group contained in the three-dimensional cross-linked structure of the shell is preferably 50% to 95%, more preferably 80% to 95%, and even more preferably 90% to 95%.

The neutralized acid group (that is, an acid group having the form of a salt) shows basicity. It is considered that in a case where the degree of neutralization of the acid group contained in the three-dimensional cross-linked structure of the shell is 95% or less, a urethane bond and a urea bond are less susceptible to hydrolysis, and therefore the neutralized acid group contributing to the dispersibility is present in a state of being more firmly bonded to the three-dimensional cross-linked structure of the shell by which excellent dispersion stability is maintained for a long period of time.

In the present specification, the term "degree of neutralization of the acid group" means a ratio of the number of moles of neutralized acid group with respect to a total of the number of moles of neutralized acid group and the number of moles of unneutralized acid group [the number of moles of neutralized acid group/(the number of moles of neutralized acid group+the number of moles of unneutralized acid group)], in the whole acid group contained in the three-dimensional cross-linked structure of the shell of the microcapsule.

—Measurement Method of Degree of Neutralization—

In the present specification, the degree of neutralization (%) of the acid group contained in the three-dimensional cross-linked structure of the shell is measured by a potentiometric method described below. A measurement device is not particularly limited, and for example, an automatic potentiometric titrator (model number: AT-510) of KYOTO ELECTRONICS MANUFACTURING CO., LTD. can be suitably used.

Hereinafter, a case where the acid group is a carboxy group (—COOH) will be described with reference to an example. In the following description, in a case where the acid group is a group other than a carboxy group (sulfo group, phosphoric acid group, and the like), the degree of neutralization can be measured by replacing the carboxy group with groups other than the carboxy group.

First, the aqueous dispersion having the microcapsule containing the shell in which at least some of the carboxy groups are neutralized carboxy groups and containing the core, which is a measurement target of the degree of neutralization of the acid group, is prepared.

50 g of the prepared aqueous dispersion is subjected to centrifugation under the conditions of 80,000 rpm and 40 minutes. The supernatant generated by the centrifugation is removed, and the precipitate (microcapsule) is collected.

Approximately 0.5 g of the microcapsule collected in a container 1 is weighed, and a weighed value W1 (g) is recorded. Subsequently, a mix solution of 54 mL of tetrahydrofuran (THF) and 6 mL of distilled water is added thereto, and the weighed microcapsule is diluted so as to obtain a sample 1 for measurement of degree of neutralization.

Titration is performed on the obtained sample 1 for measurement of degree of neutralization by using 0.1 N (=0.1 mol/L) aqueous solution of sodium hydroxide as a titrant, and a titrant volume required up to the equivalent point is recorded as F1 (mL). In a case where a plurality of equivalent points are obtained in the titration, a value of the equivalent points at a maximum titration amount is used. A "maximum titration amount F1 (mL)" corresponds to an amount of acid group which is not neutralized (that is, —COOH) among the acid groups introduced into the shell of the microcapsule.

In addition, approximately 0.5 g of the microcapsule collected in a container 2 is weighed, and a weighed value W2 (g) is recorded. Subsequently, 60 mL of acetate is added thereto, and the weighed microcapsule is diluted so as to obtain a sample 2 for measurement of degree of neutralization.

Titration is performed on the obtained sample 2 for measurement of degree of neutralization by using 0.1 N (=0.1 mol/L) perchloric acid-acetic acid solution as a titrant, and a titrant volume required up to the equivalent point is recorded as F2 (mL). In a case where a plurality of equivalent points are obtained in the titration, a value of the equivalent points at a maximum titration amount is used. A "maximum titration amount F2 (mL)" corresponds to an amount of acid group which is neutralized (that is, —COONa) among the acid groups introduced into the shell of the microcapsule.

Based on the measurement values of "F1 (mL)" and "F2 (mL)", the degree of neutralization (%) of a carboxy group which is the acid group is calculated according to the following equations.

$F1$ (mL)×normality of aqueous solution of sodium hydroxide (0.1 mol/L)/$W1$ (g)+$F2$ (mL)×normality of perchloric acid-acetic acid solution (0.1 mol/L)/$W2$ (g)=amount of carboxy group introduced into shell per 1 g of microcapsule (mmol/g)   (1)

$F2$ (mL)×normality of perchloric acid-acetic acid solution (0.1 mol/L)/$W2$ (g)=amount of neutralized carboxy group among carboxy group introduced into shell per 1 g of microcapsule (mmol/g)   (2)

Degree of neutralization (%)=(2)/(1)×100

—Method for Introducing Neutralized Acid Group into Shell—

Examples of a method for introducing the neutralized acid group into the shell include a method in which in a case of forming the three-dimensional cross-linked structure containing at least one bond selected from a urethane bond or a urea bond, the above-described tri- or higher functional isocyanate compound, water or the compound having two or more active hydrogen groups, the compound having an acid group and an active hydrogen group, and a basic compound are allowed to react with each other.

In addition, examples of a method for introducing the neutralized acid group into the shell include a method in which in a case of manufacturing the above-described tri- or higher functional isocyanate compound, the above-described di- or higher functional isocyanate compound, the compound having an acid group and an active hydrogen group, and a basic compound are allowed to react with each other so as to manufacture a di- or higher functional isocyanate compound into which the neutralized acid group is introduced, and subsequently, the di- or higher functional isocyanate compound into which the neutralized acid group is introduced is allowed to react with water or the above-described compound having two or more active hydrogen groups.

(Hydrophilic Group Capable of Being Contained in Shell)

The shell may further have a hydrophilic group other than the above-described acid group (neutralized acid group and unneutralized acid group).

As the hydrophilic group capable of being contained in the shell, a nonionic group is preferable. In a case where the shell further has a nonionic group as a hydrophilic group, the dispersing action of the above-described neutralized acid group is combined with the dispersing action of the nonionic group as a hydrophilic group, and thus the dispersion stability of the aqueous dispersion is further improved.

As the nonionic group as the hydrophilic group, a group having a polyether structure is preferable, a monovalent group containing a polyalkyleneoxy chain is preferable, and a group represented by Formula (WS) is more preferable, from the viewpoint of improving the dispersion stability of the aqueous dispersion.

                Formula (WS)

In Formula (WS), $R^{W1}$ represents an alkylene group having from 1 to 6 carbon atoms that may be branched, $R^{W2}$ represents an alkyl group having from 1 to 6 carbon atoms that may be branched, nw represents an integer of 2 to 200, and * represents a binding position.

In Formula (WS), the number of carbon atoms in the alkylene group represented by $R^{W1}$ having 1 to 6 carbon atoms that may be branched is preferably 2 to 4, more preferably 2 or 3, and particularly preferably 2 (that is, $R^{W1}$ is particularly preferably an ethylene group).

In Formula (WS), the number of carbon atoms in the alkyl group represented by $R^{W2}$ having 1 to 6 carbon atoms that may be branched is preferably 1 to 4, and particularly preferably 1 (that is, $R^{W2}$ is particularly preferably a methyl group).

In Formula (WS), nw represents an integer of 2 to 200. nw is preferably an integer of 10 to 200, more preferably an integer of 10 to 150, even more preferably an integer of 20 to 150, and particularly preferably an integer of 20 to 100.

The introduction of a hydrophilic group into the shell can be performed by allowing a reaction between the aforementioned tri- or higher functional isocyanate compound, water or a compound having two or more active hydrogen groups, and a compound having a hydrophilic group.

In addition, the introduction of the hydrophilic group in the shell can be carried out as follows. First, a difunctional isocyanate compound is allowed to react with a compound having a hydrophilic group so as to manufacture an isocyanate compound into which the hydrophilic group is introduced, next, the isocyanate compound into which the hydrophilic group is introduced is allowed to react with a compound having two or more active hydrogen groups so as to manufacture a tri- or higher functional isocyanate compound into which the hydrophilic group is introduced, and next, the tri- or higher functional isocyanate compound into which the hydrophilic group is introduced is allowed to react with water or a compound having two or more active hydrogen groups.

—Compound Having Hydrophilic Group—

Among the compound having the hydrophilic group, as a compound having a nonionic group, a compound having a polyether structure is preferable, and a compound having a polyoxyalkylene chain is more preferable.

Examples of the compound having a polyoxyalkylene chain include polyethylene oxide, polypropylene oxide, polytetramethylene oxide, polystyrene oxide, polycyclohexylene oxide, a polyethylene oxide-polypropylene oxide block copolymer, a polyethylene oxide-polypropylene oxide random copolymer, and the like.

Among these, as the compound having a polyoxyalkylene chain, at least one compound selected from polyethylene oxide, polypropylene oxide, and a polyethylene oxide-polypropylene oxide block copolymer is preferable, and polyethylene oxide is more preferable.

As the compound having a polyether structure, at least one compound selected from a polyethylene oxide monoether compound (monomethyl ether, monoethyl ether, and the like) and a polyethylene oxide monoester compound (a monoacetic acid ester, a mono(meth)acrylic acid ester, and the like) is preferable.

—Isocyanate Compound into which Hydrophilic Group is Introduced—

As described above, for introducing a hydrophilic group into the shell, an isocyanate compound into which a hydrophilic group is introduced can also be used.

The isocyanate compound into which a hydrophilic group is introduced is preferably a reaction product between a compound having a hydrophilic group, isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI).

In a case where the group having a polyether structure is introduced into the shell, as the isocyanate compound into which the group having a polyether structure is introduced, it is preferable to use an adduct of a compound having two or more active hydrogen groups, a difunctional isocyanate compound, and a compound having a polyether structure.

The preferable aspects of the compound having two or more active hydrogen groups and the difunctional isocyanate compound are as described above.

As the compound having a polyether structure, a compound represented by Formula (WM) is preferable.

In Formula (WM), each of $R^{W1}$, $R^{W2}$, and nw has the same definition as $R^{W1}$, $R^{W2}$, and nw in Formula (WS) described above, and the preferable aspect thereof is also the same.

As the adduct of the compound having two or more active hydrogen groups, the difunctional isocyanate compound, and the compound having a polyether structure, an adduct (for example, TAKENEATE (registered trademark) D-116N manufactured by Mitsui Chemicals, Inc.) of trimethylolpropane (TMP), m-xylylene diisocyanate (XDI), and polyethylene glycol monomethyl ether (EO) is preferable.

In a case of using the compound having a hydrophilic group for introducing a hydrophilic group into the shell, an amount used of the compound having a hydrophilic group is preferably 0.1% by mass to 50% by mass, more preferably 0.1% by mass to 45% by mass, even more preferably 0.1% by mass to 40% by mass, even more preferably 1% by mass to 35% by mass, and even more preferably 3% by mass to 30% by mass, with respect to the total solid content of the microcapsule.

(Polymerizable Group Capable of Being Contained in Shell)

As described above, the microcapsule has the polymerizable group in at least one of the core and the shell.

The microcapsule has the polymerizable group, which makes it possible that by irradiation with active energy ray, microcapsules adjacent to each other are bonded to each other so as to form a cross-linked structure, and therefore a film having a high level of cross-linking properties and excellent hardness can be formed.

The microcapsule may have the polymerizable group by the form in which the polymerizable group is introduced into the three-dimensional cross-linked structure of the shell or may have the polymerizable group by the form in which the polymerizable compound (that is, the compound having the polymerizable group) is contained in the core. In addition, the microcapsule may have the polymerizable group by both forms.

Examples of the method for introducing the polymerizable group into the three-dimensional cross-linked structure of the shell include a method in which in a case where of forming the three-dimensional cross-linked structure having at least one bond selected from a urethane bond or a urea bond, the above-described tri- or higher functional isocyanate compound, water or the above-described compound having two or more active hydrogen groups, and a polymerizable compound as a compound for introducing a polymerizable group are allowed to react with each other; a method in which in a case of manufacturing the above-described tri- or higher functional isocyanate compound, the above-described di- or higher functional isocyanate compound is allowed to react with a polymerizable compound as a compound for introducing a polymerizable group so as to manufacture an isocyanate compound into which the polymerizable group is introduced, and next, the isocyanate compound into which the polymerizable group is introduced, and water or the above-described compound having two or more active hydrogen groups are allowed to react with each other; a method in which in a case of manufacturing a microcapsule, a polymerizable compound as a compound for introducing a polymerizable group is dissolved in an oil-phase component together with components constituting the microcapsule, and a water-phase component is added to and mixed with the oil-phase component, followed by emulsification; and the like.

Examples of the polymerizable compound used for introducing a polymerizable group into the three-dimensional cross-linked structure of the shell include a compound which has at least one active hydrogen group and has an ethylenically unsaturated bond on at least one terminal thereof.

The compound which has at least one active hydrogen group and has an ethylenically unsaturated bond on at least one terminal thereof can be represented by Formula (a).

In Formula (a), $L^1$ represents an (m+n)-valent linking group, m and n each independently represent an integer selected from 1 to 100, Lc represents a monovalent ethylenically unsaturated group, and Z represents an active hydrogen group.

$L^1$ is preferably an aliphatic group having a valency of 2 or higher, an aromatic group having a valency of 2 or higher, a heterocyclic group having a valency of 2 or higher, —O—, —S—, —NH—, —N<, —CO—, —SO—, —SO₂—, or a combination of these.

m and n each independently preferably represent 1 to 50, more preferably represent 2 to 20, even more preferably represent 3 to 10, and particularly preferably represent 3 to 5.

Examples of the monovalent ethylenically unsaturated group represented by Lc include an allyl group, a vinyl group, an acryloyl group, a methacryloyl group, and the like.

Z is preferably OH, SH, NH, or NH₂, more preferably OH or NH₂, and even more preferably OH.

Examples of the compound which has at least one active hydrogen group and has an ethylenically unsaturated bond on at least one terminal thereof will be shown below, but the present invention is not limited to these structures thereof.

n in the compounds (a-3) and (a-14) represents an integer selected from 1 to 90, for example.

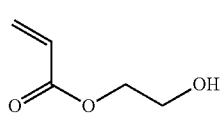
(a-1)

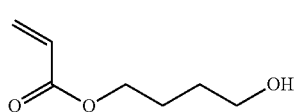
(a-2)

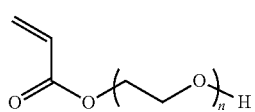
(a-3)

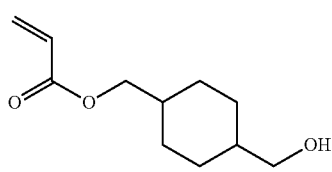
(a-4)

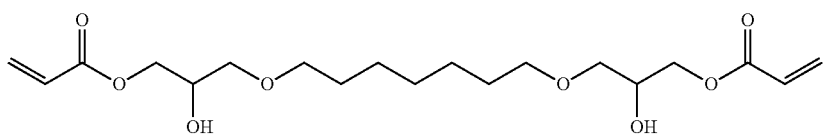
(a-5)

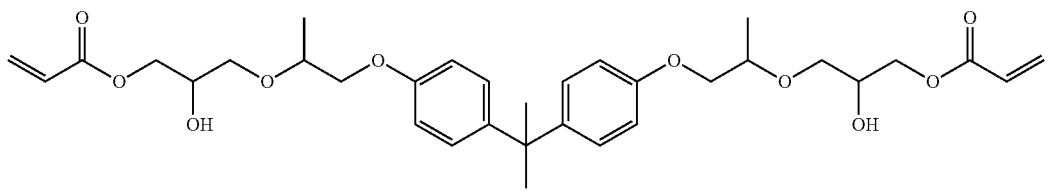
DA-250
(a-6)

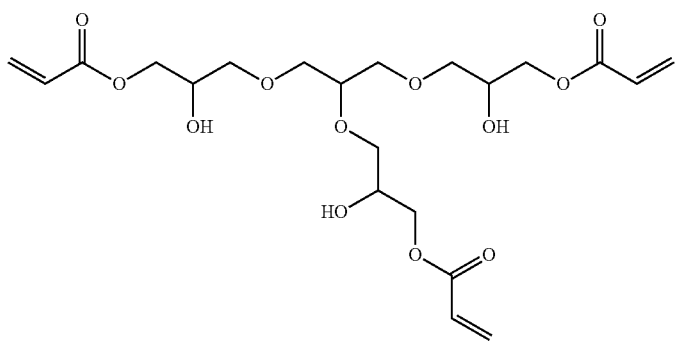
DA-314
(a-7)

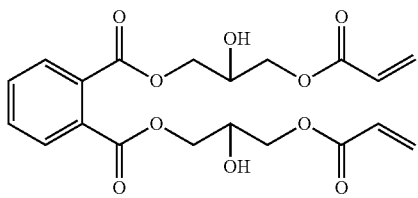
DA-721
(a-8)

-continued
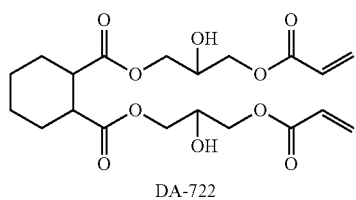
DA-722 (a-9)
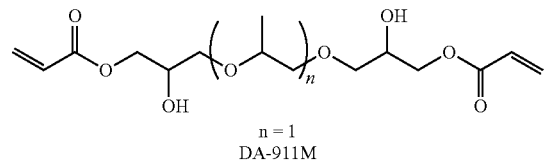
n = 1
DA-911M (a-10)
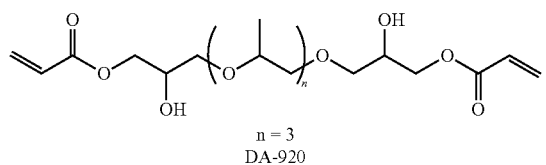
n = 3
DA-920 (a-11)
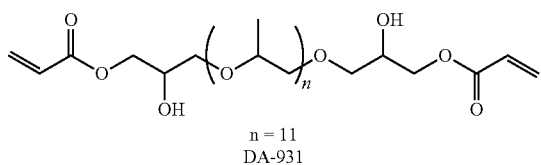
n = 11
DA-931 (a-12)
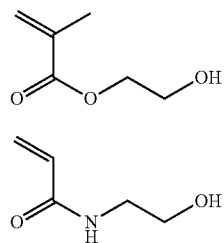
(a-13)
(a-15)
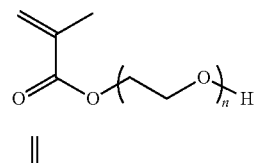
(a-14)
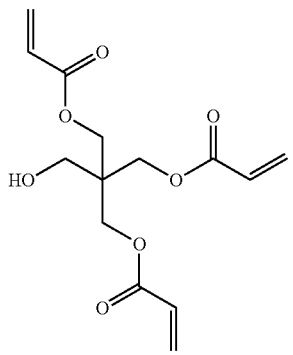
A-TMM-3L (a-16)
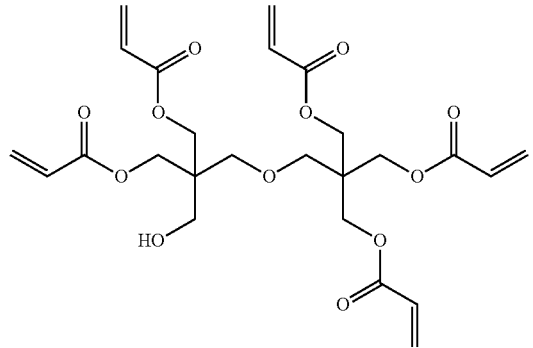
SR399E (a-17)
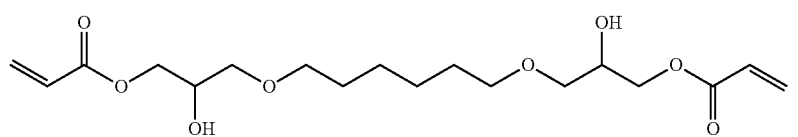
(a-18)

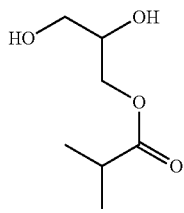

(a-19)

As the compound which has at least one active hydrogen group and has an ethylenically unsaturated bond on at least one terminal thereof, a commercially available product on the market may be used.

Examples of the commercially available product include acrylates such as hydroxyethyl acrylate (manufactured by OSAKA ORGANIC CHEMICAL INDUSTRY LTD), 4-hydroxybutyl acrylate and 1,4-cyclohexanedimethanol monoacrylate (all of which are manufactured by Nippon Kasei Chemical Co., Ltd), BLEMMER (registered trademark) AE-90U (n=2), AE-200 (n=4.5), AE-400 (n=10), AP-150 (n=3), AP-400 (n=6), AP-550 (n=9), and AP-800 (n=13) (all of which are manufactured by NOF CORPORATION), and DENACOL (registered trademark) ACRYLATE DA-212, DA-250, DA-314, DA-721, DA-722, DA-911M, DA-920, and DA-931 (all of which are manufactured by Nagase ChemteX Corporation), methacrylates such as 2-hydroxyethyl methacrylate (manufactured by KYOEISHA CHEMICAL Co., LTD), and BLEMMER (registered trademark) APE-90 (n=2), PE-200 (n=4.5), PE-350 (n=8), PP-1000 (N=4 to 6), PP-500 (n=9), and PP-800 (n=13) (all of which are manufactured by NOF CORPORATION), acrylamide (manufactured by KJ Chemicals Corporation), A-TMM-3L (manufactured by SHIN-NAKAMURA CHEMICAL CO., LTD.), SR399E (manufactured by Sartomer Arkema Inc.), and the like.

Among these, as a compound which has at least one active hydrogen group and has an ethylenically unsaturated bond on at least one terminal thereof, at least one selected from hydroxyethyl acrylate (manufactured by OSAKA ORGANIC CHEMICAL INDUSTRY LTD), BLEMMER (registered trademark) AE-400 (n=10) (by NOF CORPORATION), BLEMMER (registered trademark) AP-400 (n=6), BLEMMER (registered trademark) PP-500 (n=9), DENACOL (registered trademark) ACRYLATE DA-212 (manufactured by Nagase ChemteX Corporation), A-TMM-3L (manufactured by SHIN-NAKAMURA CHEMICAL CO., LTD.), and SR399E (manufactured by Sartomer Arkema Inc.) is more preferable.

As described above, introduction of the polymerizable group into the shell can be carried out by allowing a reaction between, for example, an isocyanate compound into which the polymerizable group is introduced, and the above-described compound having two or more active hydrogen groups.

The isocyanate compound into which the polymerizable group is introduced can be manufactured by allowing a reaction between, for example, isocyanate groups of a tri- or higher functional isocyanate compound (hereinafter, will also be referred to as "polyisocyanate") and an active hydrogen group of a compound (hereinafter, will also be referred to as a monomer for introducing the polymerizable group) having at least one active hydrogen group and having an ethylenically unsaturated bond on at least one terminal thereof, as shown in Synthesize Scheme 3.

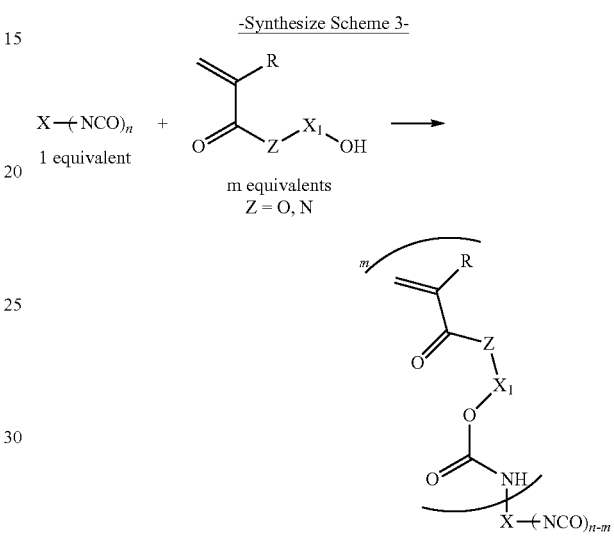

-Synthesize Scheme 3-

As the isocyanate compound into which the polymerizable group is introduced, a compound obtained by allowing a reaction between polyisocyanate (that is, a tri- or higher functional isocyanate compound), and the monomer for introducing a polymerizable group according to combinations shown in Table 3, is preferably used.

TABLE 3

| | Polyisocyanate structure | | Composition Amount of active hydrogen group of monomer |
|---|---|---|---|
| Compound No. | Polyisocyanate | Monomer for introducing polymerizable group | for introducing the polymerizable group with respect to NCO group of polyisocyanate (mol %) |
| NCO 201 | NCO 104 | Hydroxybutyl acrylate | 15 |
| NCO 202 | NCO 104 | BLEMMER AP-400 | 15 |
| NCO 203 | NCO 104 | BLEMMER AE-400 | 15 |
| NCO 204 | NCO 104 | BLEMMER PP-500 | 15 |
| NCO 205 | NCO 104 | DA212 | 15 |
| NCO 206 | NCO 104 | DA920 | 15 |
| NCO 207 | DURANATE 24A-100 | BLEMMER AP-400 | 15 |
| NCO 208 | D-127 | BLEMMER AP-400 | 15 |
| NCO 209 | SUMIDUR N3300 | BLEMMER AP-400 | 15 |

TABLE 3-continued

| Compound No. | Polyisocyanate structure | | Composition Amount of active hydrogen group of monomer for introducing the polymerizable group with respect to NCO group of polyisocyanate (mol %) |
|---|---|---|---|
| | Polyisocyanate | Monomer for introducing polymerizable group | |
| NCO 210 | DURANATE TKA-100 | BLEMMER AP-400 | 15 |
| NCO 211 | DURANATE TSE-100 | BLEMMER AP-400 | 15 |

The monomer for introducing a polymerizable group may be one compound or may be a combination of two or more compounds.

In a case of manufacturing the isocyanate compound into which a polymerizable group is introduced, the polyisocyanate (that is, the tri- or higher functional isocyanate compound) and the monomer for introducing a polymerizable group (that is, a compound having at least one active hydrogen group and an ethylenically unsaturated bond on at least one terminal thereof) are preferably allowed to react with each other at a ratio in which number of moles of the active hydrogen group of the monomer for introducing a polymerizable group is 1% to 30% (more preferably 2% to 25% and even more preferably 3% to 20%) of the number of moles of the isocyanate group of the polyisocyanate.

In the isocyanate compound into which a polymerizable group is introduced, the average number of functional groups of the isocyanate group is equal to or smaller than 3 in some cases. However, even in these cases, as long as the raw materials for forming the shell contain at least one tri- or higher functional isocyanate compound, the shell having the three-dimensional cross-linked structure can be formed.

<Core of Microcapsule>

Components to be contained in the core of the microcapsule are not particularly limited.

The core may contain a polymerizable compound, a photopolymerization initiator, a sensitizer, and the like. In addition, the core may contain other components of the aqueous dispersion which will be described below.

(Polymerizable Compound)

The core of the microcapsule preferably contains the polymerizable compound.

According to the aspect in which the core of the microcapsule contains the polymerizable compound, curing sensitivity of a film and hardness of the film are further improved.

In a case where the core of the microcapsule contains the polymerizable compound, the core may contain only one kind of the polymerizable compound or may contain two or more kinds thereof.

In a case where the core of the microcapsule contains the polymerizable compound, a polymerizable group of the polymerizable compound functions as a polymerizable group of the core.

As the polymerizable compound capable of being contained in the core of the microcapsule, a photopolymerizable compound that is polymerized and cured by irradiation with active energy rays (will also be simply referred to as "light"), or a thermally polymerizable compound that is polymerized and cured by heating or irradiation with infrared rays, is preferable.

As the photopolymerizable compound, a radically polymerizable compound which is capable of radical polymerization and has an ethylenically unsaturated bond is preferable.

The polymerizable compound capable of being contained in the core of the microcapsule may any one of a polymerizable monomer, a polymerizable oligomer, and a polymerizable polymer, but is preferably a polymerizable monomer from the viewpoints of improving the curing sensitivity of a film and hardness of the film.

More preferable polymerizable compound is a polymerizable monomer having photocuring properties (photopolymerizable monomer), and a polymerizable monomer having thermosetting properties (thermally polymerizable monomer).

The content of the polymerizable compound (total content in a case of containing two or more kinds thereof) capable of being contained in the core of the microcapsule (preferably a polymerizable monomer, hereinafter, the same shall be applied) is preferably 10% by mass to 80% by mass, more preferably 20% by mass to 70% by mass, and even more preferably 35% by mass to 60% by mass, with respect to the total solid content of the microcapsule, from the viewpoint of improving curing sensitivity of a film and hardness of the film.

In a case where the core of the microcapsule contains the polymerizable compound, the core may contain only one kind of the polymerizable compound or may contain two or more kinds thereof.

The core of the microcapsule preferably contains a di- or lower functional polymerizable compound (preferably a di- or lower functional polymerizable monomer, hereinafter, the same shall be applied) and a tri- or higher functional polymerizable compound (preferably a tri- or higher functional polymerizable monomer, hereinafter, the same shall be applied). According to the aspect in which the core of the microcapsule contains a di- or lower functional polymerizable compound and a tri- or higher functional polymerizable compound, a film having excellent hardness and having excellent adhesiveness to a substrate can be formed. In the above aspect, it is considered that the di- or lower functional polymerizable compound contributes to the adhesiveness of the film to the substrate, and the tri- or higher functional polymerizable compound contributes to the hardness of the film.

In the case where the polymerizable compound contains the di- or lower functional polymerizable compound and the tri- or higher functional polymerizable compound, a ratio of the tri- or higher functional polymerizable compound is preferably 10% by mass to 90% by mass, more preferably 25% by mass to 70% by mass, and even more preferably 35% by mass to 60% by mass, with respect to a total mass of the di- or lower functional polymerizable compound and the tri- or higher functional polymerizable compound.

The molecular weight of the polymerizable compound is, in terms of a weight-average molecular weight, preferably 100 to 100,000, more preferably 100 to 30,000, even more preferably 100 to 10,000, still more preferably 100 to 4,000, yet more preferably 100 to 2,000, much more preferably 100 to 1,000, far more preferably 100 to 900, far more preferably 100 to 800, and particularly preferably 150 to 750.

The weight-average molecular weight of the polymerizable compound is a value measured by gel permeation chromatography (GPC). A measure method is as described above.

—Polymerizable Monomer—

Examples of the polymerizable monomer capable of being contained in the core of the microcapsule include a photopolymerizable monomer that is polymerized and cured by irradiation with light, or a thermally polymerizable monomer that is polymerized and cured by heating or irradiation with infrared rays.

In a case of containing the photopolymerizable monomer as the polymerizable compound, an aspect in which a photopolymerization initiator to be described later is contained is preferable. In addition, in a case of containing the thermally polymerizable monomer as the polymerizable compound, the photothermal conversion agent, the thermal curing accelerator, or an aspect in which the photothermal conversion agent and the thermal curing accelerator are contained, which will be described later is preferable.

<Photopolymerizable Monomer>

The photopolymerizable monomer can be selected from a polymerizable monomer having a radically polymerizable ethylenically unsaturated bond (that is, a radically polymerizable monomer) and a polymerizable monomer having a cationic polymerizable group that can be cationically polymerized (that is, a cationic polymerizable monomer).

Examples of the radically polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

As the radically polymerizable monomer, a compound having an ethylenic unsaturated group and an ethylenically unsaturated group is preferable.

In a case where the core of the microcapsule contains the radically polymerizable monomer, the core may contain only one or two or more radically polymerizable monomers.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stearyl acrylate, isostearyl acrylate, 2-ethylhexyl diglycol acrylate, 2-hydroxybutyl acrylate, 2-acryloyloxyethylhydrophthalic acid, ethoxydiethylene glycol acrylate, methoxydiethyleneglycol acrylate, methoxypolyethylene glycol acrylate, methoxypropylene glycol acrylate, 2-hydroxy-3-phenoxypropyl acrylate, vinyl ether acrylate, 2-acryloyloxyethyl succinic acid, 2-acryloyloxy phthalic acid, 2-acryloxyethyl-2-hydroxyethyl phthalic acid, lactone modified acrylate, acryloyl morpholine, acrylamide, and substituted acrylamides (for example, N-methylol acrylamide and diacetone acrylamide);

difunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxylated neopentyl glycol diacrylate, propoxylated neopentyl glycol diacrylate, alkoxylated dimethylol tricyclodecane diacrylate, polytetramethylene glycol diacrylate, alkoxylated cyclohexanone dimethanol diacrylate, alkoxylated hexanediol diacrylate, dioxane glycol diacrylate, cyclohexanone dimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate;

tri- or higher functional acrylate compounds such as trimethylolpropane triacrylate, pentaerythritol triacrylate, dipentaerythritol tetraacrylate, ethoxylated isocyanuric acid triacrylate, ε-caprolactone modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxy tetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate; and the like.

Examples of the methacrylate compound include monofunctional methacrylate compounds such as methyl methacrylate, n-butyl methacrylate, allyl methacrylate, glycidyl methacrylate, benzyl methacrylate, dimethylaminoethyl methacrylate, methoxypolyethylene glycol methacrylate, methoxytriethylene glycol methacrylate, hydroxyethyl methacrylate, phenoxyethyl methacrylate, and cyclohexyl methacrylate;

difunctional methacrylate compounds such as polyethylene glycol dimethacrylate, polypropylene glycol dimethacrylate, 2,2-bis(4-methacryloxy polyethoxyphenyl)propane, and tetraethylene glycol dimethacrylate; and the like.

Examples of the styrene compound include styrene, p-methylstyrene, p-methoxystyrene, β-methylstyrene, p-methyl-β-methylstyrene, α-methylstyrene, p-methoxy-β-methylstyrene, and the like.

Examples of the vinylnaphthalene compound include 1-vinylnaphthalene, methyl-1-vinylnaphthalene, β-methyl-1-vinylnaphthalene, 4-methyl-1-vinylnaphthalene, 4-methoxy-1-vinylnaphthalene, and the like.

Examples of the N-vinyl heterocyclic compound include N-vinylcarbazole, N-vinylpyrrolidone, N-vinyl ethylacetamide, N-vinylpyrrole, N-vinylphenothiazine, N-vinylacetanilide, N-vinyl succinic acid imide, N-vinylphthalimide, N-vinylcaprolactam, N-vinylimidazole, and the like.

Examples of other radically polymerizable monomers include N-vinyl amides such as allyl glycidyl ether, diallyl phthalate, triallyl trimellitate, and N-vinylformamide, and the like.

Among these radically polymerizable monomer, as the di- or lower functional radically polymerizable monomer, at least one kind selected from the group consisting of 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, alkoxylated hexanediol diacrylate, polyethylene glycol diacrylate, and polypropylene glycol diacrylate, is preferable.

In addition, as the tri- or higher functional radically polymerizable monomer, at least one kind selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate, is preferable.

As a combination of the di- or lower functional radically polymerizable monomer and the tri- or higher functional radically polymerizable monomer, a combination of a di- or lower functional acrylate compound and a tri- or higher functional acrylate compound is preferable, a combination of a difunctional acrylate compound and a tri- or higher functional acrylate compound is even more preferable, a combination of a difunctional acrylate compound and a tri- to octa-acrylate compound is still more preferable, and a combination of a difunctional acrylate compound and a tri- to hexa-acrylate compound is yet more preferable.

Furthermore, the most preferable combination thereof is a combination of, as a difunctional acrylate compound, at least one kind selected from the group consisting of 1,6-hexanediol diacrylate (HDDA), 1,9-nonanediol diacrylate (NDDA), 1,10-decanediol diacrylate (DDDA), 3-methylpentadiol diacrylate (3 MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, polyethylene glycol diacrylate, and polypropylene glycol diacrylate, and, as a tri- to hexa-acrylate compound, at least one kind selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

Examples of the cationic polymerizable monomer include an epoxy compound, a vinyl ether compound, and an oxetane compound.

As the cationic polymerizable monomer, a compound having at least one olefin, thioether, acetal, thioxane, thietane, aziridine, N-heterocyclic ring, O-heterocyclic ring, S-heterocyclic ring, P-heterocyclic ring, aldehyde, lactam, or a cyclic ester group is preferable.

Examples of the epoxy compound include di- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, alicyclic diepoxide, and the like.

Examples of the alicyclic diepoxide include a copolymer of an epoxide and a compound containing a hydroxyl group, such as glycol, polyol, and vinyl ether, and the like. Specific examples thereof include 3,4-epoxycyclohexylmethyl-3',4'-epoxycycloethylcarboxylate, bis(3,4-epoxyhexylmethyl) adipate, limonene diepoxide, diglycidyl ester of hexahydrophthalic acid, and the like.

In addition, examples of other epoxy compounds include tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene, and the like.

Examples of the vinyl ether compound include di- or lower functional vinyl ether compounds such as ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexane dimethanol monovinyl ether, phenyl vinyl ether, p-methylphenyl vinyl ether, p-methoxyphenyl vinyl ether, methyl vinyl ether, β-methyl vinyl ether, β-chloro iso vinyl ether, diethylene glycol divinyl ether, triethylene glycol divinyl ether, n-propyl vinyl ether, isopropyl vinyl ether, dodecyl vinyl ether, diethylene glycol monovinyl ether, cyclohexane dimethanol divinyl ether, 4-(vinyloxy)butyl benzoate, bis[4-(vinyloxy)butyl] adipate, bis[4-(vinyloxy)butyl] succinate, 4-(vinyloxymethyl)cyclohexylmethyl benzoate, bis[4-(vinyloxy)butyl] isophthalate, bis[4-(vinyloxymethyl)cyclohexylmethyl] glutarate, 4-(vinyloxy)butyl steatite, bis[4-(vinyloxy)butyl] hexadiyl dicarbamate, bis[4-(vinyloxy)methyl]cyclohexyl] methyl] terephthalate, bis[4-(vinyloxy)methyl]cyclohexyl] methyl] isophthalate, bis[4-(vinyloxy)butyl] (4-methyl-1,3-phenylene)-biscarbamate, bis[4-vinyloxy)butyl] (methylenedi-4,1-phenylene)biscarbamate, and 3-amino-1-propanol vinyl ether; and tri- or higher functional vinyl ether compounds such as tris[4-(vinyloxy)butyl] trimellitate.

Examples of the oxetane compound include 3-ethyl-3-hydroxymethyl-1-oxetane, 1,4-bis[3-ethyl-3-oxetanylmethoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, 3,3-dimethyl-2-(p-methoxyphenyl)-oxetane, and the like.

In addition to the radically polymerizable monomers exemplified above, it is possible to use the commercially available products described in "Cross-linking Agent Handbook" edited by Shinzo Yamashita (1981, TAISEI-SHUPPAN CO., LTD.); "UV•EB Curing Handbook (raw materials)" edited by Kiyomi Kato (1985, Kobunshi Kankokai); "Application and Market of UV•EB Curing Technology" edited by RadTech Japan, p. 79, (1989, CMC); "Polyester Resin Handbook" written by Eichiro Takiyama, (1988, NIKKAN KOGYO SHIMBUN, LTD.) and to use radically polymerizable and cross-linkable monomers known in the technical field.

Furthermore, in addition to the cationic polymerizable monomers exemplified above, it is possible to use the compounds described in "Advances in Polymer Science" by J. V. Crivello et al., 62, pages 1 to 47 (1984), "Handbook of Epoxy Resins" by Lee et al., McGraw Hill Book Company, New York (1967), and "Epoxy Resin Technology" by P. F. Bruins et al. (1968).

In addition, as the polymerizable monomer, for example, the photocurable polymerizable monomers used in photopolymerizable compositions described in JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), JP2004-514014A, and the like are known. These monomers can also be suitably applied as the polymerizable monomer capable of being contained in the core of the microcapsule.

As the photopolymerizable monomer, a commercially available product on the market may be used.

Examples of the commercially available product of the photopolymerizable monomer include AH-600 (difunctional), AT-600 (difunctional), UA-306H (hexafunctional), UA-306T (hexafunctional), UA-306I (hexafunctional), UA-510H (decafunctional), UF-8001G (difunctional), DAUA-167 (difunctional), LIGHT ACRYLATE NPA (difunctional), and LIGHT ACRYLATE 3EG-A (difunctional) (all of which are manufactured by KYOEISHA CHEMICAL Co., Ltd.), SR339A (PEA, monofunctional), SR506 (IBOA, monofunctional), CD262 (difunctional), SR238 (HDDA, difunctional), SR341 (3MPDDA, difunctional), SR508 (difunctional), SR306H (difunctional), CD560 (difunctional), SR833S (difunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), and SR399E (pentafunctional) (all of which are manufactured by Sartomer Arkema Inc.), A-NOD-N(NDDA, difunctional), A-DOD-N (DDDA, difunctional), A-200 (difunctional), APG-400 (difunctional), A-BPE-10 (difunctional), A-BPE-20 (difunctional), A-9300 (trifunctional), A-9300-1CL (trifunctional), A-TMPT (trifunctional), A-TMM-3L (trifunctional), A-TMMT (tetrafunctional), and AD-TMP (tetrafunctional) (all of which are manufactured by Shin-Nakamura Chemical Co., Ltd.), UV-7510B (trifunctional) (manufactured by Nippon Synthetic Chemical Industry Co., Ltd.), KAYARAD DCPA-30 (hexafunctional) and KAYARAD DPEA-12 (hexafunctional) (all of which are manufactured by Nippon Kayaku Co., Ltd.), and the like.

In addition, as the photopolymerizable monomer, it is possible to suitably use the commercially available products such as neopentyl glycol propylene oxide adduct diacrylate (NPGPODA), SR531, SR285, and SR256 (all of which are manufactured by Sartomer Arkema Inc.), A-DHP (dipentaerythritol hexaacrylate, SHIN-NAKAMURA CHEMICAL CO., LTD.), ARONIX (registered trademark) M-156 (manufactured by TOAGOSEI CO., LTD.), V-CAP (manufactured by BASF SE), VISCOAT #192 (manufactured by OSAKA ORGANIC CHEMICAL INDUSTRY LTD), and the like.

<Thermally Polymerizable Monomer>

The thermally polymerizable monomer can be selected from the group of the polymerizable monomers capable of polymerization by heating or irradiation with infrared rays. Examples of thermally polymerizable monomer include compounds such as epoxy, oxetane, aziridine, azetidine, ketone, aldehyde, and blocked isocyanate.

Among the above examples, examples of the epoxy compound include di- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, and alicyclic diepoxide;

tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene; and the like.

Examples of the oxetane compound include 3-ethyl-3-hydroxymethyl-1-oxetane, 1,4-bis[3-ethyl-3-oxetanylmethoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, 3,3-dimethyl-2-(p-methoxyphenyl)-oxetane, and the like.

Examples of the blocked isocyanate compound include a compound obtained by inactivating an isocyanate compound with a blocking agent (active hydrogen-containing compound).

As the isocyanate compound, for example, commercially available isocyanates such as hexamethylene diisocyanate, isophorone diisocyanate, toluyl diisocyanate, xylylene diisocyanate, hexamethylene diisocyanate trimer, trimethylhexylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and Bayhydur (registered trademark; Bayer AG), or a di- or higher functional isocyanate obtained by combination thereof is preferable.

Examples of the blocking agent include lactam [ε-caprolactam, δ-valerolactam, γ-butyrolactam, and the like], oxime [acetoxime, methyl ethyl ketoxime (MEK oxime), methyl isobutyl ketoxime (MIBK oxime), cyclohexanone oxime, and the like], amines [aliphatic amines (dimethylamine, diisopropylamine, di-n-propylamine, diisobutylamine, and the like), alicyclic amines (methylhexylamine, dicyclohexylamine, and the like), aromatic amines (aniline, diphenylamine, and the like)], aliphatic alcohols [methanol, ethanol, 2-propanol, n-butanol, and the like], phenol and alkylphenol [phenol, cresol, ethylphenol, n-propylphenol, isopropylphenol, n-butylphenol, octylphenol, nonylphenol, xylenol, diisopropylphenol, di-t-butylphenol, and the like], imidazole [imidazole, 2-methylimidazole, and the like], pyrazole [pyrazole, 3-methylpyrazole, 3,5-dimethylpyrazole, and the like], imine [ethyleneimine, polyethyleneimine, and the like], active methylene [dimethyl malonate, diethyl malonate, diisopropyl malonate, acetylacetone, methyl acetoacetate, ethyl acetoacetate, and the like], blocking agents disclosed in JP2002-309217A and JP2008-239890A, and a mixture of two or more kinds thereof.

Among these, as the blocking agent, at least one kind selected from the group consisting of oxime, lactam, pyrazole, active methylene, and amine is preferable.

As the blocked isocyanate compound, commercially available products on the market may be used.

As the commercially available products of the blocked isocyanate compound, Trixene (registered trademark) BI7982, BI7641, BI7642, BI7950, BI7960, BI7991, and the like (Baxenden Chemicals ltd), and Bayhydur (registered trademark; Bayer AG) are suitably used. In addition, the group of compounds described in paragraph [0064] of WO2015/158654A is suitably used.

In a case of manufacturing the microcapsule, the polymerizable monomer is dissolved as an oil-phase component together with the components constituting the microcapsule, and a water-phase component is added to and mixed with the oil-phase component, followed by emulsification, and therefore the polymerizable monomer can be incorporated into the core of the microcapsule.

The molecular weight of the polymerizable monomer is, in terms of a weight-average molecular weight, preferably 100 to 4,000, more preferably 100 to 2,000, even more preferably 100 to 1,000, still more preferably 100 to 900, yet more preferably 100 to 800, and particularly preferably 150 to 750.

The weight-average molecular weight of the polymerizable monomer is a value measured by gel permeation chromatography (GPC). A measure method is as described above.

—Polymerizable Oligomer and Polymerizable Polymer—

An aspect in which the polymerizable compound is a polymerizable oligomer or a polymerizable polymer is advantageous in that cure shrinkage of a film is decreased and a deterioration in adhesiveness of the film to a substrate is suppressed. In a case of containing the polymerizable oligomer or polymerizable polymer, which have photocuring properties, as the polymerizable compound, an aspect in which a photopolymerization initiator to be described later is contained is preferable. In addition, in a case of containing the polymerizable oligomer or polymerizable polymer, which have thermosetting properties, as the polymerizable compound, the photothermal conversion agent, the thermal curing accelerator, or an aspect in which the photothermal conversion agent and the thermal curing accelerator are contained, which will be described later is preferable.

Examples of the polymerizable oligomer or the polymerizable polymer include oligomers or polymers such as an acrylic resin, a urethane resin, polyester, polyether, polycarbonate, an epoxy resin, and polybutadiene.

In addition, as the polymerizable oligomer or the polymerizable polymer, resins such as epoxy acrylate, aliphatic urethane acrylate, aromatic urethane acrylate, and polyester acrylate may be used.

Among these, as the polymerizable oligomer or the polymerizable polymer, from the viewpoint of decreasing cure shrinkage, a resin which has a hard segment and a soft segment in combination and is capable of stress relaxation in a case of curing is preferable, and particularly, at least one oligomer or polymer selected from the group consisting of a urethane resin, a polyester resin, and an epoxy resin is more preferable.

As the polymerizable group having the polymerizable oligomer or the polymerizable polymer, an ethylenically unsaturated group such as a (meth)acrylic group, a vinyl group, an allyl group, and a styryl group, an epoxy group, and the like are preferable, and from the viewpoint of polymerization reactivity, at least one group selected from the group consisting of a (meth)acryloyl group, a vinyl group, and a styryl group is more preferable, and a (meth)acryloyl group is particularly preferable.

In a case where the core of the microcapsule contains the polymerizable oligomer or the polymerizable polymer as the polymerizable compound, the polymerizable oligomer or the polymerizable polymer may have only one or two or more polymerizable groups.

These polymerizable groups can be introduced into polymers or oligomers by polymer reaction or copolymerization.

For example, by using a reaction between a polymer or an oligomer having a carboxy group on a side chain, and glycidyl methacrylate, or a reaction between a polymer or an oligomer having an epoxy group, and an ethylenically unsaturated group-containing carboxylic acid such as a methacrylic acid, the polymerizable groups can be introduced into polymers or oligomers.

As the polymerizable oligomer and the polymerizable polymer, a commercially available product on the market may be used.

Examples of the commercially available product of the polymerizable oligomer and the polymerizable polymer include acrylic resins such as (ACA) Z200M, (ACA) Z230AA, (ACA) Z251, and (ACA) Z254F (all of which are manufactured by DAICEL-ALLNEX LTD.), and HA7975D (Hitachi Chemical Co., Ltd.);

urethane resins such as EBECRYL (registered trademark) 8402, EBECRYL (registered trademark) 8405, EBECRYL (registered trademark) 9270, EBECRYL (registered trademark) 8311, EBECRYL (registered trademark) 8701, KRM 8667, and KRM 8528 (all of which are manufactured by DAICEL-ALLNEX LTD.), CN964, CN9012, CN968, CN996, CN975, and CN9782 (all of which are manufactured by Sartomer Arkema Inc.), UV-6300B, UV-7600B, UV-7605B, UV-7620EA, and UV-7630B (all of which are manufactured by Nippon Synthetic Chemical Industry Co., Ltd.), U-6HA, U-15HA, U-108A, U-200PA, and UA-4200 (all of which are manufactured by Shin-Nakamura Chemical Co., Ltd.), TL2300, HA4863, TL2328, TL2350, and HA7902-1 (all of which are manufactured by Hitachi Chemical Co., Ltd.), and 8UA-017, 8UA-239, 8UA-239H, 8UA-140, 8UA-585H, 8UA-347H, and 8UX-015A (all of which are manufactured by TAISEI FINE CHEMICAL CO. LTD.);

polyester resins such as CN294, CN2254, CN2260, CN2271E, CN2300, CN2301, CN2302, CN2303, and CN2304 (all of which are manufactured by Sartomer Arkema Inc.), and EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are manufactured by DAICEL-ALLNEX LTD.);

polyether resins such as BLEMMER (registered trademark) ADE-400A and BLEMMER (registered trademark) ADP-400 (all of which are manufactured by NOF CORPORATION);

polycarbonate resins such as polycarbonate diol diacrylate (UBE INDUSTRIES, LTD.);

epoxy resins such as EBECRYL (registered trademark) 3708 (DAICEL-ALLNEX LTD.), CN120, CN120B60, CN120B80, and CN120E50 (all of which are manufactured by Sartomer Arkema Inc.), and HA7851 (Hitachi Chemical Co., Ltd.); and polybutadiene resins such as CN301, CN303, and CN307 (all of which are manufactured by Sartomer Arkema Inc.).

(Photopolymerization Initiator)

The core of the microcapsule may contain at least one photopolymerization initiator.

That is, the microcapsule may contain at least one photopolymerization initiator in the interior thereof.

In a case where the polymerizable group of the microcapsule is a photopolymerizable group (preferably a radically polymerizable group) (particularly, in a case where the core contains a photopolymerizable compound (more preferably a radically polymerizable compound)), the core of the microcapsule preferable contains at least one photopolymerization initiator.

In the case where the core of the microcapsule contains the photopolymerization initiator, sensitivity with respect to active energy rays increases, and therefore a film having excellent hardness can be formed.

In more detail, the microcapsule in the present disclosure has the polymerizable group in at least one of the shell or the core. In the case where the core of the microcapsule contains the photopolymerization initiator, one microcapsule has both the polymerizable group and the photopolymerization initiator. Therefore, a distance between the polymerizable group and the photopolymerization initiator becomes closer than, for example, a case in which the photopolymerization initiator is dispersed in water. The close distance between the polymerizable group and the photopolymerization initiator leads to improvement of curing sensitivity with respect to irradiation with active energy rays (hereinafter, will also be simply referred to as "sensitivity"). As a result, a film having excellent hardness (for example, pencil hardness) is formed.

In addition, in the case where the core of the microcapsule contains the photopolymerization initiator, a photopolymerization initiator exhibiting low solubility in water (for example, a photopolymerization initiator exhibiting solubility equal to or lower than 1.0% by mass in water at 25° C.) or a photopolymerization initiator having low dispersibility in water, both being highly sensitive in the related art, can be used. As a result, a range of selection of the photopolymerization initiator to be used broadens, and hence a range of selection of the light source to be used also broadens. Therefore, curing sensitivity can be improved compared to the related art.

Specific examples of the above-described photopolymerization initiator which is highly sensitive but was hard to be used due to low solubility in water and low dispersibility in water, include a carbonyl compound and an acylphosphine oxide compound to be described later, and the acylphosphine oxide compound is preferable.

As above, in the aqueous dispersion of the present disclosure, the photopolymerization initiator which is highly sensitive but exhibits low solubility in water can be contained in the aqueous dispersion which is an aqueous composition by being contained in the core of the microcapsule.

In addition, as described above, in the case where the core of the microcapsule contains the photopolymerization initiator, one microcapsule has both the polymerizable group and the photopolymerization initiator. Therefore, the distance between the polymerizable group and the photopolymerization initiator becomes closer, leading to improvement of sensitivity with respect to irradiation with active energy rays. As a result, a film having excellent adhesiveness to a substrate is formed.

As the photopolymerization initiator contained in the core of the microcapsule, a known photopolymerization initiator can be appropriately selected.

The photopolymerization initiator is a compound generating a radical, which is a polymerization initiating species, by absorbing light (that is, active energy rays).

As the photopolymerization initiator, a known compound can be used.

Preferable examples of the photopolymerization initiator include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) compound having carbon halogen bond, (m) alkylamine compound, and the like.

Preferable examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77~117, and the like.

More preferable examples of the compounds include the α-thiobenzophenone compound described in JP1972-6416B (JP-S47-6416B), the benzoin ether compound described in JP1972-3981B (JP-S47-3981B), the α-substituted benzoin compound described in JP1972-22326B (JP-S47-22326B), the benzoin derivative described in JP1972-23664B (JP-S47-23664B), the aryolphosphonic acid ester described in JP1982-30704A (JP-S57-30704A), the dialkoxybenzophenone described in JP1985-26483B (JP-S60-26483B), the benzoin ethers described in JP1985-26403B (JP-S60-26403B) and JP1987-81345A (JP-S62-81345A), the α-aminobenzophenones described in JP1989-34242B (JP-H01-34242B), U.S. Pat. No. 4,318,791A, and EP0284561A1, the p-di(dimethylaminobenzoyl)benzene described in JP1990-211452A (JP-H02-211452A), the thio-substituted aromatic ketone described in JP1986-194062A (JP-S61-194062A), the acylphosphine sulfide described in JP1990-9597B (JP-H02-9597B), the acylphosphine described in JP1990-9596B (JP-H02-9596B), the thioxanthones described in JP1988-61950B (JP-S63-61950B), the coumarins described in JP1984-42864B (JP-S59-42864B), the compound described in WO2015/158745A, and the like.

Furthermore, the photopolymerization initiator described in JP2008-105379A or JP2009-114290A is also preferable.

Examples of the commercially available product of the photopolymerization initiator include IRGACURE (registered trademark) 184, 369, 500, 651, 819, 907, 1000, 1300, 1700, and 1870, DAROCUR (registered trademark) 1173, 2959, 4265, and ITX, LUCIRIN (registered trademark) TPO (all of which are manufactured by BASF SE), ESACURE (registered trademark) KTO37, KTO46, KIP150, and EDB (all of which are manufactured by Lamberti S.p.A.), H-Nu (registered trademark) 470 and 470X (all of which are manufactured by Spectra Group Limited, Inc.), Omnipol TX and 9210 (all of which are manufactured by IGM Resins B. V.), Genopol AB-2 (manufactured by RAHN AG), and the like.

Among these, as the photopolymerization initiator, from the viewpoint of sensitivity to UV light, at least one compound selected from (a) carbonyl compound and (b) acylphosphine oxide compound is more preferable, and specific examples thereof include bis(2,4,6-trimethylbenzoyl)-phenylphosphine oxide (for example, IRGACURE (registered trademark) 819 manufactured by BASF SE), 2-(dimethylamine)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example, IRGACURE (registered trademark) 907 manufactured by BASF SE), 1-hydroxy-cyclohexyl-phenyl-ketone (for example, IRGACURE (registered trademark) 184 manufactured by BASF SE), 2-hydroxy-2-methyl-1-phenyl-propan-1-one (for example, IRGACURE (registered trademark) 1173 manufactured by BASF SE), 2,4,6-trimethylbenzoyl-diphenyl-phosphine oxide (for example, DAROCUR (registered trademark) TPO, LUCIRIN (registered trademark) TPO (all of which are manufactured by BASF SE)), and the like.

Among these, from the viewpoint of improving sensitivity and from the viewpoint of suitability for LED light, as the photopolymerization initiator, (b) acylphosphine oxide compound is preferable, and a monoacylphosphine oxide compound (particularly preferably 2,4,6-trimethylbenzoyl-diphenyl-phosphine oxide) or a bisacylphosphine oxide compound (particularly preferably bis(2,4,6-trimethylbenzoyl)-phenylphosphine oxide) is more preferable.

The wavelength of the LED light is preferably 355 nm, 365 nm, 385 nm, 395 nm, or 405 nm.

In a case of manufacturing the microcapsule, the photopolymerization initiator is dissolved as an oil-phase component together with the components constituting the microcapsule, a water-phase component is added to and mixed with the oil-phase component so as to emulsify the obtained mixture, and therefore the internal photopolymerization initiator can be incorporated into the core of the microcapsule.

The content of the photopolymerization initiator is preferably 0.1% by mass to 25% by mass, more preferably 0.5% by mass to 20% by mass, and even more preferably 1% by mass to 15% by mass, with respect to the total solid content of the microcapsule.

—Internal Content Rate of Photopolymerization Initiator—

In the aqueous dispersion of the present disclosure, from the viewpoint of the curing sensitivity of a film, an internal content rate (% by mass) of the photopolymerization initiator is preferably equal to or higher than 10% by mass, more preferably equal to or higher than 50% by mass, even more preferably equal to or higher than 70% by mass, still more preferably equal to or higher than 80% by mass, yet more preferably equal to or higher than 90% by mass, much more preferably equal to or higher than 95% by mass, far more preferably equal to or higher than 97% by mass, and particularly preferably equal to or higher than 99% by mass.

In a case where the aqueous dispersion contains two or more kinds of photopolymerization initiators, it is preferable that the internal content rate of at least one kind of photopolymerization initiator is within the aforementioned preferable range.

The internal content rate (% by mass) of the photopolymerization initiator means the amount of the photopolymerization initiator contained in the core of the microcapsule with respect to the total amount of the photopolymerization initiators in the aqueous dispersion in a case where the aqueous dispersion is prepared and refers to a value obtained as below.

—Method for Measuring Internal Content Rate (% by mass) of Photopolymerization Initiator—

The operation described below is performed under the condition of a liquid temperature of 25° C.

In a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment has been removed.

First, from the aqueous dispersion, two samples (hereinafter, referred to as "sample 1" and "sample 2") of the same mass are collected.

Tetrahydrofuran (THF) having a mass 100 times the mass of the total solid content in the sample 1 is added to and mixed with the sample 1, thereby preparing a diluted solution. The obtained diluted solution is subjected to centrifugation under the condition of 80,000 rpm and 40 minutes. The supernatant (hereinafter, referred to as "supernatant 1") generated by the centrifugation is collected. It is considered that by this operation, all of the photopolymerization initiators contained in the sample 1 is extracted into the supernatant 1. The mass of the photopolymerization initiator contained in the collected supernatant 1 is measured by liquid chromatography (for example, a liquid chromatography device manufactured by Waters Corporation). The obtained mass of the photopolymerization initiator is taken as "total amount of photopolymerization initiator".

Furthermore, the sample 2 is subjected to centrifugation under the same conditions as in the centrifugation performed on the aforementioned diluted solution. The supernatant (hereinafter, referred to as "supernatant 2") generated by the centrifugation is collected. It is considered that by this operation, the photopolymerization initiator that was not contained in the interior of the microcapsule in the sample 2 (that is, the free photopolymerization initiator) is extracted into the supernatant 2. The mass of the photopolymerization initiator contained in the collected supernatant 2 is measured by liquid chromatography (for example, a liquid chromatography device manufactured by Waters Corporation). The obtained mass of the photopolymerization initiator is taken as "amount of the free photopolymerization initiator".

Based on the "total amount of photopolymerization initiator" and the "amount of free photopolymerization initiator" described above, the internal content rate (% by mass) of the photopolymerization initiator is calculated according to the equation shown below.

Internal content rate (% by mass) of photopolymerization initiator=((total amount of photopolymerization initiator−amount of free photopolymerization initiator)/total amount of photopolymerization initiator)×100

In a case where the aqueous dispersion contains two or more kinds of photopolymerization initiators, by using the total amount of the two or more kinds of photopolymerization initiators as "total amount of photopolymerization initiators" and using the total amount of the two or more kinds of free photopolymerization initiators as "amount of free photopolymerization initiators", the total internal content rate of the two or more kinds of photopolymerization initiators may be determined. Alternatively, by using the amount of one kind of photopolymerization initiator as "total amount of photopolymerization initiator" and using the amount of the other one kind of free photopolymerization initiator as "amount of free photopolymerization initiator", the internal content rate of any one kind of photopolymerization initiator may be determined.

Whether or not the components (for example, a polymerizable compound to described later) other than the photopolymerization initiator are contained in the core of the microcapsule can be checked by the same method as the method for investigating whether or not the photopolymerization initiator is contained in the core of the microcapsule.

For a compound having a molecular weight equal to or greater than 1,000, by measuring the masses of the compounds contained in the supernatant 1 and the supernatant 2 described above by gel permeation chromatography (GPC) and taking the masses as "total amount of compound" and "amount of free compound" respectively, the internal content rate (% by mass) of the compound is determined.

In the present specification, in the measurement by a gel permeation chromatography (GPC), HLC (registered trademark)-8020 GPC (manufactured by Tosoh Corporation) may be used as a measurement device, three columns of TSKgel (registered trademark) Super Multipore HZ-H (4.6 mm ID×15 cm, manufactured by Tosoh Corporation) may be used as columns, and tetrahydrofuran (THF) may be used as an eluent. Furthermore, GPC is performed using a differential refractive index (RI) detector under the measurement conditions of a sample concentration of 0.45% by mass, a flow rate of 0.35 ml/min, a sample injection amount of 10 μL, and a measurement temperature of 40° C.

A calibration curve is prepared from 8 samples of "Standard Sample TSK standard, polystyrene" manufactured by Tosoh Corporation: "F-40", "F-20", "F-4", "F-1", "A-5000", "A-2500", "A-1000", and "n-propylbenzene".

(Photothermal Conversion Agent)

In the case where the core of the microcapsule contains the thermally polymerizable compound as a polymerizable compound (preferably a thermally polymerizable monomer), the core may contain at least one photothermal conversion agent.

The photothermal conversion agent is a compound which absorbs light such as infrared rays (that is, active energy rays) and generates heat so as to polymerize and cure the thermally polymerizable compound. As the photothermal conversion agent, a known compound can be used.

As the photothermal conversion agent, an infrared ray absorbent is preferable. Examples of the infrared ray absorbent include polymethylindolium, indocyanine green, a polymethine coloring agent, a croconium coloring agent, a cyanine coloring agent, a merocyanine coloring agent, a squarilium coloring agent, a chalcogenopyrylo arylidene coloring agent, a metal thiolate complex coloring agent, a bis(chalcogenopyrylo)polymethine coloring agent, an oxyindolizine coloring agent, a bisaminoallyl polymethine coloring agent, an indolizine coloring agent, a pyrylium coloring agent, a quinoid coloring agent, a quinone coloring agent, a phthalocyanine coloring agent, a naphthalocyanine coloring agent, an azo coloring agent, an azomethine coloring agent, carbon black, and the like.

In a case of manufacturing the microcapsule, the photothermal conversion agent is dissolved as an oil-phase component together with the components constituting the microcapsule, a water-phase component is added to and mixed with the oil-phase component so as to emulsify the obtained mixture, and therefore the photothermal conversion agent can be incorporated into the core of the microcapsule.

The photothermal conversion agent may be used alone or two or more kinds thereof may be used in combination.

The content of the photothermal conversion agent is preferably 0.1% by mass to 25% by mass, more preferably 0.5% by mass to 20% by mass, and even more preferably 1% by mass to 15% by mass, with respect to the total solid content of the microcapsule.

An internal content rate (% by mass) of the photothermal conversion agent and a method for measuring an internal content rate are based on an internal content rate of the photopolymerization initiator and a method for measuring an internal content rate.

(Thermal Curing Accelerator)

In the case where the core of the microcapsule contains the thermally polymerizable compound as a polymerizable compound (preferably a thermally polymerizable monomer), the core may contain at least one thermal curing accelerator.

The thermal curing accelerator is a compound that catalytically promotes the thermal curing reaction of the thermally polymerizable compound (preferably a thermally polymerizable monomer).

As the thermal curing accelerator, a known compound can be used. As the thermal curing accelerator, an acid or a base, and a compound that generates an acid or a base by heating are preferable, and examples thereof include a carboxylic acid, a sulfonic acid, a phosphoric acid, an aliphatic alcohol, phenol, aliphatic amine, aromatic amine, imidazole (for example, 2-methylimidazole), pyrazole, and the like.

In a case of manufacturing the microcapsule, the thermal curing accelerator is mixed with the components constituting the microcapsule and dissolved as an oil-phase, a water-phase is added to and mixed with the oil-phase so as to emulsify the obtained mixture, and therefore the thermal curing accelerator can be incorporated into the core of the microcapsule.

The photothermal conversion agent may be used alone or two or more kinds thereof may be used in combination.

The content of the thermal curing accelerator is preferably 0.1% by mass to 25% by mass, more preferably 0.5% by mass to 20% by mass, and even more preferably 1% by mass to 15% by mass, with respect to the total solid content of the microcapsule.

An internal content rate (% by mass) of the thermal curing accelerator and a method for measuring an internal content rate are based on an internal content rate of the photopolymerization initiator and a method for measuring an internal content rate.

(Water)

The aqueous dispersion of the present disclosure contains water as a dispersion medium of the microcapsule.

The content of water in the aqueous dispersion is not particularly limited, and for example, is preferably 10% by mass to 99% by mass, more preferably 20% by mass to 95% by mass, even more preferably 30% by mass to 90% by mass, and particularly preferably 50% by mass to 90% by mass with respect to the total amount of the aqueous dispersion.

(Sensitizer)

The aqueous dispersion of the present disclosure may contain at least one sensitizer.

In a case where the core of the microcapsule contains the photopolymerization initiator, it is preferable that the sensitizer is contained in the core of the microcapsule from the viewpoint of further increasing reactivity between the photopolymerization initiator. In a case where the core of the microcapsule contains the photopolymerization initiator and the sensitizer, the decomposition of the photopolymerization initiator by the irradiation with active energy rays can be further accelerated.

The sensitizer is a substance which becomes in an electron-excited state by absorbing specific active energy rays. By coming into contact with the photopolymerization initiator, the sensitizer in the electron-excited state performs an action such as electron transfer, energy transfer, or heating. As a result, the chemical change of the photopolymerization initiator, that is, the decomposition, the generation of a radical, an acid, or a base, or the like is accelerated.

Examples of the sensitizer include benzophenone, thioxanthone, isopropylthioxanthone, anthraquinone, a 3-acylcoumarin derivative, terphenyl, styryl ketone, 3-(aroylmethylene)thiazolyl, camphorquinone, eosin, rhodamine, erythrosine, and the like.

Furthermore, as the sensitizer, the compound represented by General Formula (i) described in JP2010-24276A and the compound represented by General Formula (I) described in JP1994-107718A (JP-H06-107718A) can also be suitably used.

Furthermore, the compounds described in WO2015/158745A, specifically tertiary aliphatic amines (for example, methyldiethanolamine, dimethylethanolamine, triethanolamine, triethylamine, and N-methylmorpholine); aromatic amines (for example, amyl para dimethylaminobenzoate, 2-butoxyethyl 4-(dimethylamino)benzoate, 2-(dimethylamino)ethyl benzoate, ethyl 4-(dimethylamino) benzoate, and 2-ethylhexyl 4-(dimethylamino)benzoate; (meth)acrylated amines [for example, dialkylaminoalkyl (meth)acrylate (such as diethylaminoethyl acrylate) and N-alkylmorpholine (meth)acrylate (such as N-alkylmorpholine acrylate)], and the like can be suitably used.

Among the above compounds, as the sensitizer, from the viewpoints of the suitability for LED light and the reactivity with the photopolymerization initiator, at least one selected from the group consisting of thioxanthone, isopropylthioxanthone, and benzophenone is preferable, at least one selected from thioxanthone and isopropylthioxanthone is more preferable, and isopropylthioxanthone is even more preferable.

In a case where the core of the microcapsule includes the sensitizer, the core may include one kind of the sensitizer or may include two or more kinds thereof.

In a case where the core of the microcapsule contains the sensitizer, a content of the sensitizer is preferably 0.1% by mass to 25% by mass, more preferably 0.5% by mass to 20% by mass, and even more preferably 1% by mass to 15% by mass, with respect to the total solid content of the microcapsule.

(Coloring Material)

The aqueous dispersion of the present disclosure may contain at least one coloring material.

In a case where the aqueous dispersion of the present disclosure contains a coloring material, the coloring material is preferably contained in the exterior of the microcapsule.

The coloring material is not particularly limited and can be used by being arbitrarily selected from known coloring materials such as a pigment, a water-soluble dye, and a dispersed dye. Among these, the pigment is more preferable as the coloring material, because the pigment has excellent weather fastness and a high level of color reproducibility.

The pigment is not particularly and can be appropriately selected according to the purpose.

Examples of the pigment include known organic pigments and inorganic pigments.

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, a white pigment, and the like.

In addition, examples of the pigment include surface-treated pigments (those obtained by treating pigment surfaces with a dispersant such as a resin, a pigment derivative, and the like, and a self-dispersing pigment having a hydrophilic group on a particle surface, and the like). Furthermore, as the pigment, pigment dispersions on the market may be used.

Among these, as the pigment, at least one pigment selected from a pigment of which a pigment surface is treated with a resin having a hydrophilic group, and a self-dispersing pigment having a hydrophilic group on a particle surface is preferably used. As the hydrophilic group, an anionic group (a carboxy group, a phosphoric acid group, a sulfonic acid group, and the like) is preferable.

In the present specification, the term "self-dispersing pigment" refers to a pigment and the like which is obtained by, to a pigment surface, directly linking or indirectly bonding a plurality of hydrophilic functional groups and/or a salt thereof (hereinafter will also be referred to as "dispersibility imparting group") via an alkyl group, an alkyl ether group, an aryl group, and the like, and which exhibits at least one of water dispersibility or water solubility under absence of a dispersant for dispersing the pigment and the like so as to be able to maintain a dispersion state in the aqueous dispersion (for example, an ink).

For example, generally, an ink containing the self-dispersing pigment as a colorant does not necessarily contain a dispersant that is to be contained to disperse the pigment, and therefore is advantageous in that foaming caused by deterioration of an anti-foaming property due to the dispersant occurs less, leading to easy preparation of an ink having excellent jetting stability.

Examples of the dispersibility imparting group bonded to the surface of the self-dispersing pigment include —COOH, —CO, —OH, —SO$_3$H, —PO$_3$H$_2$, and quaternary ammonium, and salts thereof. In regard to the bonding of the dispersibility imparting group, the pigment subjected to a physical treatment or a chemical treatment so as to bond (graft) an active species having the dispersibility imparting group or the dispersibility imparting group to the pigment surface. Examples of the physical treatment include a vacuum plasma treatment and the like. Examples of the chemical treatment include a wet oxidation method in which the pigment surface is oxidized with an oxidizing agent in water, a method in which a carboxy group is bonded via a phenyl group by bonding p-aminobenzoic acid to the pigment surface, and the like.

Preferable examples of the self-dispersing pigment include a self-dispersing pigment which is surface-treated by oxidation treatment using a hypohalous acid and/or a salt of a hypohalous acid as an oxidizing agent or oxidation treatment using ozone as an oxidizing agent.

As the self-dispersing pigment, a commercially available product may be used.

Examples of the commercially available product of the self-dispersing pigment include MICROJET CW-1 (trade name; Orient Chemical Industries Co., Ltd.), CAB-O-JET (registered trademark) 200, CAB-O-JET (registered trademark) 300, and CAB-O-JET (registered trademark) 450C (trade name; Cabot Corporation), and the like.

In a case where a pigment is used as a coloring material, a pigment dispersant may be used in a case of preparing pigment particles as necessary.

Regarding the coloring material such as a pigment and the pigment dispersant, paragraphs "0180" to "0200" in JP2014-040529A can be referred to as appropriate.

(Other Components)

If necessary, the aqueous dispersion of the present disclosure may contain other components in addition to the components described above.

The other components may be contained in the cell of the microcapsule (that is, the interior of the microcapsule) or may be contained in the exterior of the microcapsule.

—Organic Solvent—

The aqueous dispersion of the present disclosure may contain at least one organic solvent.

In a case where the aqueous dispersion of the present disclosure contains an organic solvent, the adhesiveness between the film and the substrate can be further improved.

In a case where the aqueous dispersion of the present disclosure contains the organic solvent, a content of the organic solvent is preferably 0.05% by mass to 50% by mass and more preferably 0.1% by mass to 20% by mass with respect to the total amount of the aqueous dispersion.

Specific examples of the organic solvent are as below.

Alcohols (methanol, ethanol, propanol, isopropanol, butanol, isobutanol, sec-butanol, tert-butanol, pentanol, hexanol, cyclohexanol, benzyl alcohol, and the like)

Polyhydric alcohols (ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 2-methylpropanediol, and the like)

Polyhydric alcohol ethers (ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, and the like)

Amines (ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, and the like)

Amides (formamide, N,N-dimethylformamide, N,N-dimethylacetamide, and the like)

Heterocyclic rings (2-pyrrolidone, N-methyl-2-pyrrolidone, cyclohexyl pyrrolidone, 2-oxazolidone, 1,3-dimethyl-2-imidazolidinone, γ-butyrolactone, and the like)

Sulfoxides (dimethyl sulfoxide and the like)

Sulfones (sulfolane and the like)

Others (urea, acetonitrile, acetone, and the like)

—Surfactant—

The aqueous dispersion of the present disclosure may contain at least one surfactant.

In a case where the aqueous dispersion of the present disclosure contains the surfactant, wettability of the aqueous dispersion to a substrate is improved.

Examples of the surfactant include nonionic surfactants such as polyoxyethylene alkyl ethers, polyoxyethylene alkyl allyl ethers, acetylene glycols, polyoxyethylene/polyoxypropylene block copolymers, and siloxanes, and the like.

In addition, examples of the surfactant include an organic fluoro compound. The organic fluoro compound is preferably hydrophobic.

Examples of the organic fluoro compound include a fluorine-based surfactant, an oil-like fluorine-based compound (for example, fluorine oil), a solid-like fluorine compound resin (for example tetrafluoroethylene resin), and organic fluoro compounds described in JP1982-9053B (JP-S57-9053B) (the eighth column to the seventeenth column) and JP1987-135826A (JP-S62-135826A) can be exemplified.

As described above, in the aqueous dispersion of the present disclosure, the shell of the microcapsule has the three-dimensional cross-linked structure containing the neutralized acid group, and the degree of neutralization of the acid group contained in the three-dimensional cross-linked structure is from 50% to 100%, and thus the dispersion stability of the microcapsule becomes excellent. Therefore, it is possible to not to substantially contain an anionic surfactant which is to be added to improve the dispersibility.

The phrase "not to substantially contain" means that the content of the anionic surfactant is 1% by mass or less (preferably 0.1% by mass or less) with respect to the total amount of the aqueous dispersion.

The aspect in which the aqueous dispersion substantially does not contain the anionic surfactant is advantageous in that foaming of the aqueous dispersion can be suppressed. In addition, a case where a pigment dispersion having an anionic dispersing group is combined with the microcapsule dispersion liquid, is particularly advantageous in that an increase in an ion concentration in a system due to the anionic surfactant, leading to a decrease in a degree of ionization of the anionic pigment dispersant and thus a decrease in the dispersibility of the pigment, can be suppressed.

In the aqueous dispersion of the present disclosure, an aspect in which the content of the anionic surfactant is 1% by mass or less with respect to the total amount of the aqueous dispersion, is adopted.

—Polymerization Inhibitor—

The aqueous dispersion of the present disclosure may contain a polymerization inhibitor.

In a case where the aqueous dispersion of the present disclosure contains the polymerization inhibitor, the storage stability of the aqueous dispersion can be further improved.

Examples of the polymerization inhibitor include p-methoxyphenol, quinones (hydroquinone, benzoquinone, methoxybenzoquinone, and the like), phenothiazine, catechols, alkyl phenols (dibutylhydroxytoluene (BHT) and the like), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidin-1-oxyl (TEMPO), 2,2,6,6-tetramethyl-4-hydroxypiperidin-1-oxyl (TEMPOL), cupferron Al, a tris(N-nitroso-N-phenylhydroxylamine)aluminum salt, and the like.

Among these, as the polymerization inhibitor, at least one kind of compound selected from the group consisting of p-methoxyphenol, catechols, quinones, alkyl phenols, TEMPO, TEMPOL, cupferron Al, and a tris(N-nitroso-N-phenylhydroxylamine)aluminum salt is preferable, and at least one kind of compound selected from the group consisting of p-methoxyphenol, hydroquinone, benzoquinone, BHT, TEMPO, TEMPOL, cupferron Al, and a tris(N-nitroso-N-phenylhydroxylamine)aluminum salt is more preferable.

—Ultraviolet Absorber—

The aqueous dispersion of the present disclosure may contain an ultraviolet absorber. In a case where the aqueous dispersion of the present disclosure contains an ultraviolet absorber, the weather fastness and the like of the film can be further improved.

Examples of the ultraviolet absorber are not particularly limited and include known ultraviolet absorbers such as a benzotriazole-based compound, a benzophenone-based compound, a triazine-based compound, a benzoxazole-based compound, and the like.

(Component Capable of Being Contained in the Exterior of Microcapsule)

The aqueous dispersion of the present disclosure may contain, in the exterior of the microcapsule, a photopolymerization initiator, a polymerizable compound, a water-soluble resin, a water-dispersible resin, or the like as necessary, from the viewpoint of controlling film properties, adhesiveness, and jetting properties.

The phrase "aqueous dispersion contains a photopolymerization initiator in the exterior of the microcapsule" means that the aqueous dispersion contains a photopolymerization initiator that is not contained in the core of the microcapsule. The same applied to a case in which a polymerizable compound, a water-soluble resin, a water-dispersible resin, or the like is contained in the exterior of the microcapsule.

—Photopolymerization Initiator Capable of Being Contained in the Exterior of Microcapsule—

Examples of the photopolymerization initiator capable of being contained in the exterior of the microcapsule include the same photopolymerization initiator as described above (photopolymerization initiator contained in the interior of the microcapsule).

As the photopolymerization initiator capable of being contained in the exterior of the microcapsule, a water-soluble or water-dispersible photopolymerization initiator is preferable. Specifically, preferable examples thereof include DAROCUR (registered trademark) 1173, IRGACURE (registered trademark) 2959, IRGACURE (registered trademark) 754, DAROCUR (registered trademark) MBF, IRGACURE (registered trademark) 819DW, and IRGACURE (registered trademark) 500 (all of which are manufactured by BASF SE), an acylphosphine oxide compound described in WO2014/095724A, and the like.

The term "water-soluble" used for the photopolymerization initiator capable of being contained in the exterior of the microcapsule refers to a property in which in a case where the resin is dried for 2 hours at 105° C., the amount of the resin dissolving in 100 g of distilled water having a temperature of 25° C. is greater than 1 g.

Furthermore, the term "water-dispersible" used for the photopolymerization initiator capable of being contained in the exterior of the microcapsule refers to a property in which the resin is water-insoluble but is dispersed in water. Herein, "water-insoluble" refers to a property in which in a case where the resin is dried for 2 hours at 105° C., the amount of the resin dissolving in 100 g of distilled water with a temperature of 25° C. is equal to or smaller than 1 g.

—Polymerizable Compound Capable of Being Contained in the Exterior of Microcapsule—

Examples of the polymerizable compound capable of being contained in the exterior of the microcapsule include radically polymerizable compounds such as a compound having an ethylenically unsaturated group, acrylonitrile, styrene, unsaturated polyester, unsaturated polyether, unsaturated polyamide, and unsaturated urethane.

Among these, as the polymerizable compound capable of being contained in the exterior of the microcapsule, a compound having an ethylenically unsaturated group is preferable, and a compound having a (meth)acryloyl group is particularly preferable. Furthermore, as the polymerizable compound capable of being contained in the exterior of the microcapsule, a water-soluble or a water-dispersible polymerizable compound is preferable.

The term "water-soluble" used for the water-soluble polymerizable compound has the same meaning as the term "water-soluble" used for the "water-soluble photopolymerization initiator" described above, and the term "water-dispersible" used for the water-dispersible polymerizable compound has the same meaning as the term "water-dispersible" used for the "water-dispersible photopolymerization initiator" described above.

From the viewpoint of the water solubility or the water dispersibility, as the polymerizable compound capable of being contained in the exterior of the microcapsule, a compound having at least one kind of structure selected from the group consisting of an amide structure, a polyethylene glycol structure, a polypropylene glycol structure, a carboxy group, and a salt of a carboxy group is preferable.

From the viewpoint of the water solubility or the water dispersibility, as the polymerizable compound capable of being contained in the exterior of the microcapsule, for example, at least one kind of compound selected from the group consisting of (meth)acrylic acid, sodium (meth)acrylate, potassium (meth)acrylate, N,N-dimethylacrylamide, N,N-diethylacrylamide, morpholine acrylamide, N-2-hydroxyethyl (meth)acrylamide, N-vinyl pyrrolidone, N-vinylcaprolactam, 2-hydroxyethyl (meth)acrylate, 3-hydroxypropyl (meth)acrylate, 2-hydroxypropyl (meth)acrylate, glycerin monomethacrylate, N-[tris(3-acryloylaminopropyloxymethylene)methyl]acrylamide, diethylene glycol bis(3-acryloylaminopropyl)ether, polyethylene glycol di(meth)acrylate, polypropylene glycol di(meth)acrylate, compounds represented by General Formulas (a) to (d), and ethoxylated trimethylolpropane triacrylate (for example, SR9035 manufactured by Sartomer Arkema Inc.) is preferable, and at least one kind of compound selected from the group consisting of (meth)acrylic acid, N,N-dimethylacrylamide, N-2-hydroxyethyl (meth)acrylamide, 2-hydroxyethyl (meth)acrylate, glycerin monomethacrylate, N-[tris(3-acryloylaminopropyloxymethylene)methyl]acrylamide, diethylene glycol bis(3-acryloylaminopropyl)ether, polyethylene glycol di(meth)acrylate, polypropylene glycol di(meth)acrylate, compounds represented by General Formulas (a) to (d), and ethoxylated trimethylolpropane triacrylate (for example, SR9035 manufactured by Sartomer Arkema Inc.) is more preferable.

General Formula (a)

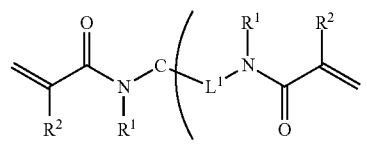

General Formula (b)

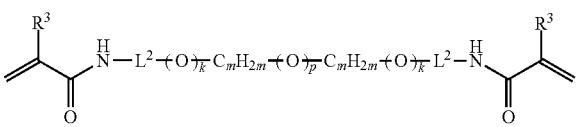

General Formula (c)

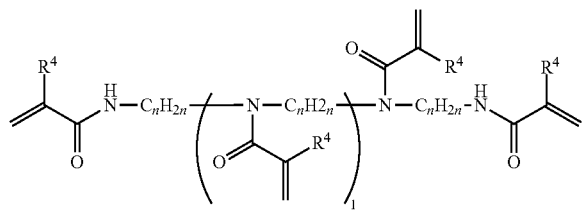

General Formula (d)

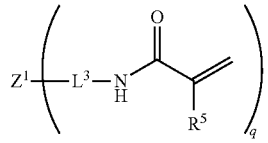

In General Formula (a), a plurality of $R^1$'s each independently represent a hydrogen atom, an alkyl group, an aryl group or a heterocyclic group, a plurality of $R^2$'s each independently represent a hydrogen atom or a methyl group, and a plurality of $L^1$'s each independently represent a single bond or a divalent linking group.

In General Formula (b), a plurality of $R^3$'s each independently represent a hydrogen atom or a methyl group, a plurality of $L^2$'s each independently represent an alkylene group having from 1 to 8 carbon atoms, a plurality of k's and p each independently represent 0 or 1, and a plurality of m's each independently represent an integer of 0 to 8, provided that at least one of k's or p is 1.

In General Formula (c), a plurality of $R^4$'s each independently represent a hydrogen atom or a methyl group, a plurality of n's each independently represent an integer of 1 to 8, 1 represents an integer of 0 or 1.

In General Formula (d), $Z^1$ represents a residue obtained by removing q hydrogen atoms from the hydroxyl group of the polyol, q represents an integer of 3 to 6, a plurality of $R^5$'s each independently represent a hydrogen atom or a methyl group, and a plurality of $L^3$'s each independently represent an alkylene group having from 1 to 8 carbon atoms.

Specific examples of the compounds represented by General Formula (a) to General Formula (d) include compounds represented by the following AM-1 to AM-4.

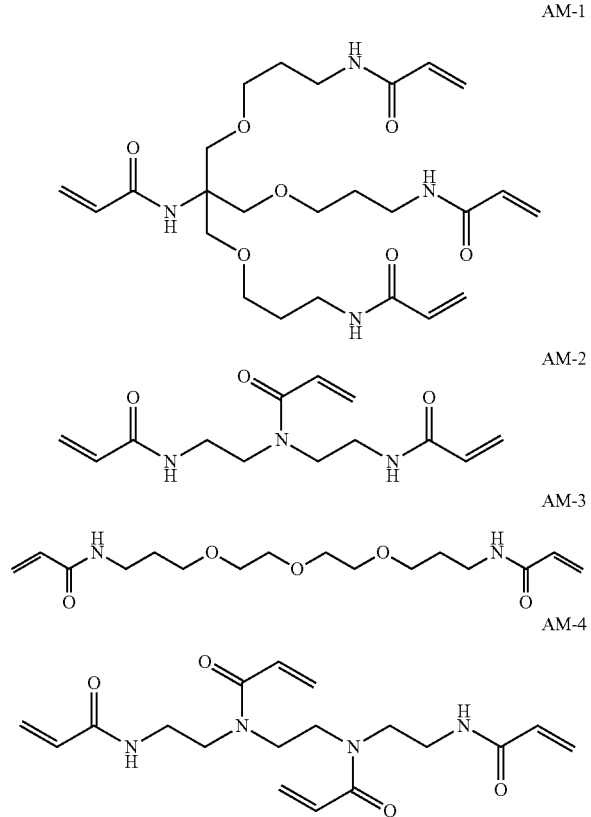

The above AM-1 to AM-4 can be synthesized by a method described in JP5591858B.

—Water-Soluble Resin or Water-Dispersible Resin Capable of Being Contained in the Exterior of Microcapsule—

A structure of the water-soluble resin or the water-dispersible resin capable of being contained in the exterior of the microcapsule is not particularly limited and may be an arbitrary structure. Examples of the structure of the water-soluble resin or the water-dispersible resin capable of being contained in the exterior of the microcapsule include structures such as a chain structure, a branched structure, a star structure, a cross-linked structure, and a network structure.

The term "water-soluble" used for the water-soluble resin capable of being contained in the exterior of the microcapsule has the same meaning as the term "water-soluble" used for the "photopolymerization initiator capable of being contained in the exterior of the microcapsule" described above, and the term "water-dispersible" used for the water-dispersible resin capable of being contained in the exterior of the microcapsule has the same meaning as the term "water-dispersible" used for the "photopolymerization initiator capable of being contained in the exterior of the microcapsule" described above.

In addition, the water-soluble resin or the water-dispersible resin is preferably a resin having a functional group selected from the group consisting of a carboxy group, a salt of a carboxy group, a sulfo group, a salt of a sulfo group, a sulfate group, a salt of a sulfate group, a phosphonic acid group, a salt of a phosphonic acid group, a phosphoric acid group, a salt of a phosphoric acid group, an ammonium base, a hydroxyl group, a carboxylic acid amide group, and an alkyleneoxy group.

As a countercation of the aforementioned salt, an alkali metal cation such as sodium or potassium, an alkali earth metal cation such as calcium or magnesium, an ammonium cation, or a phosphonium cation is preferable, and an alkali metal cation is particularly preferable.

As an alkyl group contained in the ammonium group of the ammonium base, a methyl group or an ethyl group is preferable.

In addition, as a counteranion of the ammonium base, a halogen anion such as chlorine or bromine, a sulfate anion, a nitrate anion, a phosphate anion, a sulfonate anion, a carboxylate anion, or a carbonate anion is preferable, and a halogen anion, a sulfonate anion, or a carboxylate anion is particularly preferable.

As a substituent on a nitrogen atom of the carboxylic acid amide group, an alkyl group having from 8 or less carbon atoms is preferable, and an alkyl group having from 6 or less carbon atoms is particularly preferable.

The resin having an alkyleneoxy group preferably has an alkyleneoxy chain formed of repeating alkyleneoxy groups. The number of alkyleneoxy groups contained in the alkyleneoxy chain is preferably 2 or greater, and particularly preferably 4 or greater.

<Preferable Physical Properties of Aqueous Dispersion>

In a case where the temperature of the aqueous dispersion of the present disclosure is set at a range of 25° C. to 50° C., the viscosity of the aqueous dispersion is preferably 3 mPa·s to 15 mPa·s, and more preferably 3 mPa·s to 13 mPa·s. Particularly, in a case where the temperature of the aqueous dispersion of the present disclosure is 25° C., the viscosity of the aqueous dispersion is preferably equal to or lower than 50 mPa·s. In a case where the viscosity of the aqueous dispersion is within the above range, in a case of adopting the aqueous dispersion for ink jet recording as an ink composition, a high level of jetting stability can be realized.

The viscosity of the aqueous dispersion is a value measured using a viscometer (VISCOMETER TV-22, manufactured by TOKI SANGYO CO., LTD).

[Method for Manufacturing Aqueous Dispersion]

The method for manufacturing an aqueous dispersion of the present disclosure is not particularly limited, as long as the above-described aqueous dispersion can be manufactured.

As the method for manufacturing an aqueous dispersion of the present disclosure, from the viewpoint of easily obtaining the above-described aqueous dispersion, a method for manufacturing an aqueous dispersion of the present embodiment which will be described below is preferable.

The method for manufacturing the aqueous dispersion of the present embodiment (hereinafter, will also be referred to as "the manufacture method of the present embodiment") includes a microcapsule-forming step of mixing an oil-phase component containing an organic solvent, a tri- or higher functional isocyanate compound, and a compound selected from an isocyanate compound into which a polymerizable group is introduced and a polymerizable compound, with a water-phase component containing a compound having an acid group and an active hydrogen group, a basic compound, and water, and emulsifying the obtained mixture so as to form the above-described microcapsule.

The manufacture method of the present embodiment preferably includes a step (hereinafter, will also be referred to as "the water-phase component preparation step") of preparing the water-phase component in which the degree of neutralization of the acid group of the compound having the acid group and the active hydrogen group is adjusted to from 50% to 100% by using a basic compound, before the microcapsule-forming step.

<Microcapsule-Forming Step>

The microcapsule-forming step is a step of mixing an oil-phase component containing an organic solvent, a tri- or higher functional isocyanate compound, and a compound selected from an isocyanate compound into which a polymerizable group is introduced and a polymerizable compound, with a water-phase component containing a compound having an acid group and an active hydrogen group, a basic compound, and water, and emulsifying the obtained mixture so as to form the above-described microcapsule.

The oil-phase component used in the microcapsule-forming step contains an organic solvent, a tri- or higher functional isocyanate compound, and a compound selected from an isocyanate compound into which a polymerizable group is introduced and a polymerizable compound.

The polymerizable compound is a compound having the polymerizable group (excluding an isocyanate compound into which the polymerizable group is introduced).

All of the polymerizable group in the isocyanate compound into which the polymerizable group is introduced, and the polymerizable group in the polymerizable compound may be the photopolymerizable groups (for example, radically polymerizable groups), or may be the thermally polymerizable groups.

The oil-phase component preferably contains at least one of the isocyanate compound into which the photopolymerizable group (for example, the radically polymerizable group) is introduced, or the photopolymerizable compound (for example, the radically polymerizable compound), or contains at least one of the isocyanate compound into which the thermally polymerizable group is introduced, or the thermally polymerizable compound.

In the case where the oil-phase component preferably contains at least one of the isocyanate compound into which the photopolymerizable group (for example, the radically polymerizable group) is introduced, or the photopolymerizable compound (for example, the radically polymerizable compound), the oil-phase component preferably further contains the photopolymerization initiator.

The water-phase component used in the microcapsule-forming step contains the compound having an acid group and an active hydrogen group, the basic compound, and water.

In the microcapsule-forming step, the oil-phase component is mixed with the water-phase component, the obtained mixture is emulsified, and therefore the microcapsule in which the shell having the three-dimensional cross-linked structure is formed is formed so as to surround the core. The formed microcapsule is a dispersoid in the manufactured aqueous dispersion.

Meanwhile, water in the water-phase component is a dispersion medium in manufactured the aqueous dispersion.

In more detail, in the microcapsule-forming step, the shell having the three-dimensional cross-linked structure containing a urea bond is formed by a reaction between a tri- or higher functional isocyanate compound and water.

A case in which the tri- or higher functional isocyanate compound has a urethane bond means that a urethane bond is also contained in the three-dimensional cross-linked structure of the shell.

In a case where at least one of the oil-phase component or the water-phase component contains the above-described compound having two or more active hydrogen groups, the shell having the three-dimensional cross-linked structure containing a urethane bond is formed by a reaction between a tri- or higher functional isocyanate compound and the compound having two or more active hydrogen groups.

In addition, in the microcapsule-forming step, the compound having the acid group and the active hydrogen group is allowed to react with the basic compound as a neutralizer, and therefore the acid group is neutralized. The compound having the acid group and the active hydrogen group also relates to the reaction for forming the shell. In a case where the active hydrogen group included in the compound having the acid group and the active hydrogen group is an amino group for example, the acid group is introduced into the shell via a urea bond by a reaction between the tri- or higher functional isocyanate compound and the compound having the acid group and the active hydrogen group. As a result, the shell having the three-dimensional cross-linked structure containing the neutralized acid group (that is, a salt of the acid group) and a urea bond, is formed.

Meanwhile, in the case where the active hydrogen group included in the compound having the acid group and the active hydrogen group is a hydroxyl group for example, the acid group is introduced into the shell via a urethane bond by a reaction between the tri- or higher functional isocyanate compound and the compound having the acid group and the active hydrogen group. As a result, the shell having the three-dimensional cross-linked structure containing the neutralized acid group (that is, a salt of the acid group) and a urethane bond, is formed.

In the aspect in which the acid group is introduced into the three-dimensional cross-linked structure of the shell via a urea bond, a urea bond is less susceptible to hydrolysis than a urethane bond, and therefore the acid group is present in a state of being more firmly bonded to the three-dimensional cross-linked structure of the shell, thereby making the storage stability of the aqueous dispersion excellent.

The salt of the acid group introduced into the shell functions as a hydrophilic group and is excellent for the effect of dispersing the microcapsule in water. The degree of neutralization of the acid group can be adjusted according to an amount of basic compound, and the like.

In the case where the oil-phase component contains the isocyanate compound into which the polymerizable group is introduced, the isocyanate compound into which the polymerizable group is introduced also relates to the reaction for forming the shell, and therefore the polymerizable group is introduced into the shell, thereby forming the shell having the polymerizable group.

Meanwhile, the case where the oil-phase component contains the polymerizable compound, means that the polymerizable compound is contained in the core.

Examples of the organic solvent contained in the oil-phase component include ethyl acetate, methyl ethyl ketone, and the like.

It is preferable that at least some of the organic solvent is removed during the formation process of the microcapsule or after the formation of the microcapsule.

The detailed description of the tri- or higher functional isocyanate compound contained in the oil-phase component is as described in the above section of the "Aqueous Dispersion".

The detailed description of the isocyanate compound into which the polymerizable group is introduced, which is contained in the oil-phase component, and the polymerizable compound is as described in the above section of the "Aqueous Dispersion".

If necessary, the oil-phase component may contain other components in addition to the aforementioned components.

Examples of the other components include the photopolymerization initiator, the photothermal conversion agent, the thermal curing accelerator, the sensitizer, and the like. The photopolymerization initiator, the photothermal conversion agent, the thermal curing accelerator, and the sensitizer can be contained in the core of the microcapsule by being incorporated into the oil-phase component.

The detailed description of the photopolymerization initiator, the photothermal conversion agent, the thermal curing accelerator, and the sensitizer is as described in the above section of the "Aqueous Dispersion".

In addition, examples of the other components include the above-described compound having the nonionic group (preferably, the above-described isocyanate compound in which the nonionic group is added).

In a case where the oil-phase component contains the compound having the nonionic group, the nonionic group is introduced into the shell, thereby forming the shell having the nonionic group.

The compound having the acid group and the active hydrogen group, which is contained in the water-phase component, is not particularly limited. Examples of the acid group include a carboxy group, a salt of a carboxy group, a sulfo group, a salt of a sulfo group, a phosphoric acid group, a salt of a phosphoric acid group, a phosphonic acid group, a salt of a phosphonic acid group, a sulfate group, a salt of a sulfate group, and the like. As the "salt", an alkali metal salt is preferable, and a sodium salt or a potassium salt is more preferable.

Among these, as the acid group, at least one selected from the group consisting of a carboxy group, a salt of a carboxy group, a sulfo group, a salt of a sulfo group, a phosphoric acid group, and a salt of a phosphoric acid group is preferable, and at least one selected from a carboxy group and a salt of a carboxy group is more preferable, from the viewpoint of the dispersion stability of the microcapsule.

Examples of the active hydrogen group include a hydroxyl group, an amino group (a primary amino group and a secondary amino group), a mercapto group, and the like, as described above.

The compound having the acid group and the active hydrogen group may have only one kind of each of the acid group and the active hydrogen group, may have one kind of any one of the acid group and the active hydrogen group and have two or more kinds of the other group, or may have two or more kinds of both of the acid group and the active hydrogen group.

Examples of the compound having an acid group and an active hydrogen group include amino acids such as α-amino acids (lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine), malic acids, taurine, ethanolamine phosphate (EAP), and the like.

Examples of the compound having an acid group and an active hydrogen group include the following specific examples, other than the compounds described above.

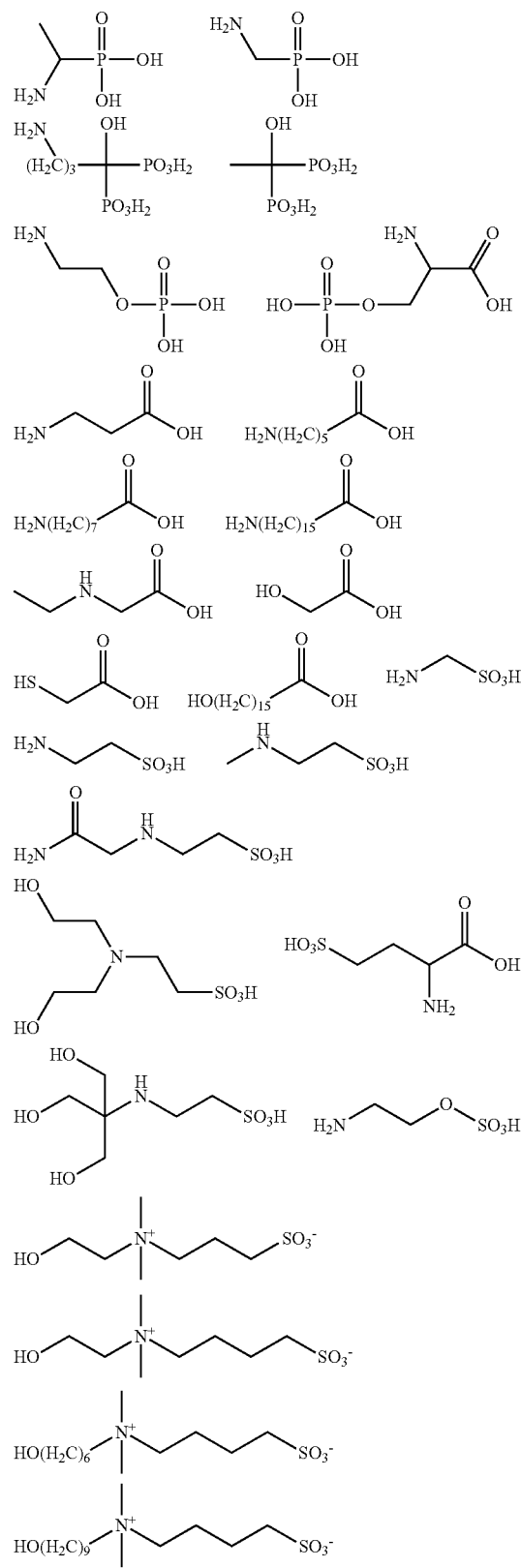

-continued

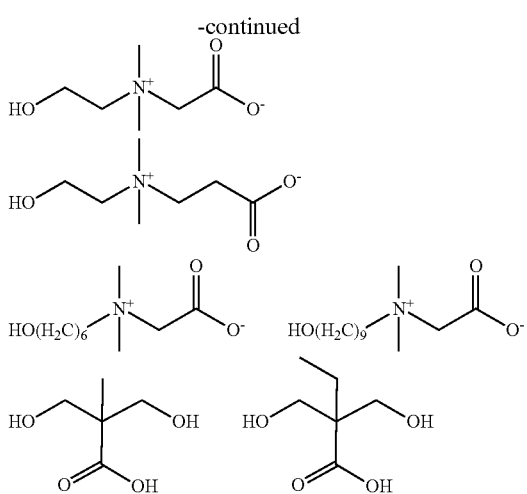

A basic compound contained in the water-phase component is not particularly limited. The basic compound contained in the water-phase component functions as a neutralizer for an acid group.

Examples of the basic compound include an inorganic base such as sodium hydroxide and potassium hydroxide, an organic base such as triethylamine, and the like.

Among these, as the basic compound, an inorganic base such as sodium hydroxide and potassium hydroxide is preferable from the viewpoint of the dispersion stability of the microcapsule.

In a case where the inorganic base is used as the basic compound, a surface potential of the neutralized acid group is further increased, further increasing a level of charge repulsion between microcapsules which occurs in water, and thus the microcapsules become unlikely to aggregate. Therefore, particularly, the dispersion stability for a long period of time (that is, storage stability) is significantly improved.

If necessary, the water-phase component may contain other components in addition to the aforementioned components.

Examples of the other components include the surfactants described above.

In the manufacture method of the present embodiment, a total amount (hereinafter will also be referred to as "total solid content") obtained by subtracting an amount of the organic solvent and the water from an amount of the oil-phase component and the water-phase component, corresponds to a total solid content of the microcapsule manufactured.

The amount of the isocyanate compound having three or more functional groups (or the polymerizable group-containing isocyanate compound having three or more functional groups) in the oil-phase component is not particularly limited and is preferably 10% by mass to 70% by mass with respect to the above total solid content, for example.

In a case where the oil-phase component contains a photopolymerization initiator, the amount of the photopolymerization initiator in the oil-phase component is not particularly limited and is preferably 0.1% by mass to 25% by mass with respect to the amount of the total solid content, for example.

In a case where the oil-phase component contains a polymerizable compound, the amount of the polymerizable compound in the oil-phase component is not particularly limited and is preferably 0.1% by mass to 75% by mass with respect to the amount of the total solid content, for example.

The amount of the organic solvent is not particularly limited and is appropriately set according to the type and amount of the components contained in the oil-phase component and the like.

The amount of the compound having an acid group and an active hydrogen group in the water-phase component is not particularly limited and is preferably 50% by mass to 100% by mass with respect to the above total solid content, for example.

An amount of the basic compound in the water-phase component is not particularly limited as long as the degree of neutralization of the acid group can be set to a desired value, and is appropriately set according to the types of the compound having the acid group and the active hydrogen group, which is contained in the water-phase component (that is, the types of the acid group), an amount (that is, an amount of the acid group), and the like.

The amount of water is not particularly limited and is appropriately selected according to the type and amount of the components contained in the oil-phase component and the like.

In a case where the oil-phase component contains a compound having a nonionic group, the amount of the compound having a nonionic group contained in the oil-phase component is not particularly limited and is preferably 0.1% by mass to 40% by mass with respect to the amount of the total solid content, for example.

The components contained in the oil-phase component need to be simply mixed together. All of the components may be mixed together at the same time, or the components may be mixed together by being divided into several groups.

A case of each component contained in the water-phase component is similar to the case of the oil-phase component, and as long as each component is mixed, all components may be mixed at once, or each component may be divided so as to be mixed separately.

A method for mixing the oil-phase component with the water-phase component is not particularly limited and examples thereof include mixing by stirring.

A method for emulsifying the mixture obtained by mixing is not particularly limited and examples thereof include emulsification by an emulsification device (for example, a disperser and the like) such as a homogenizer.

The rotation speed of the disperser used for the emulsification is 5,000 rpm to 20,000 rpm for example, and preferably 10,000 rpm to 15,000 rpm.

The rotation time during the emulsification is 1 minute to 120 minutes for example, preferably 3 minutes to 60 minutes, more preferably 3 minutes to 30 minutes, and even more preferably 5 minutes to 15 minutes.

The emulsification during the microcapsule-forming step may be carried out while heating.

By carrying out the emulsification while heating, the reaction for forming the microcapsule by the emulsification can further effectively proceed. In addition, by carrying out the emulsification while heating, at least some of the organic solvent contained as the oil-phase component can be easily removed from the mixture.

The heating temperature in the case of carrying out the emulsification while heating (that is, reaction temperature) is preferably 35° C. to 70° C. and more preferably 40° C. to 60° C.

The heating time in the case of carrying out the emulsification while heating (that is, reaction time) is preferably 6 hours to 50 hours, more preferably 12 hours to 40 hours and particularly preferably 15 hours to 35 hours.

In addition, the microcapsule-forming step may have an emulsification stage of emulsifying a mixture (at a temperature of lower than 35° C., for example), and a heating stage of heating the emulsion obtained in the emulsification stage (at a temperature of 35° C. or higher, for example).

According to the aspect in which the microcapsule-forming step has the emulsification stage and the heating stage, the shell having more firmer three-dimensional cross-linked structure is formed, and therefore it is possible to manufacture the aqueous dispersion by which a film having excellent hardness can be formed.

In the aspect in which the microcapsule-forming step has the emulsification stage and the heating stage, preferable ranges of a heating temperature and a heating time in the heating stage are respectively the same as preferable ranges of a heating temperature and a heating time in a case of carrying out the emulsification while heating.

Furthermore, the heating stage may have a first heating stage of removing an organic solvent in the emulsion, and a second heating stage of heating the emulsion at a temperature higher than that of the first heating stage.

According to the aspect in which the heating stage has the first heating stage and the second heating stage, which is more preferable aspect, because the shell having firmer three-dimensional cross-linked structure is formed.

<Preparation Step of Water-Phase Component>

The water-phase component preparation step is a step of preparing the water-phase component in which the degree of neutralization of the acid group of the compound having the acid group and the active hydrogen group is adjusted to from 50% to 100% in advance by using the basic compound, before the microcapsule-forming step.

The degree of neutralization of the acid group is preferably adjusted to 50% to 95%, more preferably adjusted to 80% to 95%, and even more preferably adjusted to 90% to 95%.

The degree of neutralization of the acid group can be adjusted according to an amount of basic compound, and the like, as described above.

Examples of manufacture methods of embodiments other than the above-described manufacture method of the present embodiment (hereinafter, will also be referred to as "the manufacture method of the first embodiment"), include manufacture methods of (1) to (4), for example.

(1) A manufacture method (hereinafter, will also be referred to as "the manufacture method of the second embodiment") including a microcapsule-forming step of mixing an oil-phase component containing an organic solvent, a tri- or higher functional isocyanate compound, a compound having an acid group and an active hydrogen group, a basic compound, and a compound selected from an isocyanate compound into which a polymerizable group is introduced and a polymerizable compound, with a water-phase component containing water, and emulsifying the obtained mixture so as to form the above-described microcapsule.

(2) A manufacture method (hereinafter, will also be referred to as "the manufacture method of the third embodiment") including a microcapsule-forming step of mixing an oil-phase component containing an organic solvent, a tri- or higher functional isocyanate compound, a compound having an acid group and an active hydrogen group, and a compound selected from an isocyanate compound into which a polymerizable group is introduced and a polymerizable compound, with a water-phase component containing a basic compound and water, and emulsifying the obtained mixture so as to form the above-described microcapsule.

(3) A manufacture method (hereinafter, will also be referred to as "the manufacture method of the fourth embodiment") including a microcapsule-forming step of mixing an oil-phase component containing an organic solvent, a tri- or higher functional isocyanate compound, a basic compound, and a compound selected from an isocyanate compound into which a polymerizable group is introduced and a polymerizable compound, with a water-phase component containing a compound having an acid group and an active hydrogen group and water, and emulsifying the obtained mixture so as to form the above-described microcapsule.

(4) A manufacture method (hereinafter, will also be referred to as "the manufacture method of the fifth embodiment") including a microcapsule-forming step of mixing an oil-phase component containing an organic solvent, a tri- or higher functional isocyanate compound, and a compound selected from an isocyanate compound into which a polymerizable group is introduced, a polymerizable compound, a basic compound, and a compound obtained by allowing a reaction between a compound having an acid group and an active hydrogen group and an isocyanate compound, with a water-phase component containing water, and emulsifying the obtained mixture so as to form the above-described microcapsule.

In any one of the manufacture methods of the second to fourth embodiments, in the microcapsule-forming step, as same as the case of the manufacture method of the first embodiment, the oil-phase component is mixed with the water-phase component, the obtained mixture is emulsified, and therefore the microcapsule in which the shell having the three-dimensional cross-linked structure containing the neutralized acid group, and at least one bond selected from a urethane bond or a urea bond, is formed is formed so as to surround the core. The formed microcapsule is a dispersoid in the manufactured aqueous dispersion, and water in the water-phase component is a dispersion medium in the manufactured aqueous dispersion.

As the manufacture method of the aqueous dispersion of the present disclosure, the manufacture method of the first embodiment or the manufacture method of the second embodiment, in which the compound having the acid group and the active hydrogen group, and the basic compound as a neutralizer are contained in the same phase, is preferable from the viewpoint of effectively causing a neutralization reaction of the acid group of the compound having the acid group and the active hydrogen group to proceed, and the manufacture method of the first embodiment in which both the compound having the acid group and the active hydrogen group and the basic compound are contained as the water-phase component, is more preferable.

In the manufacture methods of the second and third embodiments, the amount of the compound having the acid group and the active hydrogen group in the oil-phase component is not particularly limited, and for example, is preferably 2% by mass to 15% by mass with respect to the above total solid content.

In the manufacture method of the fourth embodiment, the amount of the compound having the acid group and the active hydrogen group in the water-phase component is not particularly limited, and for example, is preferably 50% by mass to 100% by mass with respect to the above total solid content.

In the manufacture methods of the second and fourth embodiments, an amount of the basic compound in the oil-phase component is not particularly limited as long as the degree of neutralization of the acid group can be set to a desired value, and is appropriately set according to the types of the compound having the acid group and the active hydrogen group, which is contained in the oil-phase component or the water-phase component (that is, the types of the acid group), an amount (that is, an amount of the acid group), and the like. The same applies to an amount of the basic compound in the water-phase component in the manufacture method of the third embodiment.

<Other Steps>

The manufacture method of the present embodiment may include steps other than the microcapsule-forming step as necessary.

Examples of the other steps include a step of adding other components.

The other components to be added are as described above as other components that can be contained in the aqueous dispersion.

[Image Forming Method]

A method for forming an image by using the above-described aqueous dispersion is not particularly limited.

As an image forming method of the present disclosure, an image forming method of the present embodiment which is to be described later is preferable from the viewpoint that an image having excellent harness can be formed on a recording medium.

The image forming method of the present embodiment includes an application step of applying the aqueous dispersion of the present disclosure described above onto the recording medium, and a curing step of curing the aqueous dispersion applied onto the recording medium.

According to the image forming method of the present embodiment, an image having excellent hardness is formed on the recording medium. In addition, the formed image also has excellent adhesiveness with respect to the recording medium.

<Application Step>

The application step is a step of applying the aqueous dispersion of the present disclosure onto the recording medium.

As the aspect in which the aqueous dispersion is applied onto the recording medium, an aspect is particularly preferable in which the aqueous dispersion (that is, an ink jet ink) is applied onto the recording medium by an ink jet method by using the aqueous dispersion of the present disclosure as the ink jet ink.

As the recording medium, the above-described substrate (for example, plastic substrate) can be used.

The application of the aqueous dispersion onto the recording medium by the ink jet method can be performed using a known ink jet recording device.

The ink jet recording device is not particularly limited, and a known ink jet recording device by which an intended resolution is achieved can be appropriately selected and used. That is, with any of known ink jet recording devices including commercially available products, the application of the aqueous dispersion onto the recording medium in the image forming method of the present embodiment can be carried out.

Examples of the ink jet recording device include a device including an ink supply system, a temperature sensor, a heating means, and the like.

The ink supply system includes, for example, a base tank containing the ink as the aqueous dispersion of the present disclosure, supply piping, an ink supply tank disposed immediately before an ink jet head, a filter, and a piezo-type ink jet head. The piezo-type ink jet head can be driven such that the head can jet multi-sized dots preferably having a size of 1 pl to 100 pl and more preferably having a size of 8 pl to 30 pl, preferably at a resolution of 320 dots per inch (dpi)×320 dpi to 4,000 dpi×4,000 dpi, more preferably at a resolution of 400 dpi×400 dpi to 1,600 dpi×1,600 dpi, and even more preferably at a resolution of 720 dpi×720 dpi. In the above description, dpi represents the number of dots per 2.54 cm (1 inch).

<Curing Step>

The curing step is a step of curing an aqueous dispersion applied onto the recording medium.

By the curing step, the cross-linking reaction between the microcapsules in the aqueous dispersion proceeds, the image is fixed, and hence the film hardness of the image and the like can be improved.

As the curing step, a step of curing the aqueous dispersion by irradiating the aqueous dispersion applied onto a recording medium with active energy rays (light) (hereinafter, will also be referred to as "curing step A") is preferable in a case where the aqueous dispersion contains the photopolymerizable compound (and preferably the photopolymerization initiator), and a step of curing the aqueous dispersion by heating or irradiating the aqueous dispersion applied onto a recording medium with infrared rays (hereinafter, will also be referred to as "curing step B") is preferable in a case where the aqueous dispersion contains the thermally polymerizable compound as a curing component.

(Curing Step A)

The curing step A is a step of irradiating the aqueous dispersion applied onto the recording medium with active energy rays so as to cure the aqueous dispersion.

In the curing step A, by irradiating the aqueous dispersion applied onto the recording medium with active energy rays, the cross-linking reaction between the microcapsules in the aqueous dispersion proceeds, the image is fixed, and hence the film hardness of the image and the like can be improved.

Examples of the active energy rays that can be used in the curing step A include ultraviolet rays (UV light), visible rays, electron beams, and the like. Among these, UV light is preferable.

The peak wavelength of the active energy rays (light) depends on an absorption property of a sensitizer that is used as necessary, but is preferably 200 nm to 405 nm, more preferably 220 nm to 390 nm, and even more preferably 220 nm to 385 nm, for example.

In a case where the photopolymerization initiator and the sensitizer are not used in combination, the peak wavelength is preferably 200 nm to 310 nm and more preferably 200 nm to 280 nm, for example.

In a case of the irradiation with the active energy rays (light), the illuminance of an exposure surface is 10 mW/cm$^2$ to 2,000 mW/cm$^2$ for example, and preferably 20 mW/cm$^2$ to 1,000 mW/cm$^2$.

As a source for generating the active energy rays (light), a mercury lamp, a metal halide lamp, a UV fluorescent lamp, a gas laser, a solid-state laser, and the like are widely known.

Furthermore, industrially and environmentally, it is extremely useful to substitute the aforementioned light sources with a semiconductor ultraviolet light-emitting device.

Among the semiconductor ultraviolet light-emitting devices, a light emitting diode (LED) and a laser diode (LD) are compact, have long service life and high efficiency, and incur low costs, and thus are expected as a light source.

As the light source, a metal halide lamp, an ultra-high pressure mercury lamp, a high-pressure mercury lamp, a medium-pressure mercury lamp, a low-pressure mercury lamp, LED, or a blue-violet laser is preferable.

In a case where the sensitizer and the photopolymerization initiator are used in combination, among the above light sources, an ultra-high pressure mercury lamp that can radiate light having a wavelength of 365 nm, 405 nm, or 436 nm, a high-pressure mercury lamp that can radiate light having a wavelength of 365 nm, 405 nm, or 436 nm, or LED that can radiate light having a wavelength of 355 nm, 365 nm, 385 nm, 395 nm, or 405 nm is more preferable, and LED that can radiate light having a wavelength of 355 nm, 365 nm, 385 nm, 395 nm, or 405 nm is most preferable.

In the case where the photopolymerization initiator and the sensitizer are not used in combination, a metal halide lamp, a medium-pressure mercury lamp, or a low-pressure mercury lamp is preferable.

In the curing step A, the time for which the aqueous dispersion applied onto the recording medium is irradiated with the active energy rays is 0.01 seconds to 120 seconds for example, and preferably 0.1 seconds to 90 seconds.

As irradiation conditions of the active energy rays and a basic irradiation method, the irradiation conditions and the irradiation method disclosed in JP1985-132767A (JP-S60-132767A) can be appropriately referred to.

Specifically, as the irradiation method of the active energy rays, a method in which a light source is provided on both sides of a head unit including an ink jet device and the head unit as well as the light source are scanned by a so-called shuttle method, or a method in which the irradiation with the active energy rays is performed by a separate light source that is not associated with driving, is preferable.

It is preferable that the irradiation of the active energy rays is performed at a certain time interval (for example, 0.01 seconds to 120 seconds and preferably 0.01 seconds to 60 seconds) after the aqueous dispersion lands and is dried by heating.

(Curing Step B)

The curing step B is a step of heating or irradiating the aqueous dispersion applied onto the recording medium with infrared rays so as to cure the aqueous dispersion.

In the curing step B, by heating or irradiating the aqueous dispersion applied onto the recording medium with infrared rays, the cross-linking reaction of the thermally polymerizable group in the microcapsules in the aqueous dispersion proceeds, the image is fixed, and hence the film hardness of the image and the like can be improved.

As heating means for carrying out the heating is not particularly limited, and examples thereof include a heat drum, hot air, an infrared lamp, an infrared LED, an infrared heater, a heat oven, a heat plate, an infrared laser, an infrared dryer, and the like.

Among these, as the heating means, from the viewpoint of being able to thermally curing the aqueous dispersion efficiently, a light emitting diode (LED) having an emission wavelength in near infrared rays to far infrared rays, which has a maximum absorption wavelength in a wavelength range of 0.8 μm to 1.5 μm or 2.0 μm to 3.5 μm, a heater radiating near infrared rays to far infrared rays, a laser having an oscillation wavelength in near infrared rays to far infrared rays, or a dryer radiating near infrared rays to far infrared rays is preferable.

The heating temperature in a case of heating is preferably 40° C. or higher, more preferably 40° C. to 200° C., and even more preferably 100° C. to 180° C. The heating temperature refers to a temperature of the aqueous dispersion onto a recording medium and can be measured by a thermograph using an infrared thermographic apparatus (Model No. H2640, Nippon Avionics Co., Ltd.).

The heating time can be appropriately set in consideration of the heating temperature, the compositions of the aqueous dispersion, a printing rate, and the like.

In addition, the curing step B for taking charge of thermally curing the aqueous dispersion applied onto the recording medium may have a heating and drying step in combination, which will be described below.

<Other Steps>

The image forming method of the present embodiment may include steps other than the above-described application step and the curing step.

Examples of the other steps include a heating and drying step.

(Heating and Drying Step)

The image forming method of the present embodiment may further include, as necessary, the heating and drying step of heating and drying the aqueous dispersion on the recording medium, after the application step and before the curing step.

In the heating and drying step, water contained in the aqueous dispersion applied onto the recording medium, and an organic solvent that is used in combination with water if necessary are evaporated, and therefore the image is fixed.

A heating means for carrying out the heating and drying is not particularly limited, and examples thereof include a heating means such as a heat drum, hot air, an infrared lamp, a heating oven, and a heat plate.

The heating temperature is preferably 40° C. or higher, more preferably 40° C. to 150° C., and even more preferably 40° C. to 80° C.

The heating time can be appropriately set in consideration of compositions of the aqueous dispersion, a printing rate, and the like.

The aqueous dispersion fixed by heating is further optically fixed by being irradiated with the active energy rays in the curing step A, for example.

EXAMPLES

Hereinafter, the present invention will be more specifically described based on examples, but the present invention is not limited to the examples as long as the gist of the present invention is maintained.

[Manufacture of Aqueous Dispersion Having Microcapsule]

Example 1

(Preparation of Oil-Phase Component)

The components shown in "Composition of Oil-Phase Component" below and 55 g of ethyl acetate as an organic solvent were mixed and stirred at room temperature for 15 minutes, and therefore an oil-phase component was obtained.

| -Composition of Oil-Phase Component- | |
|---|---|
| TAKENATE (registered trademark) D-110N of Mitsui Chemicals, Inc. (polyfunctional isocyanate compound) | 11 g |
| A-DCP [difunctional polymerizable compound (photopolymerizable monomer)] of Shin-Nakamura Chemical Co., Ltd. | 35 g |
| Omnipol TX (photopolymerization initiator) of IGM Resins B.V. | 1.8 g |
| Genopol AB-2 (photopolymerization initiator) of RAHN AG. | 1.8 g |
| Omnipol 9210 (photopolymerization initiator) of IGM Resins B.V. | 3.5 g |

The details description of the oil-phase component is as below.

[Shell Component of Microcapsule]

TAKENATE (registered trademark) D-110N: 50% by mass ethyl acetate solution of an adduct of trimethylolpropane (TMP) and m-xylylene diisocyanate (XDI)

[Core Component of Microcapsule]

A-DCP: Tricyclodecanedimethanol diacrylate

Omnipol TX: Multimerized thioxanthone

Genopol AB-2: Polymerized 4-dimethylaminobenzoic acid ester

Omnipol 9210: A mixture of polyethylene glycol di(β-4-[4-(2-dimethylamino-2-benzyl)butaonylphenyl]piperazine) propionate and ethoxylated pentaerythritol tetraacrylate (Preparation of Water-Phase Component)

3.3 g of lysine as the compound having the acid group and the active hydrogen group (lysine, acid group: carboxy group, active hydrogen group: amino group) was dissolved in 50 g of distilled water. Subsequently, the obtained lysine aqueous solution was mixed with 1 N (=1 mol/L) aqueous solution of sodium hydroxide (NaOH) (basic compound) as a neutralizer for neutralizing the acid group, and therefore the water-phase component was obtained.

A blending amount of the aqueous solution of sodium hydroxide was appropriately adjusted such that the degree of neutralization of acid group contained in lysine became 50% at the timing of completion of preparation of the aqueous dispersion having the microcapsule.

(Microcapsule-Forming Step)

—Emulsification Step—

The oil-phase component was mixed with the water-phase component, the obtained mixture was emulsified using a homogenizer for 12 minutes at 12,000 rpm, and therefore an emulsion was obtained.

—Heating Step—

The obtained emulsion was added to distilled water, and the obtained liquid was stirred at room temperature for 30 minutes.

Subsequently, the liquid after the stirring was heated to 45° C. and stirred for 4 hours in a state of maintaining the liquid temperature at 45° C. so as to distill off ethyl acetate from the liquid. Subsequently, the liquid in which the ethyl acetate was distilled off was heated to 50° C. and stirred for 24 hours in a state of maintaining the liquid temperature at 50° C., and therefore a microcapsule was formed in the liquid. Subsequently, the liquid containing microcapsules was diluted with distilled water so that a concentration of solid contents became 20% by mass, and therefore the aqueous dispersion having a microcapsule of Example 1 was obtained.

Examples 2 to 6

Aqueous dispersions having the microcapsules of Examples 2 to 6 were obtained in the same manner as in Example 1 except that the amount of the aqueous solution of sodium hydroxide was changed so that the degree of neutralization of acid group at the timing of completion of preparation of the aqueous dispersion having the microcapsule became a value shown in Table 4.

Example 7

An aqueous dispersion having the microcapsule of Example 7 was obtained in the same manner as in Example 3 except that in Example 3, "β-alanine (acid group: carboxy group, active hydrogen group: amino group)" was used instead of "lysine" as the compound having the acid group and the active hydrogen group.

Example 8

An aqueous dispersion having the microcapsule of Example 8 was obtained in the same manner as in Example 3 except that in Example 3, "5.3 g of malic acid (acid group: carboxy group, active hydrogen group: hydroxyl group)" was used instead of "3.3 g of lysine" as the compound having the acid group and the active hydrogen group.

Example 9

An aqueous dispersion having the microcapsule of Example 9 was obtained in the same manner as in Example 3 except that in Example 3, "17.5 g of A-DCP and 17.5 g of SR399 E" were used instead of "35 g of A-DCP" as the polymerizable compound.

The "SR399E" is "SR399E" of Sartomer Arkema Inc. [dipentaerythritol pentaacrylate; pentafunctional polymerizable compound (photopolymerizable monomer)] and is the core component of the microcapsule.

Example 10

An aqueous dispersion having the microcapsule of Example 10 was obtained in the same manner as in Example 3 except that in Example 3, a blending amount of D-110N was changed from "11 g" to "7.5 g", and 16.5 g of D-116N was used as the water-phase component.

The "D-116N" is "TAKENATE (registered trademark) D-116N" of Mitsui Chemicals, Inc. [50% by mass ethyl acetate solution of an adduct of trimethylolpropane (TMP), m-xylylene diisocyanate (XDI), and polyethylene glycol monomethyl ether (isocyanate compound having a polyethyleneoxy group as a nonionic group)], and is the core component of the microcapsule.

Example 11

An aqueous dispersion having the microcapsule of Example 11 was obtained in the same manner as in Example 3 except that in Example 3, "2.1 g of taurine (acid group: sulfo group, active hydrogen group: amino group)" was used instead of "3.3 g of lysine" as the compound having the acid group and the active hydrogen group.

Example 12

An aqueous dispersion having the microcapsule of Example 12 was obtained in the same manner as in Example 3 except that in Example 3, "2.8 g of ethanolamine phosphoric acid (EAP, acid group: phosphoric acid group, active hydrogen group: amino group)" was used instead of "3.3 g of lysine" as the compound having the acid group and the active hydrogen group.

Example 13

An aqueous dispersion having the microcapsule of Example 13 was obtained in the same manner as in Example 3 except that in Example 3, "triethylamine (TEA, basic compound)" was used instead of "1 N (=1 mol/L) aqueous solution of sodium hydroxide" as a neutralizer for neutralizing the acid group.

Example 14

An aqueous dispersion having the microcapsule of Example 14 was obtained in the same manner as in Example 10 except that in Example 10, "triethylamine (TEA, basic compound)" was used instead of "1 N (=1 mol/L) aqueous solution of sodium hydroxide" as a neutralizer for neutralizing the acid group.

Example 15

An aqueous dispersion having the microcapsule of Example 15 was obtained in the same manner as in Example 3 except that in Example 3, instead of using "35 g of A-DCP (photopolymerizable monomer)", "35 g of Trixene™BI7982 obtained by distilling off propylene glycol monomethyl ether under reduced pressure under conditions of 60° C. and 2.67 kPa (20 torr) [thermally polymerizable monomer (blocked isocyanate), Baxenden Chemicals Ltd] was used, and all polymerization initiators (Omnipol TX, Genopol AB-2, and Omnipol 9210) were not used as the polymerizable compound.

Example 16

An aqueous dispersion having the microcapsule of Example 16 was obtained in the same manner as in Example 7 except that in Example 7, instead of using "35 g of A-DCP (photopolymerizable monomer)", "35 g of Trixene™BI7982 obtained by distilling off propylene glycol monomethyl ether under reduced pressure under conditions of 60° C. and 2.67 kPa (20 torr) [thermally polymerizable monomer (blocked isocyanate), Baxenden Chemicals Ltd] was used, and all polymerization initiators (Omnipol TX, Genopol AB-2, and Omnipol 9210) were not used as the polymerizable compound.

Example 17

An aqueous dispersion having the microcapsule of Example 17 was obtained in the same manner as in Example 13 except that in Example 13, instead of using "35 g of A-DCP (photopolymerizable monomer)", "35 g of Trixene™BI7982 obtained by distilling off propylene glycol monomethyl ether under reduced pressure under conditions of 60° C. and 2.67 kPa (20 torr) [thermally polymerizable monomer (blocked isocyanate), Baxenden Chemicals Ltd] was used, and polymerization initiators (Omnipol TX, Genopol AB-2, and Omnipol 9210) were not used as the polymerizable compound.

Example 18

An aqueous dispersion having the microcapsule of Example 18 was obtained in the same manner as in Example 3 except that in Example 3, instead of using "35 g of A-DCP (photopolymerizable monomer)", "35 g of EPICLON™ 840 [thermally polymerizable oligomer (polymerizable oligomer having an epoxy group), DIC CORPORATION]" was used, and "polymerization initiators (Omnipol TX, Genopol AB-2, and Omnipol 9210)" were changed to "2-methylimidazole (thermal curing accelerator)" as the polymerizable compound.

The mass of 2-methylimidazole used in Example 18, was the same mass as a total amount of the polymerization initiator used in Example 3, that is, a total mass of Omnipol TX, Genopol AB-2, and Omnipol 9210.

Comparative Example 1

An aqueous dispersion having the microcapsule of Comparative Example 1 was obtained in the same manner as in Example 1 except that in Example 1, "1 N (=1 mol/L) aqueous solution of sodium hydroxide" which is a neutralizer for neutralizing the acid group was not used, that is, the acid group was not neutralized.

Comparative Examples 2 and 3

Aqueous dispersions having the microcapsules of Comparative Examples 2 and 3 were obtained in the same manner as in Example 1 except that the amount of the aqueous solution of sodium hydroxide was changed so that the degree of neutralization of acid group at the timing of completion of preparation of the aqueous dispersion having the microcapsule became a value shown in Table 4.

Comparative Example 4

An aqueous dispersion having the microcapsule of Comparative Example 4 was obtained in the same manner as in Comparative Example 2 except that in Comparative Example 2, instead of using "35 g of A-DCP (photopolymerizable monomer)", "35 g of Trixene™BI7982 obtained by distilling off propylene glycol monomethyl ether under reduced pressure under conditions of 60° C. and 2.67 kPa (20 torr) [thermally polymerizable monomer (blocked isocyanate), Baxenden Chemicals Ltd] was used, and polymerization initiators (Omnipol TX, Genopol AB-2, and Omnipol 9210) were not used as the polymerizable compound.

[Checking Relating to Aqueous Dispersion of Microcapsule]

With respect to the obtained aqueous dispersion having the microcapsule, the following checking was performed.

(Volume Average Particle Diameter of Microcapsule)

A volume average particle diameter of the microcapsule was measured by a light scattering method. The measurement of the volume average particle diameter of the microcapsule by the light scattering method was carried out by using a wet-type particle size distribution measurement apparatus, LA-960 (manufactured by HORIBA, Ltd.).

As the results, the volume average particle diameter of the microcapsules contained in Examples 1 to 18 and Comparative Examples 1 and 4 was within a range of 0.10 µm to 0.20 µm.

(Checking Whether Shell of Microcapsule has Three-Dimensional Cross-Linked Structure)

Whether the shell of the microcapsule actually has the three-dimensional cross-linked structure was checked by the following method. The operation described below was performed under the condition of a liquid temperature of 25° C.

From the aqueous dispersion having the microcapsule obtained as above, a sample was collected. Tetrahydrofuran (THF) having a mass 100 times the mass of the total solid content (microcapsule in the present example) in the sample was added to and mixed with the collected sample, thereby preparing a diluted solution of the aqueous dispersion. The obtained diluted solution was subjected to centrifugation (80,000 rpm, 40 minutes). After centrifugation, the presence or absence of a residue was checked by visual observation. In a case where a residue was checked, water was added to the residue, and the resultant was stirred for 1 hour by using a stirrer so as to redisperse the residue in water, thereby obtaining a redispersion liquid. For the obtained redispersion liquid, by using a wet-type particle size distribution measurement apparatus (LA-960, manufactured by HORIBA, Ltd.), the particle size distribution was measured by a light scattering method. In a case where the particle size distribution could be checked by the operation described above, it was determined that the shell of the microcapsule has the three-dimensional cross-linked structure.

As the results, it was checked that all of the shells of the microcapsules contained in the aqueous dispersions of Examples 1 to 18 and Comparative Examples 1 and 4, had the three-dimensional cross-linked structures.

(Checking Whether Core of Microcapsule Contains Photopolymerization Initiator)

In the aqueous dispersion having the microcapsule, whether the core of the microcapsule actually contains the photopolymerization initiator was checked by measuring an internal content rate (%) of the photopolymerization initiator. The details thereof are as described below. The operation described below was performed under the condition of a liquid temperature of 25° C.

From the aqueous dispersion having the microcapsule, two samples (hereinafter, will be referred to as "sample 1A" and "sample 2A") having the same mass were collected.

Tetrahydrofuran (THF) having a mass 100 times the mass of the total solid content in the sample 1A was added to and mixed with the sample 1A, thereby preparing a diluted solution. The obtained diluted solution was subjected to centrifugation under the conditions of 80,000 rpm and 40 minutes. The supernatant (hereinafter, referred to as "supernatant 1A") generated by the centrifugation was collected. The mass of the photopolymerization initiator contained in the collected supernatant 1A was measured using a liquid chromatography device "Waters 2695" of WATERS. The obtained mass of the photopolymerization initiator was taken as "total amount of photopolymerization initiator".

Furthermore, the sample 2A was subjected to centrifugation under the same conditions as in the centrifugation performed on the aforementioned diluted solution. The supernatant (hereinafter, referred to as "supernatant 2A") generated by the centrifugation was collected. The mass of the photopolymerization initiator contained in the collected supernatant 2A was measured using the aforementioned liquid chromatography device. The obtained mass of the photopolymerization initiator was taken as "amount of free photopolymerization initiator".

Based on the "total amount of photopolymerization initiator" and the "amount of free photopolymerization initiator", the internal content rate (% by mass) of the photopolymerization initiator was determined according to the following equation.

Internal content rate (% by mass) of photopolymerization initiator=((total amount of photopolymerization initiator−amount of free photopolymerization initiator)/total amount of photopolymerization initiator)×100

The measurement of the internal content rate of the photopolymerization initiator was performed on each of the three photopolymerization initiators.

As the results, all of the internal content rates of the three photopolymerization initiators in the aqueous dispersions of Examples 1 to 14 and Comparative Examples 1 to 3 were 99% or more, and it was confirmed that the cores of the microcapsules actually contained the three photopolymerization initiators.

(Checking Whether Core of Microcapsule Contains Polymerizable Compound)

In the aqueous dispersion having the microcapsule, whether the core of the microcapsule actually contains the polymerizable compound was checked by measuring an internal content rate (%) of the polymerizable compound (polymerizable monomer in the present example).

The internal content rate of the polymerizable compound was measured by the same method as that of the internal content rate of the photopolymerization initiator.

With respect to the aqueous dispersion having the microcapsule of Example 9, the measurement of the internal content rate of the polymerizable compound was performed on each of the two polymerizable compounds.

As the result, the internal content rate of the polymerizable compound in the aqueous dispersions of Examples 1 to 18 and Comparative Examples 1 to 4 was 99% or more (Example 9, all of the internal content rates of the two polymerizable compounds were 99% or more), and it was confirmed that the cores of the microcapsules actually contained the polymerizable compounds.

(Confirmation of Degree of Neutralization of Acid Group)

The degree of neutralization (%) of the acid group contained in the three-dimensional cross-linked structure of the shell was measured by a potentiometric method described below. As a measurement device, an automatic potentiometric titrator (model number: AT-510) of KYOTO ELECTRONICS MANUFACTURING CO., LTD. was used.

50 g of the aqueous dispersion of the microcapsule was subjected to centrifugation under the conditions of 80,000 rpm and 40 minutes. The supernatant generated by the centrifugation was removed, and the precipitate (microcapsule) was collected.

Approximately 0.5 g of the microcapsule collected in a container 1 was weighed, and a weighed value W1 (g) was recorded. Subsequently, a mix solution of 54 mL of tetrahydrofuran (THF) and 6 mL of distilled water was added thereto, the microcapsule weighed in a container 1 was diluted, and therefore a sample 1 for measurement of degree of neutralization was obtained.

Titration was performed on the obtained sample 1 for measurement of degree of neutralization by using 0.1 N (=0.1 mol/L) aqueous solution of sodium hydroxide as a titrant. A titrant volume required up to the equivalent point was recorded as F1 (mL). In a case where a plurality of equivalent points were obtained in the titration, a value of the equivalent points at a maximum titration amount was used. A maximum titration amount F1 (mL) corresponds to an amount of acid group which is not neutralized (which means "—COOH" in a case where the acid group is a carboxy group (—COOH), for example) among the acid groups introduced into the shell of the microcapsule.

Approximately 0.5 g of the microcapsule collected in a container 2 was weighed, and a weighed value W2 (g) was recorded. Subsequently, 60 mL of acetate was added thereto, the microcapsule weighed in a container 2 was diluted, and therefore a sample 2 for measurement of degree of neutralization was obtained.

Titration was performed on the obtained sample 2 for measurement of degree of neutralization by using 0.1 N (=0.1 mol/L) perchloric acid-acetic acid solution as a titrant. A titrant volume required up to the equivalent point was recorded as F2 (mL). In a case where a plurality of equivalent points were obtained in the titration, a value of the equivalent points at a maximum titration amount was used. A maximum titration amount F2 (mL) corresponds to an amount of acid group which is neutralized (which means "—COONa" in a case where the acid group is a carboxy group (—COOH) and is neutralized by sodium hydroxide, for example) among the acid groups introduced into the shell of the microcapsule.

Based on the measurement values of "F1 (mL)" and "F2 (mL)", the degree of neutralization (%) of acid group was calculated according to the following equations.

$$F1 \text{ (mL)} \times \text{normality of aqueous solution of sodium hydroxide } (0.1 \text{ mol/L})/W1 \text{ (g)} + F2 \text{ (mL)} \times \text{normality of perchloric acid-acetic acid solution } (0.1 \text{ mol/L})/W2 \text{ (g)} = \text{amount of acid group introduced into shell per 1 g of microcapsule (mmol/g)} \quad (1)$$

$$F2 \text{ (mL)} \times \text{normality of perchloric acid-acetic acid solution } (0.1 \text{ mol/L})/W2 \text{ (g)} = \text{amount of neutralized acid group among acid group introduced into shell per 1 g of microcapsule (mmol/g)} \quad (2)$$

Degree of neutralization (%)=(2)/(1)×100

The results are shown in Table 4 and Table 5.

[Manufacture of Ink Jet Ink]

Components shown in the following "composition of ink" were mixed so as to prepare an ink jet ink.

The manufactured ink jet ink is also one aspect of the aqueous dispersion having the microcapsule.

In the present example, the ink jet ink manufactured herein is referred to as "ink" so as to be distinguished from the aqueous dispersion having the microcapsule which was manufactured above.

| -Composition of Ink- | |
|---|---|
| Each aqueous dispersion having the microcapsule of Examples 1 to 18 or Comparative Examples 1 to 4 | 50 g |
| Fluorine-based surfactant (trade name: CAPSTONE (registered trademark) FS-31, manufactured by DuPont, concentration of solid contents: 25% by mass) | 0.3 g |
| Glycerin (organic solvent) | 5 g |
| Water | 35 g |
| Anionic self-dispersing pigment (trade name: CAB-O-JET (registered trademark) 450C, Cyan pigment, Cabot Corporation) | 10 g |

[Evaluation]

The following evaluation was carried out using the ink obtained above.

The results are shown in Table 4 and Table 5.

1. Pencil Hardness of Cured Film (1) Pencil Hardness of Photocured Film

The ink obtained by using each of the aqueous dispersions having the microcapsules of Examples 1 to 14 or Comparative Examples 1 to 3 was applied onto a polystyrene (PS) sheet ("falcon hi impact polystyrene" manufactured by Robert Home Company) as a substrate by using a No. 2 bar of K HAND COATER manufactured by RK PrintCoat Instruments Ltd so that the thickness thereof became 10 μm, and therefore a coated film was formed. The coated film formed was dried by being heated for 3 minutes at 60° C. Subsequently, the coated film after the drying was irradiated with ultraviolet rays (UV light) so as to cure the coated film, and therefore a cured film was obtained.

For the irradiation with ultraviolet rays (UV light), as an exposure light source, an experimental UV mini conveyor device CSOT (manufactured by Yuasa Power Supply Ltd.) was used which was equipped with an ozoneless metal halide lamp MAN 250L and in which a conveyor speed was set to be 35 m/min and an exposure intensity was set to be 2.0 W/cm².

By using UNI (registered trademark) manufactured by MITSUBISHI PENCIL CO., LTD as a pencil, a pencil hardness test was performed on the obtained cured film based on JIS K5600-5-4 (1999).

The acceptable range of the pencil hardness is equal to or higher than HB, and it is preferable that the pencil hardness is equal to or higher than H. The cured film having a pencil hardness of equal to or lower than B is not preferable, because in a case of being handled, there is a possibility that scratches are generated.

(2) Pencil Hardness of Thermally Cured Film

The ink obtained by using each of the aqueous dispersions having the microcapsules of Examples 15 to 18 or Comparative Example 4 was applied onto a polystyrene (PS) sheet ("falcon hi impact polystyrene" manufactured by Robert Home Company) as a substrate by using a No. 2 bar of K HAND COATER manufactured by RK PrintCoat Instruments Ltd so that the thickness thereof became 10 μm, and therefore a coated film was formed. The coated film formed was dried by being heated for 3 minutes at 60° C. Subsequently, the coated film after the drying was put into an oven and heated at 160° C. for 5 minutes so as to cure the coated film, and therefore a cured film was obtained.

By using UNI (registered trademark) manufactured by MITSUBISHI PENCIL CO., LTD as a pencil, a pencil hardness test was performed on the obtained cured film based on JIS K5600-5-4 (1999).

The acceptable range of the pencil hardness is equal to or higher than HB, and it is preferable that the pencil hardness is equal to or higher than H. The cured film having a pencil hardness of equal to or lower than B is not preferable, because in a case of being handled, there is a possibility that scratches are generated.

2. Adhesiveness of Cured Film (Crosshatch Test)

A cured film was formed in the same manner as the cured film in the evaluation of the pencil hardness.

The obtained cured film was subjected to a crosshatch test based on ISO 2409 (cross-cut method), and adhesiveness to a substrate was evaluated according to the following evaluation standards.

During the crosshatch test, cuts were made at an interval of 1 mm, and in this way, 25 square lattices having a size of 1 mm×1 mm were formed.

In the following evaluation standards, "A" shows that the adhesiveness of the cured film is most excellent. In addition, in the following evaluation standards, "A" and "B" are acceptable levels for practical use.

In the evaluation standards below, the proportion (%) of peeled lattices is a value obtained by the following equation. The total number of lattices in the following equation is 25.

Proportion (%) of peeled lattices=[(number of peeled lattices)/(total number of lattices)]×100

—Evaluation Standards of Adhesiveness of Cured Film—

A: The proportion (%) of peeled lattices was 0%.

B: The proportion (%) of peeled lattices was higher than 0% and equal to or lower than 5%.

C: The proportion (%) of peeled lattices was higher than 5%.

3. Jetting Properties of Ink

As one of indices of dispersion stability of the ink (that is, aqueous dispersion), evaluation of jetting properties was performed.

The ink obtained as above (within a day at room temperature after the preparation) was jetted from a head of an ink jet printer (SP-300V, manufactured by Roland DG Corporation) for 30 minutes (a first jetting), and then the jetting was stopped.

After predetermined minutes elapsed after the jetting was stopped, the ink was jetted again from the aforementioned head onto a polyvinyl chloride (PVC) sheet (AVERY 400 GLOSS WHITE PERMANENT manufactured by AVERY DENNISON CORPORATION) as a substrate, thereby forming a 5 cm×5 cm solid image.

By visually observing the obtained image, whether or not dead pixels occurred due to defective nozzles and the like was checked, and the jetting properties of the ink were evaluated according to the following evaluation standards.

In the following evaluation standards, "A" shows that the jetting properties of the ink is most excellent. In addition, in the following evaluation standards, "A", "B", and "C" are acceptable levels for practical use.

—Evaluation Standards of Jetting Properties of Ink—

A: In the jetting after a lapse of 4 minutes after the first jetting was stopped, the dead pixels occurring due to defective nozzles and the like were not observed, and an excellent image was obtained.

B: In the jetting after a lapse of 3 minutes after the first jetting was stopped, the dead pixels occurring due to defective nozzles and the like were not observed, and an excellent image was obtained, but in the jetting after a lapse of 4 minutes after the first jetting was stopped, the slight occurrence of the dead pixels was recognized to the extent that would not cause any problems in practical use.

C: In the jetting after a lapse of 2 minutes after the first jetting was stopped, the dead pixels occurring due to defective nozzles and the like were not observed, and an excellent image was obtained, but in the jetting after a lapse of 3 minutes after the first jetting was stopped, the slight occurrence of the dead pixels was recognized to the extent that would not cause any problems in practical use.

D: Even in the jetting performed within 2 minutes after the first jetting was stopped, the dead pixels occurred due to defective nozzles and the like, and the image did not have a level tolerable in practical use.

4. Storage Stability of Ink

As one of indices of dispersion stability of the ink (that is, aqueous dispersion), evaluation of storage stability was performed.

The above ink was sealed in a container and 2 weeks elapsed at 60° C.

With respect to the ink after a lapse of 2 weeks, an evaluation test that is the same as the evaluation test on the jetting properties was carried out, and the storage stability of the ink was evaluated according to the same evaluation standards.

In the above evaluation standards, "A" shows that the storage stability of the ink is most excellent. In addition, in the above evaluation standards, "A", "B", and "C" are acceptable levels for practical use.

TABLE 4

| | Shell | | | | | | | | |
|---|---|---|---|---|---|---|---|---|---|
| | Compound having acid group and active hydrogen group | | | | NCO compound into which hydrophilic group (nonionic group) is introduced | Tri- or higher functional NCO compound | Core | | |
| | | | | | | | Polymerizable group | | Photopolymerization initiator |
| | Type of compound | Type of acid group | Type of active hydrogen group | Amount added (g) | D-116N (g) | D-110N (g) | A-DCP (g) | SR399E (g) | Omnipol TX (g) | Genopol AB-2 (g) |
| Example 1 | Lysine | Carboxy group | Amino group | 3.3 | — | 11 | 35 | — | 1.8 | 1.8 |
| Example 2 | Lysine | Carboxy group | Amino group | 3.3 | — | 11 | 35 | — | 1.8 | 1.8 |
| Example 3 | Lysine | Carboxy group | Amino group | 3.3 | — | 11 | 35 | — | 1.8 | 1.8 |
| Example 4 | Lysine | Carboxy group | Amino group | 3.3 | — | 11 | 35 | — | 1.8 | 1.8 |
| Example 5 | Lysine | Carboxy group | Amino group | 3.3 | — | 11 | 35 | — | 1.8 | 1.8 |
| Example 6 | Lysine | Carboxy group | Amino group | 3.3 | — | 11 | 35 | — | 1.8 | 1.8 |
| Example 7 | β-Alanine | Carboxy group | Amino group | 3.3 | — | 11 | 35 | — | 1.8 | 1.8 |
| Example 8 | Malic acid | Carboxy group | Hydroxyl group | 5.3 | — | 11 | 35 | — | 1.8 | 1.8 |
| Example 9 | Lysine | Carboxy group | Amino group | 3.3 | — | 11 | 17.5 | 17.5 | 1.8 | 1.8 |
| Example 10 | Lysine | Carboxy group | Amino group | 3.3 | 16.5 | 7.5 | 35 | — | 1.8 | 1.8 |
| Example 11 | Taurine | Sulfo group | Amino group | 2.1 | — | 11 | 35 | — | 1.8 | 1.8 |
| Example 12 | EAP | Phosphoric acid group | Amino group | 2.8 | — | 11 | 35 | — | 1.8 | 1.8 |
| Example 13 | Lysine | Carboxy group | Amino group | 3.3 | — | 11 | 35 | — | 1.8 | 1.8 |
| Example 14 | Lysine | Carboxy group | Amino group | 3.3 | 16.5 | 7.5 | 35 | — | 1.8 | 1.8 |
| Comparative example 1 | Lysine | Carboxy group | Amino group | 3.3 | — | 11 | 35 | — | 1.8 | 1.8 |
| Comparative example 2 | Lysine | Carboxy group | Amino group | 3.3 | — | 11 | 35 | — | 1.8 | 1.8 |
| Comparative example 3 | Lysine | Carboxy group | Amino group | 3.3 | — | 11 | 35 | — | 1.8 | 1.8 |

| | Core Photopolymerization Omnipol 9210 (g) | Basic compound | Degree of neutralization in acid group (%) | Bond type of shell | Evaluation | | | |
|---|---|---|---|---|---|---|---|---|
| | | | | | Pencil hardness | Adhesiveness | Jetting properties | Storage stability |
| Example 1 | 3.5 | NaOH | 50 | Urea | F | B | B | B |
| Example 2 | 3.5 | NaOH | 75 | Urea | F | B | B | B |

TABLE 4-continued

| | | | | | | | | | |
|---|---|---|---|---|---|---|---|---|---|
| Example 3 | 3.5 | NaOH | 90 | Urea | F | B | B | A |
| Example 4 | 3.5 | NaOH | 95 | Urea | F | B | B | A |
| Example 5 | 3.5 | NaOH | 97 | Urea | F | B | B | C |
| Example 6 | 3.5 | NaOH | 100 | Urea | F | B | B | C |
| Example 7 | 3.5 | NaOH | 90 | Urea | F | B | B | A |
| Example 8 | 3.5 | NaOH | 90 | Urethane | F | B | B | C |
| Example 9 | 3.5 | NaOH | 90 | Urea | 2H | A | B | A |
| Example 10 | 3.5 | NaOH | 90 | Urea | H | B | A | A |
| Example 11 | 3.5 | NaOH | 90 | Urea | H | B | B | B |
| Example 12 | 3.5 | NaOH | 90 | Urea | H | B | B | B |
| Example 13 | 3.5 | TEA | 90 | Urea | F | B | B | C |
| Example 14 | 3.5 | TEA | 90 | Urea | F | B | B | C |
| Comparative example 1 | 3.5 | — | 0 | Urea | F | C | D | D |
| Comparative example 2 | 3.5 | NaOH | 40 | Urea | F | C | D | D |
| Comparative example 3 | 3.5 | NaOH | 48 | Urea | F | C | D | D |

TABLE 5

| | Shell | | | | | | Core | | |
|---|---|---|---|---|---|---|---|---|---|
| | Compound having acid group and active hydrogen group | | | | NCO compound into which hydrophilic group (nonionic group) is introduced D-116N (g) | Tri- or higher functional NCO compound D-110N (g) | Polymerizable group | | Thermal curing accelerator 2-Methylimidazole (g) |
| | Type of compound | Type of acid group | Type of active hydrogen group | Amount added (g) | | | Trixene ™ BI 7982 (g) | EPICLON ™ 840 (g) | |
| Example 15 | Lysine | Carboxy group | Amino group | 3.3 | — | 11 | 35 | — | — |
| Example 16 | β-Alanine | Carboxy group | Amino group | 3.3 | — | 11 | 35 | — | — |
| Example 17 | Lysine | Carboxy group | Amino group | 3.3 | — | 11 | 35 | — | — |
| Example 18 | Lysine | Carboxy group | Amino group | 3.3 | — | 11 | — | 35 | 7.1 |
| Comparative example 4 | Lysine | Carboxy group | Amino group | 3.3 | — | 11 | 35 | — | — |

| | | Degree of neutralization in acid group (%) | Bond type of shell | Evaluation | | | |
|---|---|---|---|---|---|---|---|
| | Basic compound | | | Pencil hardness | Adhesiveness | Jetting properties | Storage stability |
| Example 15 | NaOH | 90 | Urea | F | B | B | A |
| Example 16 | NaOH | 90 | Urea | F | B | B | A |
| Example 17 | TEA | 90 | Urea | F | B | B | C |
| Example 18 | NaOH | 90 | Urea | F | B | B | A |
| Comparative example 4 | NaOH | 40 | Urea | F | C | D | D |

In Tables 4 and 5, the symbol "–" means that the corresponding component is not used.

In Tables 4 and 5, "Isocyanate compound into which nonionic group is introduced as hydrophilic group" is denoted as "NCO compound into which hydrophilic group (nonionic group) is introduced". In addition, in Tables 4 and 5, "Tri- or higher functional isocyanate compound" is denoted as "tri- or higher functional NCO compound".

The structures of the compound having an acid group and an active hydrogen group which is used in the present example is shown below.

-continued

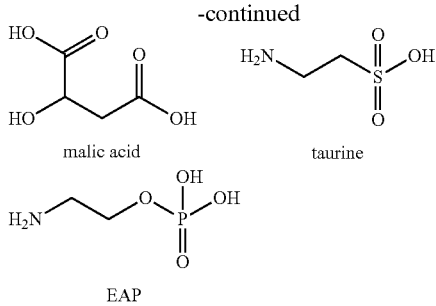

malic acid taurine

EAP

As shown in Tables 4 and 5, in the evaluation of the pencil hardness of the cured film, the jetting properties of the ink, and the storage stability of the ink, the inks of Examples 1 to 18 (that is, aqueous dispersion) showed excellent results compared to the inks of Comparative Examples 1 to 4 in which the degree of neutralization of the acid group contained in the three-dimensional cross-linked structure of the shell was less than 50%, the inks of Examples 1 to 18 including the microcapsule that has the shell having the three-dimensional cross-linked structure containing at least one neutralized acid group and at least one bond selected from the urethane bond or the urea bond, in which the degree of neutralization of the acid group contained in the three-dimensional cross-linked structure is from 50% to 100%, and that has the core, in which at least one of the shell or the core has the polymerizable group; and including water.

In addition, in the evaluation of the adhesiveness of the cured film, the inks of Examples 1 to 18 also showed excellent results compared to the inks of Comparative Examples 1 to 4.

In the evaluation of the storage stability, the inks of Examples 1 to 4 in which the degree of neutralization of the acid group contained in the three-dimensional cross-linked structure of the shell was 50% to 95%, showed excellent results compared to the inks of Examples 5 and 6 in which the degree of neutralization of the acid group contained in the three-dimensional cross-linked structure of the shell was more than 95%. Particularly, the inks of Examples 3 and 4 in which the degree of neutralization of the acid group contained in the three-dimensional cross-linked structure of the shell was 90% and 95%, respectively, showed remarkably excellent results.

In the evaluation of the storage stability, the inks (for example, Examples 3 and 7) in which the neutralized acid group is introduced into the shell via the urea bond, showed remarkably excellent results compared to the ink of Example 8 in which the neutralized acid group is introduced into the shell via the urethane bond.

In the evaluation of the pencil hardness of the cured film and the adhesiveness of the cured film, the ink of Example 9 in which the core of the microcapsule contains, as the polymerizable compound, the di- or lower functional polymerizable compound and the tri- or higher functional polymerizable compound, showed excellent results compared to the ink (for example, Example 3) in which the core contains only the di- or lower functional polymerizable compound.

In the evaluation of the jetting properties of the ink, the ink (for example, Example 10) in which the shell of the microcapsule has the three-dimensional cross-linked structure containing the nonionic group as the hydrophilic group, showed excellent results compared to the ink (for example, Example 3) in which the shell of the microcapsule has the three-dimensional cross-linked structure not containing the nonionic group as the hydrophilic group.

In the evaluation of the storage stability, the ink (for example, Example 3) in which the neutralized acid group is a salt of a carboxy group, showed excellent results compared to the ink of Example 11 in which the neutralized acid group is a salt of a sulfo group and the ink of Example 12 in which the neutralized acid group is a salt of a phosphoric acid group.

In the evaluation of the storage stability, the ink of Example 3 in which sodium hydroxide was used as a neutralizer for an acid group, showed remarkably excellent results compared to the ink of Example 13 in which triethylamine was used as a neutralizer for an acid group.

The entire content of JP2016-021360 filed on Feb. 5, 2016 and JP2016-144292 filed on Jul. 22, 2016 is incorporated into the present specification by reference.

All of the documents, the patent applications, and the technical standards described in the present specification are incorporated into the present specification by reference, as if each of the documents, the patent applications, and the technical standards is specifically and independently described by reference.

What is claimed is:

1. An aqueous dispersion comprising a microcapsule and water, the microcapsule comprising:
    a shell having a three-dimensional cross-linked structure comprising at least one neutralized acid group and at least one bond selected from a urethane bond or a urea bond, in which a degree of neutralization of the acid group included in the three-dimensional cross-linked structure is from 50% to 100%; and
    a core,
    at least one of the shell or the core comprising a polymerizable group, wherein
    the neutralized acid group is neutralized by an alkali metal salt.

2. The aqueous dispersion according to claim 1, wherein the neutralized acid group is a salt of a carboxy group.

3. The aqueous dispersion according to claim 1, wherein the three-dimensional cross-linked structure comprising the neutralized acid group comprises a structure selected from the group consisting of a structure represented by the following Formula (A) and a structure represented by the following Formula (B):

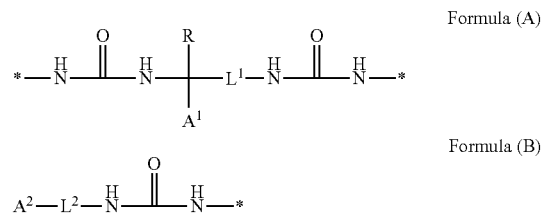

Formula (A)

Formula (B)

wherein in Formula (A), $A^1$ represents a neutralized acid group, R represents a hydrogen atom or an alkyl group having from 1 to 10 carbon atoms, $L^1$ represents a divalent linking group, and * represents a linking site; and wherein in Formula (B), $A^2$ represents a neutralized acid group, $L^2$ represents a divalent linking group, and * represents a linking site.

4. The aqueous dispersion according to claim 1, wherein the degree of neutralization of the acid group included in the three-dimensional cross-linked structure is from 50% to 95%.

5. The aqueous dispersion according to claim 1, wherein the polymerizable group is a radically polymerizable group.

6. The aqueous dispersion according to claim 1, wherein the core comprises a radically polymerizable compound.

7. The aqueous dispersion according to claim 6, wherein the core comprises a di- or lower functional radically polymerizable compound and a tri- or higher functional radically polymerizable compound.

8. The aqueous dispersion according to claim 5, wherein the core comprises a photopolymerization initiator.

9. The aqueous dispersion according to claim 1, wherein the polymerizable group is a thermally polymerizable group.

10. The aqueous dispersion according to claim 1, wherein the core comprises a thermally polymerizable compound.

11. The aqueous dispersion according to claim 1, wherein a content of an anionic surfactant is 1% by mass or less with respect to a total amount of the aqueous dispersion.

12. The aqueous dispersion according to claim 1, wherein a total solid content of the microcapsule is 50% by mass or more with respect to a total solid content of the aqueous dispersion.

13. The aqueous dispersion according to claim 1, which is used as an ink jet ink.

14. A method for manufacturing the aqueous dispersion according to claim 1, the method comprising a microcapsule-forming step including:
   mixing an oil-phase component with a water-phase component, the oil-phase component comprising an organic solvent, a tri- or higher functional isocyanate compound, and a compound selected from an isocyanate compound into which a polymerizable group is introduced and a polymerizable compound, and the water-phase component comprising a compound having an acid group and an active hydrogen group, a basic compound, and water; and
   emulsifying the mixture so as to form the microcapsule.

15. The method for manufacturing the aqueous dispersion according to claim 14, further comprising, before the microcapsule-forming step, a step of preparing the water-phase component in which a degree of neutralization of an acid group of the compound having the acid group and the active hydrogen group is adjusted to from 50% to 100% by using the basic compound.

16. An image forming method comprising:
   an application step of applying the aqueous dispersion according to claim 1 onto a recording medium; and
   a curing step of curing the aqueous dispersion applied onto the recording medium.

* * * * *